US012647815B2

(12) United States Patent
Talebi Fard et al.

(10) Patent No.: US 12,647,815 B2
(45) Date of Patent: Jun. 2, 2026

(54) NETWORK CONGESTION CONTROL

(71) Applicant: Ofinno, LLC, Reston, VA (US)

(72) Inventors: Peyman Talebi Fard, Vienna, VA (US);
Taehun Kim, Fairfax, VA (US);
Esmael Hejazi Dinan, McLean, VA
(US); Jinsook Ryu, Oakton, VA (US);
Weihua Qiao, Herndon, VA (US);
Kyungmin Park, Vienna, VA (US)

(73) Assignee: Ofinno, LLC, Reston, VA (US)

( * ) Notice: Subject to any disclaimer, the term of this
patent is extended or adjusted under 35
U.S.C. 154(b) by 261 days.

(21) Appl. No.: 18/397,769

(22) Filed: Dec. 27, 2023

(65) Prior Publication Data

US 2024/0129794 A1     Apr. 18, 2024

Related U.S. Application Data

(63) Continuation    of    application    No.
PCT/US2022/035279, filed on Jun. 28, 2022.

(60) Provisional application No. 63/217,074, filed on Jun.
30, 2021.

(51) Int. Cl.
H04W 28/02        (2009.01)

(52) U.S. Cl.
CPC ...  H04W 28/0247 (2013.01); H04W 28/0284
(2013.01); H04W 28/0289 (2013.01)

(58) Field of Classification Search
CPC ......... H04W 28/0247; H04W 28/0284; H04W
28/0289
See application file for complete search history.

(56) References Cited

U.S. PATENT DOCUMENTS

| | | |
|---|---|---|
| 2020/0389835 A1 | 12/2020 | Talebi Fard et al. |
| 2021/0029579 A1* | 1/2021 | Tiwari .................. H04W 76/38 |

FOREIGN PATENT DOCUMENTS

| | | |
|---|---|---|
| WO | 2019/074347 A1 | 4/2019 |
| WO | 2021/056384 A1 | 4/2021 |

OTHER PUBLICATIONS

C1-202579, 3GPP TSG-CT WG1 Meeting #123-e; Electronic Meet-
ing, Apr. 16-24, 2020; Change Request; 24.502, CR 0130, rev—
Current Version 16.3.0 (Year: 2020).*
3GPP TS 23.288 V17.0.0 (Mar. 2021); Technical Specification; 3rd
Generation Partnership Project; Technical Specification Group Ser-
vices and System Aspects; Architecture enhancements for 5G
System (5GS) to support network data analytics services; (Release
17).
3GPP TS 23.501 V17.0.0 (Mar. 2021); Technical Specification; 3rd
Generation Partnership Project; Technical Specification Group Ser-
vices and System Aspects; System architecture for the 5G System
(5GS); Stage 2; (Release 17).
3GPP TS 23.502 V17.0.0 (Mar. 2021); Technical Specification; 3rd
Generation Partnership Project; Technical Specification Group Ser-
vices and System Aspects; Procedures for the 5G System (5GS);
Stage 2; (Release 17).

(Continued)

*Primary Examiner* — Siming Liu
(74) *Attorney, Agent, or Firm* — Xin Gao; Kavon
Nasabzadeh; Jacob L. Mangan

(57)        ABSTRACT

A wireless device receives, from a network node of a first
network via a packet data unit (PDU) session of a second
network, a congestion notification of the first network. The
wireless device sends, to the second network, the congestion
notification of the first network.

20 Claims, 36 Drawing Sheets

(56) References Cited

OTHER PUBLICATIONS

3GPP TR 23.700-07 V17.0.0 (Mar. 2021); Technical Report; 3rd Generation Partnership Project; Technical Specification Group Services and System Aspects; Study on enhanced support of Non-Public Networks (NPN); (Release 17).
3GPP TS 24.302 V17.1.0 (Mar. 2021); Technical Specification; 3rd Generation Partnership Project; Technical Specification Group Core Network and Terminals; Access to the 3GPP Evolved Packet Core (EPC) via non-3GPP access networks; Stage 3; (Release 17).
3GPP TS 24.501 V17.2.1 (Apr. 2021); Technical Specification; 3rd Generation Partnership Project; Technical Specification Group Core Network and Terminals; Non-Access-Stratum (NAS) protocol for 5G System (5GS); Stage 3; (Release 17).
C1-194925; 3GPP TSG-CT WG1 Meeting #119; Wroclaw (Poland), Aug. 26-30, 2019; Change Request; 24.501; CR 1288; rev 1; Current version: 16.1.0.
3GPP TS 24.502 V17.2.0 (Mar. 2021); Technical Specification; 3rd Generation Partnership Project; Technical Specification Group Core Network and Terminals; Access to the 3GPP 5G Core Network (5GCN) via Non-3GPP Access Networks (N3AN); Stage 3; (Release 17).
3GPP TS 29.413 V16.2.0 (Jan. 2021); Technical Specification; 3rd Generation Partnership Project; Technical Specification Group Radio Access Network; Application of the NG Application Protocol (NGAP) to non-3GPP access; (Release 16).
3GPP TS 38.413 V16.5.0 (Apr. 2021); Technical Specification; 3rd Generation Partnership Project; Technical Specification Group Radio Access Network; NG-RAN; NG Application Protocol (NGAP); (Release 16).
C1-200234; 3GPP TSG CT WG1 Meeting #122e; Electronic meeting, Feb. 20-28, 2020; S2-1912601; SA WG2 Meeting #136; Nov. 18-22, 2019, Reno NV USA; Title: Reply LS on applicability of the notification procedure in SNPNs; Response to: LS (S2-1908662) on applicability of the notification procedure in SNPNs; Release: Release-16; Work Item: Vertical_LAN.
C1-202579; 3GPP TSG-CT WG1 Meeting #123-e; Electronic meeting, Apr. 16-24, 2020; Change Request; 24.502; CR 0130; rev -; Current version: 16.3.0.
C1-203710; 3GPP TSG-CT WG1 Meeting #124-e; Electronic meeting, Jun. 2-10, 2020; Change Request; 24.501; CR 2388; rev -; Current version: 16.4.1.
C1-206215; 3GPP TSG-CT WG1 Meeting #126-e; Electronic meeting, Oct. 15-23, 2020; Change Request; 24.501; CR 2731; rev -; Current version: 17.0.0.
C1-210680; 3GPP TSG-CT WG1 Meeting #128-e; Electronic meeting, Feb. 25-Mar. 5, 2021; Source: Ericsson; Title: New WID on CT aspects of Enhanced support of Non-Public Networks; Document for: Approval; Agenda Item: 17.1.1.

C1-210733; 3GPP TSG CT WG1 Meeting #128-e; Electronic meeting, Feb. 25-Mar. 5, 2021; Source: Qualcomm Incorporated; Title: Discussion on URSP for access to PLMN services via an SNPN; Agenda item: 17.2.2.1; Document for: Discussion and Decision.
C1-210734; 3GPP TSG-CT WG1 Meeting #128-e; Electronic meeting, Feb. 25-Mar. 5, 2021; Change Request; 24.526; CR 0107; rev -; Current version: 17.1.0.
Third Generation Partnership Project (3GPPTM); Meeting Report for TSG CT WG1 meeting: 128e; Electronic, Electronic, Feb. 25, 2021 to May 3, 2021.
C1-210661; 3GPP TSG-CT WG1 Meeting #128-e; Electronic meeting, Feb. 25-Mar. 5, 2021; Change Request; 24.501; CR 2964; rev 1; Current version: 17.1.0.
R2-2106662; 3GPP TSG-RAN WG2 #114-e; Electronic meeting, May 20-27, 2021; Agenda Item: 8.16.3; Source: Ericsson; Title: UE onboarding and provisioning for NPN; Document for: Discussion.
R2-2102011; 3GPP TSG-RAN WG2 Meeting #113 Electronic; Jan. 25-Feb. 5, 2021; Agenda item: 6.12 Source: Nokia; Title: Summary of [AT113-e][101][PRN] Corrections; WID/SID: NG_RAN_PRN-Core—Release 16; Document for: Decision.
R2-2100485; 3GPP TSG-RAN WG2 #113eTdoc; Electronic meeting, Jan. 25, 2021-Feb. 5, 2021; Agenda Item: 6.12; Source: Ericsson; Title: UAC parameter selection for NPN; Document for: Discussion, Decision.
R2-2101557; 3GPP TSG-RAN WG2 Meeting #113e; Online, Jan 25-Feb. 5, 2021; Change Request; 38.331; CR 2420; rev -; Current version: 16.3.0.
R2-2101715; 3GPP TSG-RAN WG2 Meeting #113e; Electronic Meeting, Jan. 25-Feb. 5, 2021; Change Request; 38.331; CR 2432; rev 0; Current version: 16.3.1.
S2-1912601; SA WG2 Meeting #136; Nov. 18-22, 2019, Reno NV USA; Title: Reply LS on applicability of the notification procedure in SNPNs; Response to: LS (S2-1908662) on applicability of the notification procedure in SNPNs; Release: Release-16; Work Item: Vertical_LAN.
S2-2002811; SA WG2 Meeting #S2-138E; Apr. 20-24, 2020, E-meeting (revision of S2-200xxxx); Change Request; 23.502; CR 2200; rev -; Current version: 16.4.0.
S2-2004055; SA WG2 Meeting #139E(e-meeting); Jun. 1-12, 2020, Elbonia; Source: MediaTek Inc.; Title: KI #4, New Sol: Onboarding of UEs without any credentials; Document for: Approval; Agenda Item: 8.2; Work Item / Release: FS_eNPN/Rel-17.
S2-2007812; 3GPP TSG-WG SA2 Meeting #141E e-meeting; Elbonia, Oct. 12-23, 2020; (revision of S2-2007042); Change Request; 23.501; CR 2465; rev 1; Current version: 16.6.0.
International Search Report and Written Opinion of the International Searching authority mailed Sep. 23, 2022, in International Application No. PCT/US2022/035279.

* cited by examiner

FIG. 7C

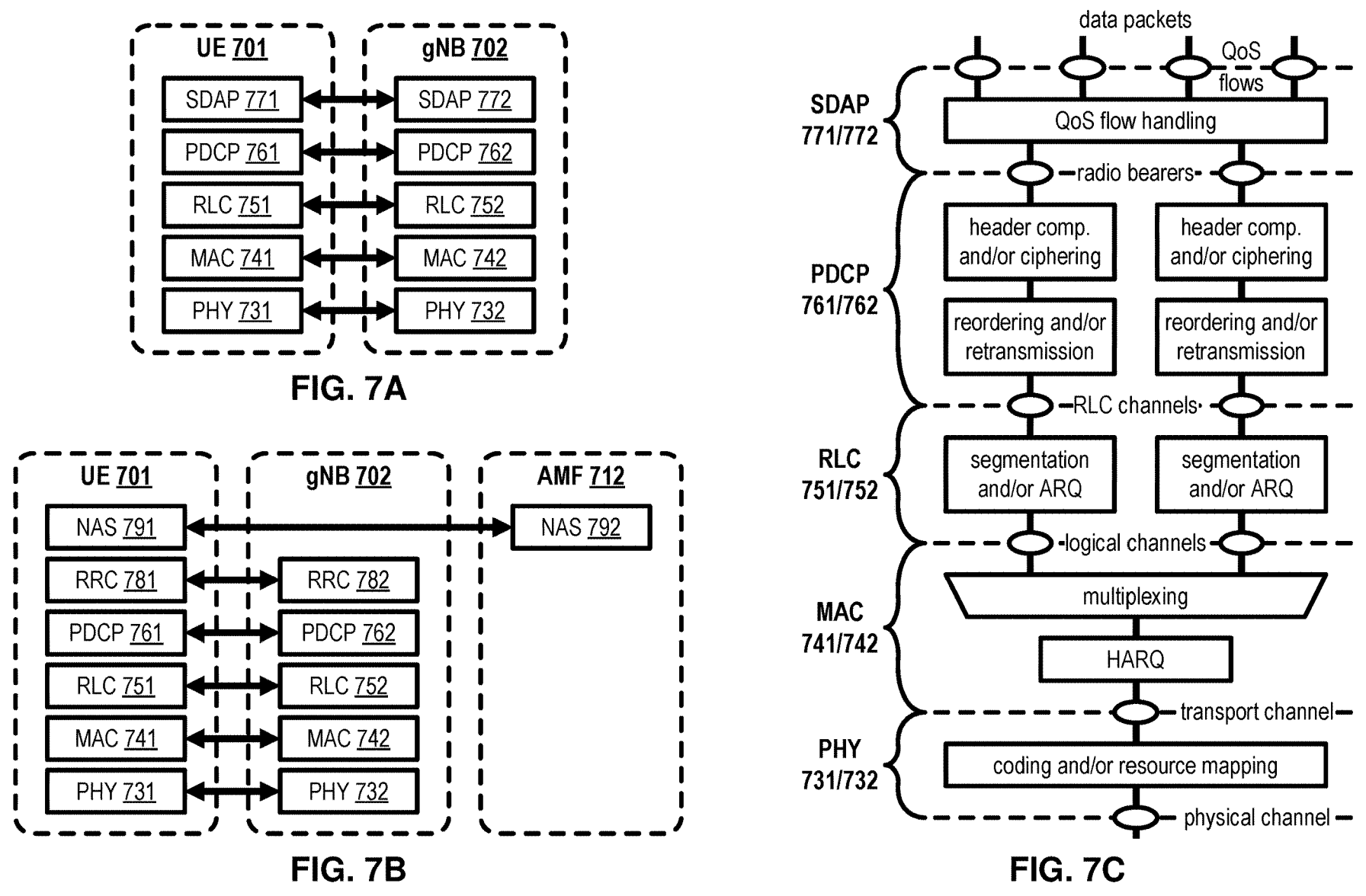

SDAP
771/772

PDCP
761/762

RLC
751/752

MAC
741/742

PHY
731/732

QoS flow handling header comp. and/or ciphering reordering and/or retransmission segmentation and/or ARQ multiplexing

HARQ coding and/or resource mapping data packets

QoS flows radio bearers

RLC channels logical channels transport channel physical channel

FIG. 7A gNB 702

SDAP 772
PDCP 762
RLC 752
MAC 742
PHY 732

UE 701

SDAP 771
PDCP 761
RLC 751
MAC 741
PHY 731

FIG. 7B

AMF 712

NAS 792 gNB 702

RRC 782
PDCP 762
RLC 752
MAC 742
PHY 732

UE 701

NAS 791
RRC 781
PDCP 761
RLC 751
MAC 741
PHY 731

Figures 14A, 14B, 14C, 14D:
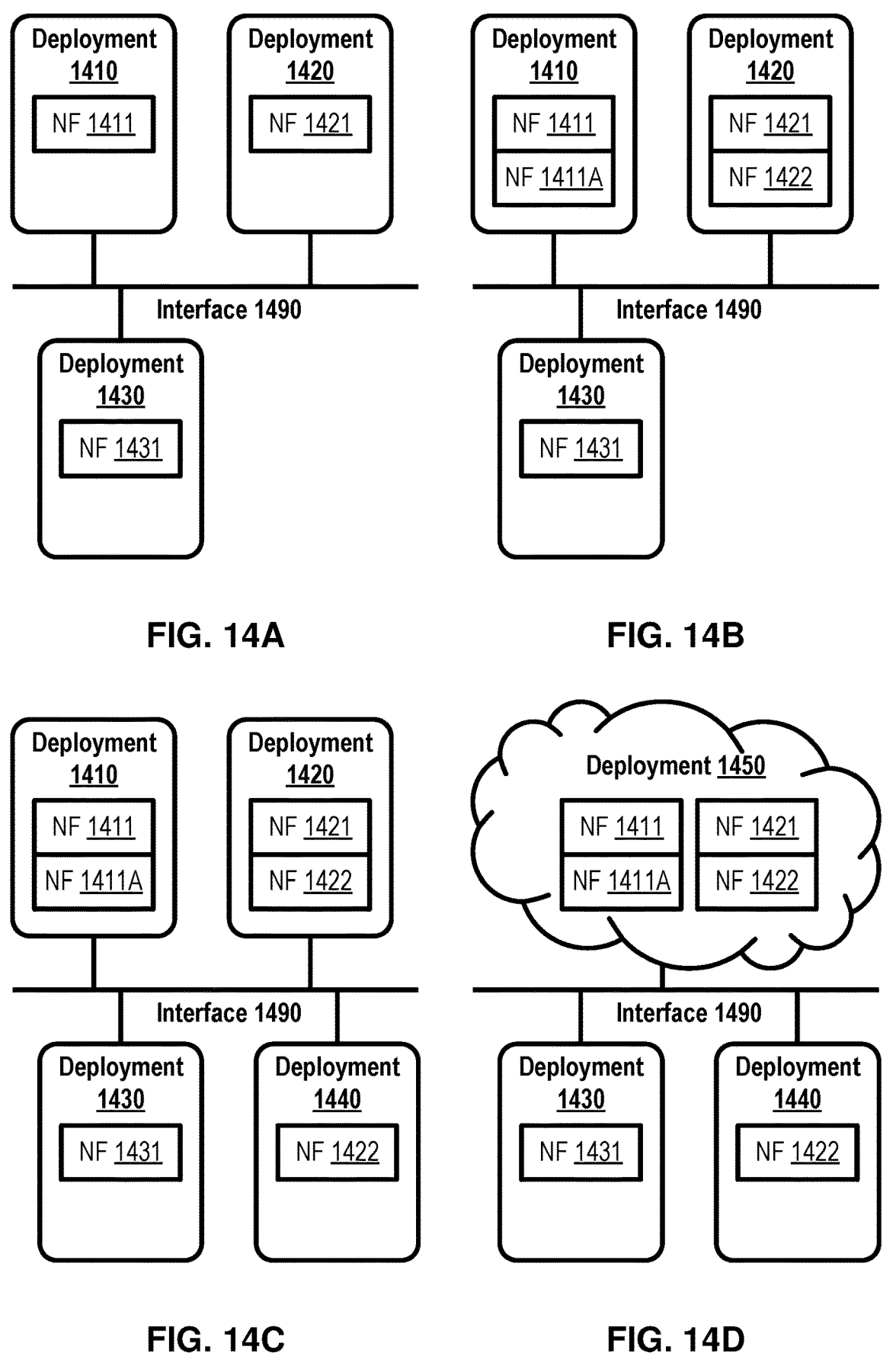

Deployment
1410

NF 1411

Deployment
1420

NF 1421

Interface 1490

Deployment
1430

Deployment
1410

NF 1411

NF 1411A

Deployment
1420

NF 1421

NF 1422

Interface 1490

Deployment
1430

Deployment
1410

NF 1411

NF 1411A

Deployment
1420

NF 1421

NF 1422

Interface 1490

Deployment
1430

NF 1431

Deployment
1440

Deployment 1450

NF 1411

NF 1411A

NF 1421

NF 1422

Interface 1490

Deployment
1430

NF 1431

Deployment
1440

| Establishment cause for non-3GPP access IEI | | | | | octet 1 |
|---|---|---|---|---|---|
| 0 Spare | 0 Spare | 0 Spare | 0 Spare | N3AEC | octet 2 |

Establishment cause for non-3GPP access information element

Establishment cause for non-3GPP access information element

```
Establishment cause for non-3GPP access (N3AEC)
(octet 2 bits 1 to 4)
Bits
4 3 2 1
0 0 0 0          emergency
0 0 0 1          highPriorityAccess
0 0 1 1          mo-Signalling
0 1 0 0          mo-Data
1 0 0 0          mps-PriorityAccess
1 0 0 1          mcs-PriorityAccess
1 0 1 0          mo-SMS All other values are spare values. The receiving entity
shall treat a spare value as 0100, "mo-Data".
```

| 8 | 7 | 6 | 5 | 4 | 3 | 2 | 1 | |
|---|---|---|---|---|---|---|---|---|
| Establishment cause for extended access IEI | | | | | | | | octet 1 |
| 0 Spare | | 0 Spare | | 0 Spare | | 0 Spare | EAEC | octet 2 |

Establishment cause for Extended access information element

Establishment cause for Extended access information element

```
Establishment cause for extended access (EAEC) (octet
2 bits 1 to 4)
Bits
4 3 2 1
0 0 0 0          emergency
0 0 0 1          highPriorityAccess
0 0 1 1          mo-Signalling
0 1 0 0          mo-Data
1 0 0 0          mps-PriorityAccess
1 0 0 1          mcs-PriorityAccess
1 0 1 0          mo-SMS All other values are spare values. The receiving entity
shall treat a spare value as 0100, "mo-Data".
```

FIG. 32

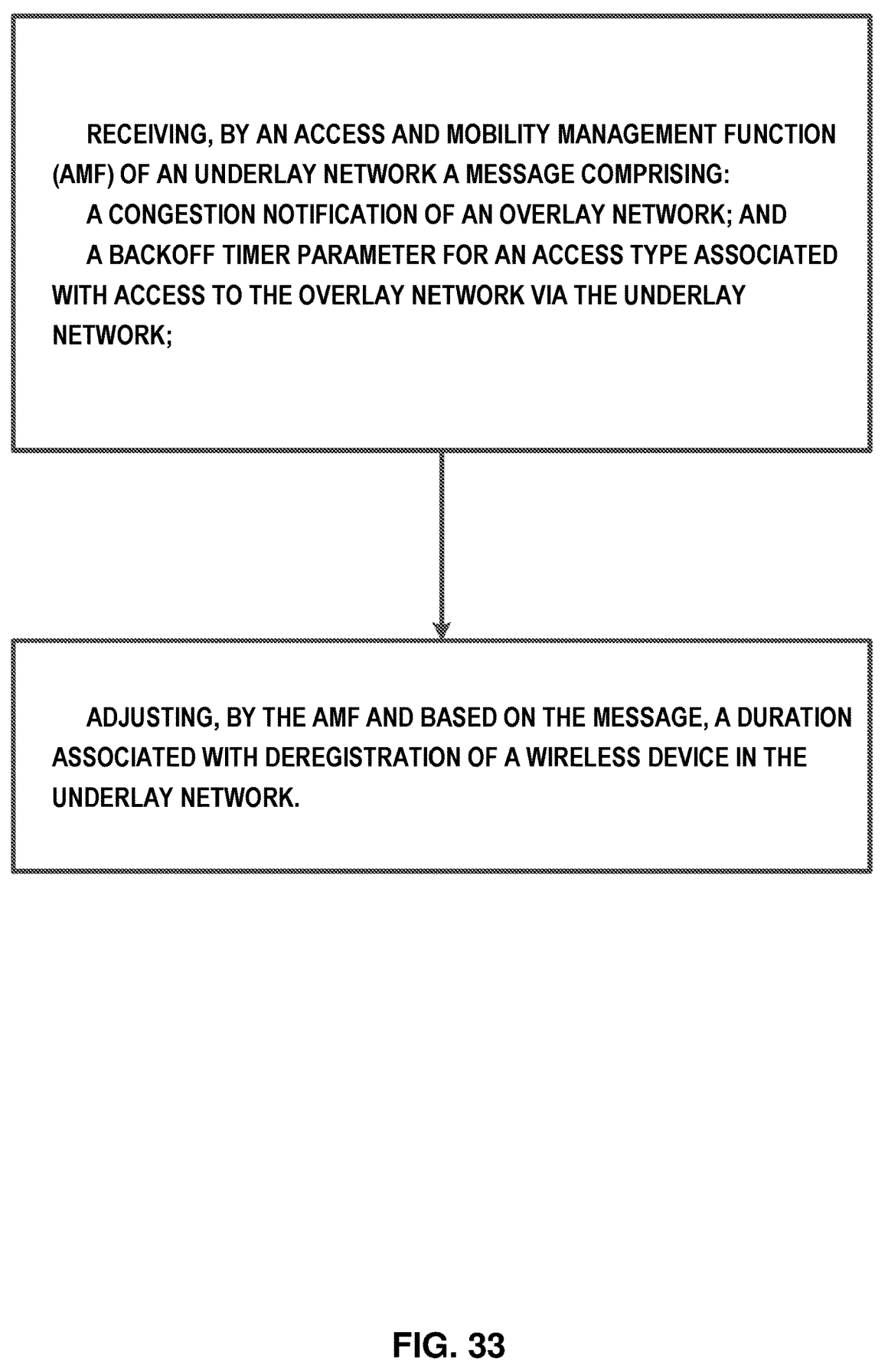

RECEIVING, BY AN ACCESS AND MOBILITY MANAGEMENT FUNCTION (AMF) OF AN UNDERLAY NETWORK A MESSAGE COMPRISING:
  A CONGESTION NOTIFICATION OF AN OVERLAY NETWORK; AND
  A BACKOFF TIMER PARAMETER FOR AN ACCESS TYPE ASSOCIATED WITH ACCESS TO THE OVERLAY NETWORK VIA THE UNDERLAY NETWORK;

ADJUSTING, BY THE AMF AND BASED ON THE MESSAGE, A DURATION ASSOCIATED WITH DEREGISTRATION OF A WIRELESS DEVICE IN THE UNDERLAY NETWORK.

FIG. 33

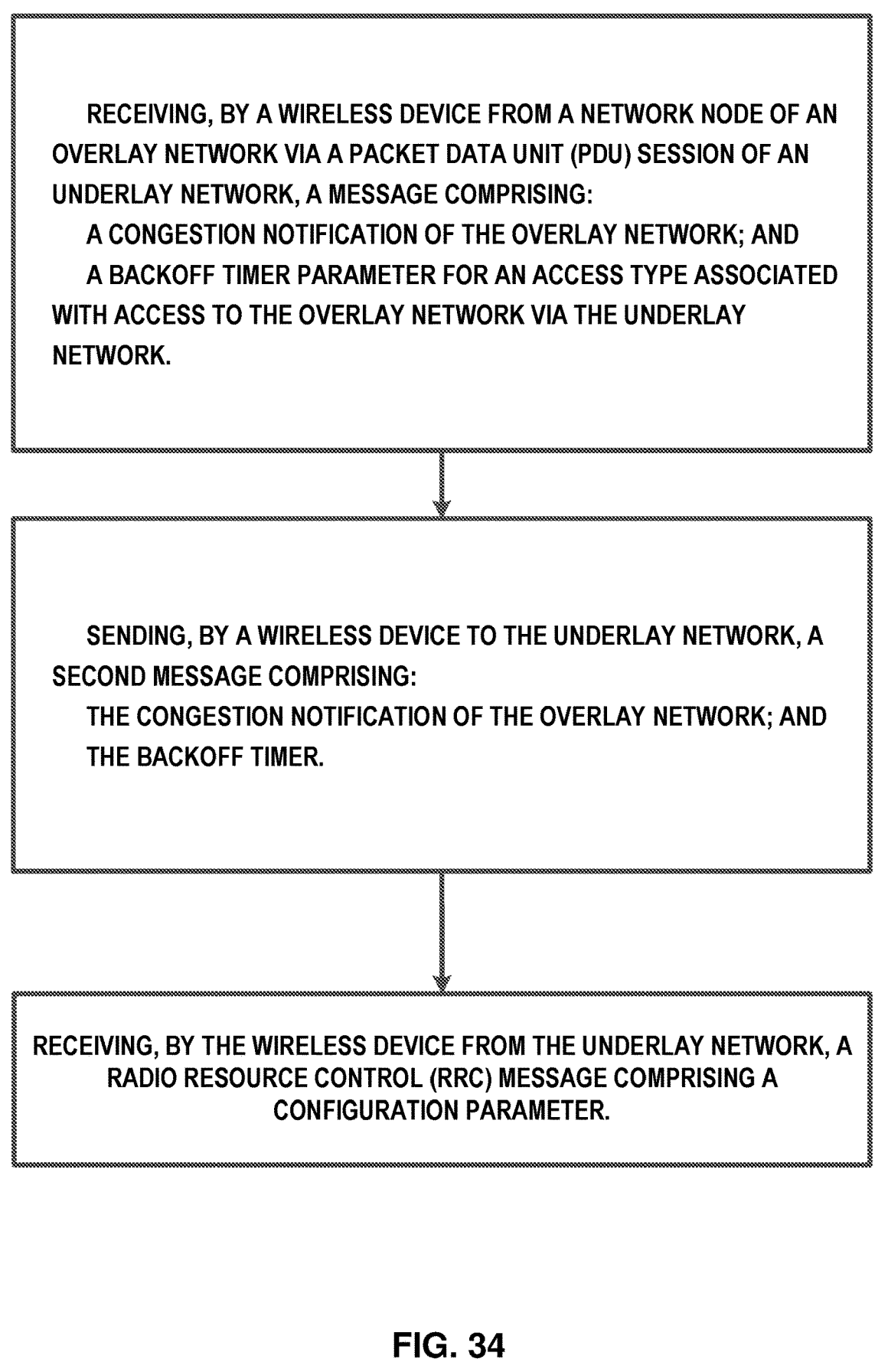

RECEIVING, BY A WIRELESS DEVICE FROM A NETWORK NODE OF AN OVERLAY NETWORK VIA A PACKET DATA UNIT (PDU) SESSION OF AN UNDERLAY NETWORK, A MESSAGE COMPRISING:
A CONGESTION NOTIFICATION OF THE OVERLAY NETWORK; AND
A BACKOFF TIMER PARAMETER FOR AN ACCESS TYPE ASSOCIATED WITH ACCESS TO THE OVERLAY NETWORK VIA THE UNDERLAY NETWORK.

SENDING, BY A WIRELESS DEVICE TO THE UNDERLAY NETWORK, A SECOND MESSAGE COMPRISING:
THE CONGESTION NOTIFICATION OF THE OVERLAY NETWORK; AND
THE BACKOFF TIMER.

RECEIVING, BY THE WIRELESS DEVICE FROM THE UNDERLAY NETWORK, A RADIO RESOURCE CONTROL (RRC) MESSAGE COMPRISING A CONFIGURATION PARAMETER.

FIG. 34

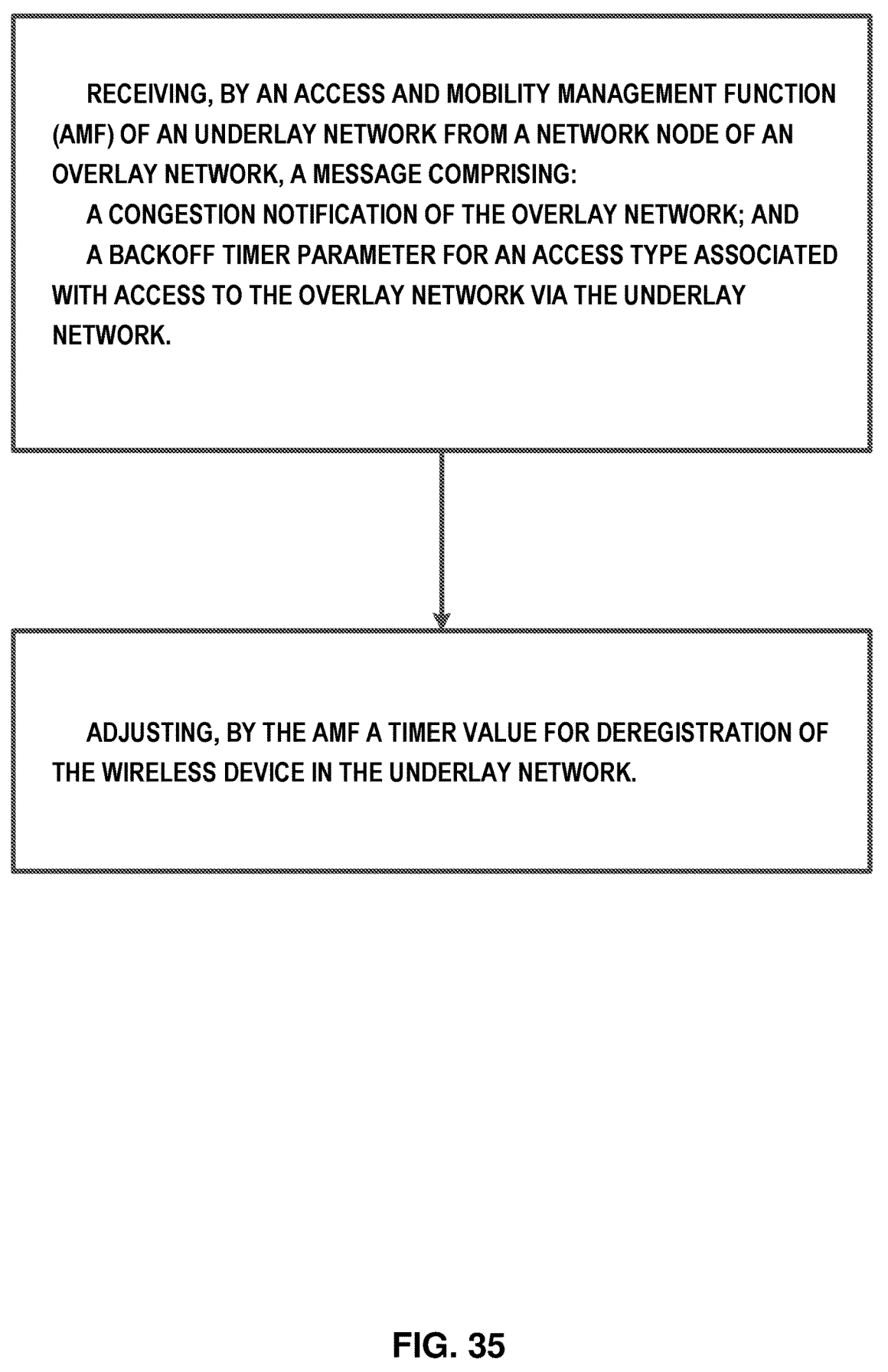

RECEIVING, BY AN ACCESS AND MOBILITY MANAGEMENT FUNCTION (AMF) OF AN UNDERLAY NETWORK FROM A NETWORK NODE OF AN OVERLAY NETWORK, A MESSAGE COMPRISING:
A CONGESTION NOTIFICATION OF THE OVERLAY NETWORK; AND
A BACKOFF TIMER PARAMETER FOR AN ACCESS TYPE ASSOCIATED WITH ACCESS TO THE OVERLAY NETWORK VIA THE UNDERLAY NETWORK.

ADJUSTING, BY THE AMF A TIMER VALUE FOR DEREGISTRATION OF THE WIRELESS DEVICE IN THE UNDERLAY NETWORK.

FIG. 35

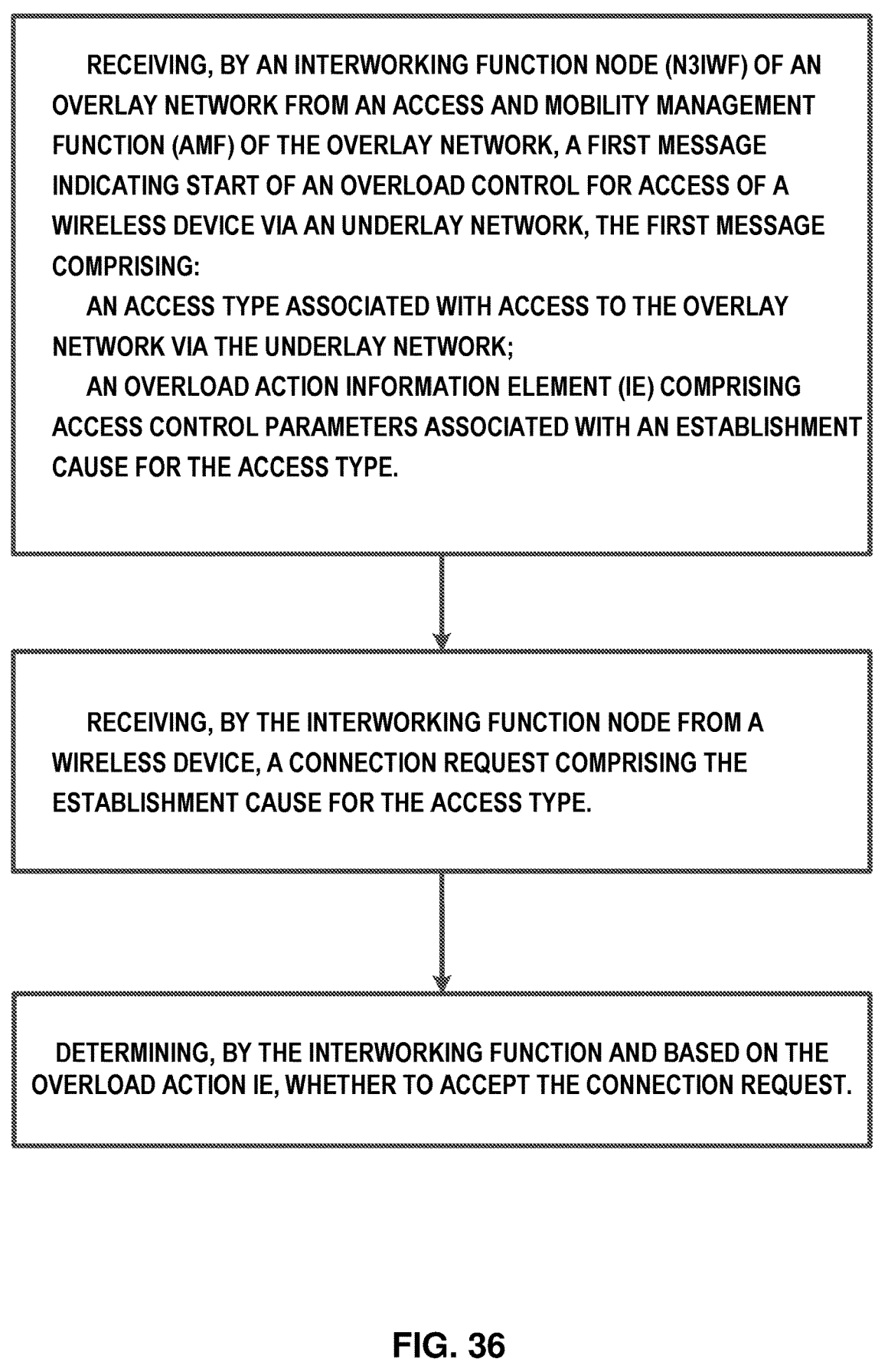

RECEIVING, BY AN INTERWORKING FUNCTION NODE (N3IWF) OF AN OVERLAY NETWORK FROM AN ACCESS AND MOBILITY MANAGEMENT FUNCTION (AMF) OF THE OVERLAY NETWORK, A FIRST MESSAGE INDICATING START OF AN OVERLOAD CONTROL FOR ACCESS OF A WIRELESS DEVICE VIA AN UNDERLAY NETWORK, THE FIRST MESSAGE COMPRISING:

AN ACCESS TYPE ASSOCIATED WITH ACCESS TO THE OVERLAY NETWORK VIA THE UNDERLAY NETWORK;

AN OVERLOAD ACTION INFORMATION ELEMENT (IE) COMPRISING ACCESS CONTROL PARAMETERS ASSOCIATED WITH AN ESTABLISHMENT CAUSE FOR THE ACCESS TYPE.

RECEIVING, BY THE INTERWORKING FUNCTION NODE FROM A WIRELESS DEVICE, A CONNECTION REQUEST COMPRISING THE ESTABLISHMENT CAUSE FOR THE ACCESS TYPE.

DETERMINING, BY THE INTERWORKING FUNCTION AND BASED ON THE OVERLOAD ACTION IE, WHETHER TO ACCEPT THE CONNECTION REQUEST.

FIG. 36

NETWORK CONGESTION CONTROL

CROSS-REFERENCE TO RELATED APPLICATIONS

This application is a continuation of International Application No. PCT/US2022/035279, filed Jun. 28, 2022, which claims the benefit of U.S. Provisional Application No. 63/217,074, filed Jun. 30, 2021, all of which are hereby incorporated by reference in their entireties.

BRIEF DESCRIPTION OF THE DRAWINGS

Examples of several of the various embodiments of the present disclosure are described herein with reference to the drawings.

FIG. 7A, FIG. 7B, and FIG. 7C illustrate a user plane protocol stack, a control plane protocol stack, and services provided between protocol layers of the user plane protocol stack.

FIG. 14A, FIG. 14B, FIG. 14C, and FIG. 14D illustrate various examples of physical core network deployments, each having one or more network functions or portions thereof.

FIG. 32 illustrates an example embodiment of a present disclosure.

FIG. 33 illustrates an example embodiment of a present disclosure.

FIG. 34 illustrates an example embodiment of a present disclosure.

FIG. 35 illustrates an example embodiment of a present disclosure.

FIG. 36 illustrates an example embodiment of a present disclosure.

DETAILED DESCRIPTION

Figures 1A, 1B:
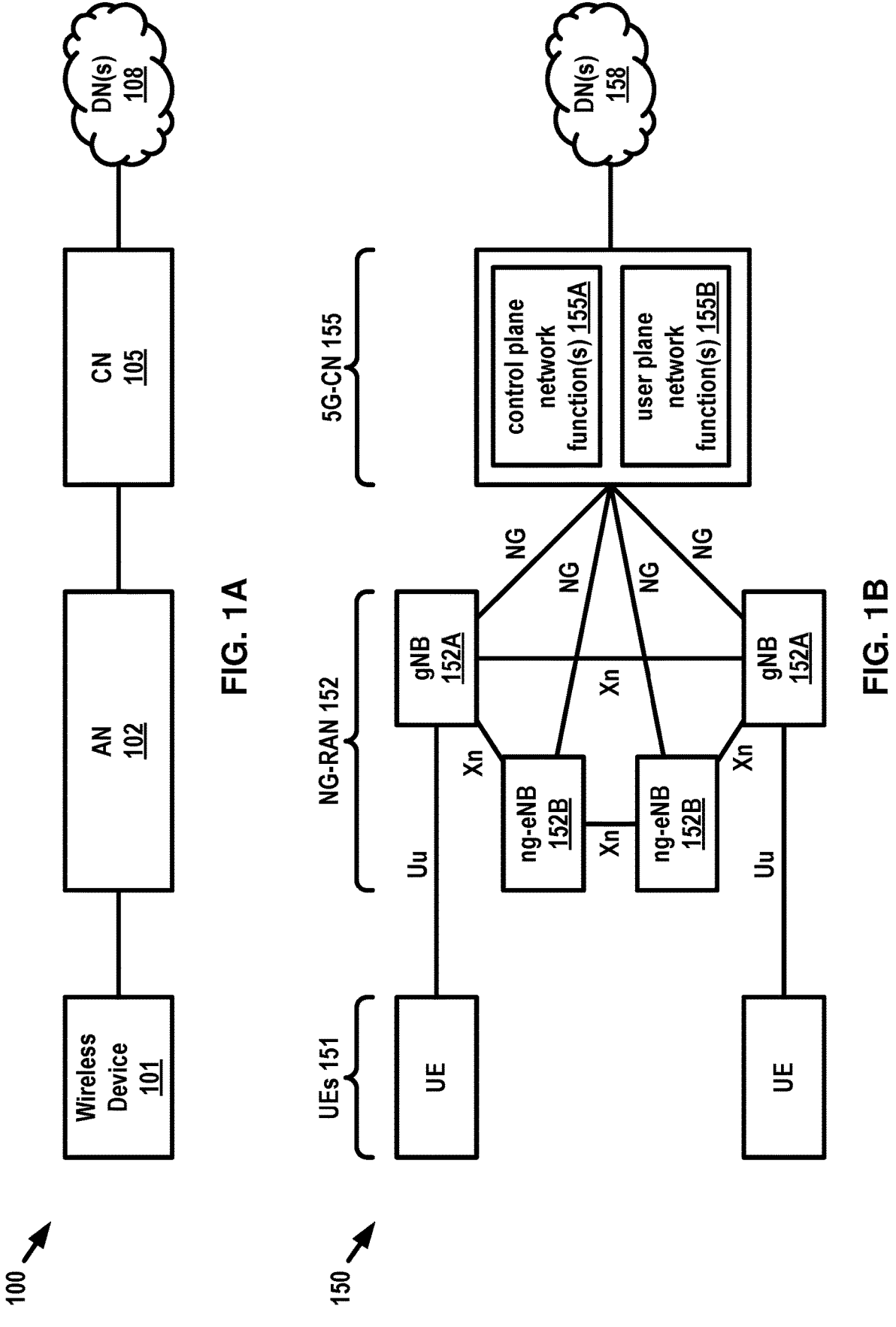
FIG. 1A and FIG. 1B illustrate example communication networks including an access network and a core network.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have one or more specific capabilities. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases refer to a single instance of a particular element, but should not be interpreted to exclude other instances of that element. For example, a bicycle with two wheels may be described as having "a wheel". Any term that ends with the suffix "(s)" is to be interpreted as "at least one" and/or "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described.

The phrases "based on", "in response to", "depending on", "employing", "using", and similar phrases indicate the presence and/or influence of a particular factor and/or condition on an event and/or action, but do not exclude unenumerated factors and/or conditions from also being present and/or influencing the event and/or action. For example, if action X is performed "based on" condition Y, this is to be interpreted as the action being performed "based at least on" condition Y. For example, if the performance of action X is performed when conditions Y and Z are both satisfied, then the performing of action X may be described as being "based on Y".

The term "configured" may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, a parameter may comprise one or more information objects, and an information object may comprise one or more other objects. For example, if parameter J comprises parameter K, and parameter K comprises parameter L, and parameter L comprises parameter M, then J comprises L, and J comprises M. A parameter may be referred to as a field or information element. In an example embodiment, when one or more messages comprise a plurality of parameters, it implies that a parameter in the plurality of parameters is in at least one of the one or more messages, but does not have to be in each of the one or more messages.

This disclosure may refer to possible combinations of enumerated elements. For the sake of brevity and legibility, the present disclosure does not explicitly recite each and every permutation that may be obtained by choosing from a set of optional features. The present disclosure is to be interpreted as explicitly disclosing all such permutations. For example, the seven possible combinations of enumerated elements A, B, C consist of: (1) "A"; (2) "B"; (3) "C"; (4) "A and B"; (5) "A and C"; (6) "B and C"; and (7) "A, B, and C". For the sake of brevity and legibility, these seven possible combinations may be described using any of the following interchangeable formulations: "at least one of A, B, and C"; "at least one of A, B, or C"; "one or more of A, B, and C"; "one or more of A, B, or C"; "A, B, and/or C". It will be understood that impossible combinations are excluded. For example, "X and/or not-X" should be interpreted as "X or not-X". It will be further understood that these formulations may describe alternative phrasings of overlapping and/or synonymous concepts, for example, "identifier, identification, and/or ID number".

This disclosure may refer to sets and/or subsets. As an example, set X may be a set of elements comprising one or more elements. If every element of X is also an element of Y, then X may be referred to as a subset of Y. In this disclosure, only non-empty sets and subsets are considered. For example, if Y consists of the elements Y1, Y2, and Y3, then the possible subsets of Y are {Y1, Y2, Y3}, {Y1, Y2}, {Y1, Y3}, {Y2, Y3}, {Y1}, {Y2}, and {Y3}.

FIG. 1A illustrates an example of a communication network 100 in which embodiments of the present disclosure may be implemented. The communication network 100 may comprise, for example, a public land mobile network (PLMN) run by a network operator. As illustrated in FIG. 1A, the communication network 100 includes a wireless device 101, an access network (AN) 102, a core network (CN) 105, and one or more data network (DNs) 108.

The wireless device 101 may communicate with DNs 108 via AN 102 and CN 105. In the present disclosure, the term wireless device may refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, unmanned aerial vehicle, urban air mobility, and/or any combination thereof. The term wireless device encompasses other terminology, including user equipment (UE), user terminal (UT), access terminal (AT), mobile station, handset, wireless transmit and receive unit (WTRU), and/or wireless communication device.

The AN 102 may connect wireless device 101 to CN 105 in any suitable manner. The communication direction from the AN 102 to the wireless device 101 is known as the downlink and the communication direction from the wireless device 101 to AN 102 is known as the uplink. Downlink transmissions may be separated from uplink transmissions using frequency division duplexing (FDD), time-division duplexing (TDD), and/or some combination of the two duplexing techniques. The AN 102 may connect to wireless device 101 through radio communications over an air interface. An access network that at least partially operates over the air interface may be referred to as a radio access network (RAN). The CN 105 may set up one or more end-to-end connection between wireless device 101 and the one or more DNs 108. The CN 105 may authenticate wireless device 101 and provide charging functionality.

In the present disclosure, the term base station may refer to and encompass any element of AN 102 that facilitates communication between wireless device 101 and AN 102. Access networks and base stations have many different names and implementations. The base station may be a terrestrial base station fixed to the earth. The base station may be a mobile base station with a moving coverage area. The base station may be in space, for example, on board a satellite. For example, WiFi and other standards may use the term access point. As another example, the Third-Generation Partnership Project (3GPP) has produced specifications for three generations of mobile networks, each of which uses different terminology. Third Generation (3G) and/or Universal Mobile Telecommunications System (UMTS) standards may use the term Node B. 4G, Long Term Evolution (LTE), and/or Evolved Universal Terrestrial Radio Access (E-UTRA) standards may use the term Evolved Node B (eNB). 5G and/or New Radio (NR) standards may describe AN 102 as a next-generation radio access network (NG-RAN) and may refer to base stations as Next Generation eNB (ng-eNB) and/or Generation Node B (gNB). Future standards (for example, 6G, 7G, 8G) may use new terminology to refer to the elements which implement the methods described in the present disclosure (e.g., wireless devices, base stations, ANs, CNs, and/or components thereof). A base station may be implemented as a repeater or relay node used to extend the coverage area of a donor node. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The AN 102 may include one or more base stations, each having one or more coverage areas. The geographical size and/or extent of a coverage area may be defined in terms of a range at which a receiver of AN 102 can successfully receive transmissions from a transmitter (e.g., wireless device 101) operating within the coverage area (and/or vice-versa). The coverage areas may be referred to as sectors or cells (although in some contexts, the term cell refers to the carrier frequency used in a particular coverage area, rather than the coverage area itself). Base stations with large coverage areas may be referred to as macrocell base stations. Other base stations cover smaller areas, for example, to provide coverage in areas with weak macrocell coverage, or to provide additional coverage in areas with high traffic (sometimes referred to as hotspots). Examples of small cell base stations include, in order of decreasing coverage area, microcell base stations, picocell base stations, and femtocell base stations or home base stations. Together, the coverage areas of the base stations may provide radio coverage to wireless device 101 over a wide geographic area to support wireless device mobility.

A base station may include one or more sets of antennas for communicating with the wireless device 101 over the air interface. Each set of antennas may be separately controlled by the base station. Each set of antennas may have a corresponding coverage area. As an example, a base station may include three sets of antennas to respectively control three coverage areas on three different sides of the base station. The entirety of the base station (and its corresponding antennas) may be deployed at a single location. Alternatively, a controller at a central location may control one or more sets of antennas at one or more distributed locations. The controller may be, for example, a baseband processing unit that is part of a centralized or cloud RAN architecture. The baseband processing unit may be either centralized in a pool of baseband processing units or virtualized. A set of antennas at a distributed location may be referred to as a remote radio head (RRH).

FIG. 1B illustrates another example communication network 150 in which embodiments of the present disclosure may be implemented. The communication network 150 may comprise, for example, a PLMN run by a network operator. As illustrated in FIG. 1B, communication network 150 includes UEs 151, a next generation radio access network (NG-RAN) 152, a 5G core network (5G-CN) 155, and one or more DNs 158. The NG-RAN 152 includes one or more base stations, illustrated as generation node Bs (gNBs) 152A and next generation evolved Node Bs (ng eNBs) 152B. The 5G-CN 155 includes one or more network functions (NFs), including control plane functions 155A and user plane functions 155B. The one or more DNs 158 may comprise public DNs (e.g., the Internet), private DNs, and/or intra-operator DNs. Relative to corresponding components illustrated in FIG. 1A, these components may represent specific implementations and/or terminology.

The base stations of the NG-RAN 152 may be connected to the UEs 151 via Uu interfaces. The base stations of the NG-RAN 152 may be connected to each other via Xn interfaces. The base stations of the NG-RAN 152 may be connected to 5G CN 155 via NG interfaces. The Uu interface may include an air interface. The NG and Xn interfaces may include an air interface, or may consist of direct physical connections and/or indirect connections over an underlying transport network (e.g., an internet protocol (IP) transport network).

Each of the Uu, Xn, and NG interfaces may be associated with a protocol stack. The protocol stacks may include a user plane (UP) and a control plane (CP). Generally, user plane data may include data pertaining to users of the UEs 151, for example, internet content downloaded via a web browser application, sensor data uploaded via a tracking application, or email data communicated to or from an email server. Control plane data, by contrast, may comprise signaling and messages that facilitate packaging and routing of user plane data so that it can be exchanged with the DN(s). The NG interface, for example, may be divided into an NG user plane interface (NG-U) and an NG control plane interface (NG-C). The NG-U interface may provide delivery of user plane data between the base stations and the one or more user plane network functions 155B. The NG-C interface may be used for control signaling between the base stations and the one or more control plane network functions 155A. The NG-C interface may provide, for example, NG interface management, UE context management, UE mobility management, transport of NAS messages, paging, PDU session management, and configuration transfer and/or warning message transmission. In some cases, the NG-C interface may support transmission of user data (for example, a small data transmission for an IoT device).

One or more of the base stations of the NG-RAN 152 may be split into a central unit (CU) and one or more distributed units (DUs). A CU may be coupled to one or more DUs via an F1 interface. The CU may handle one or more upper layers in the protocol stack and the DU may handle one or more lower layers in the protocol stack. For example, the CU may handle RRC, PDCP, and SDAP, and the DU may handle RLC, MAC, and PHY. The one or more DUs may be in geographically diverse locations relative to the CU and/or each other. Accordingly, the CU/DU split architecture may permit increased coverage and/or better coordination.

The gNBs 152A and ng-eNBs 152B may provide different user plane and control plane protocol termination towards the UEs 151. For example, the gNB 154A may provide new radio (NR) protocol terminations over a Uu interface associated with a first protocol stack. The ng-eNBs 152B may provide Evolved UMTS Terrestrial Radio Access (E-UTRA) protocol terminations over a Uu interface associated with a second protocol stack.

The 5G-CN 155 may authenticate UEs 151, set up end-to-end connections between UEs 151 and the one or more DNs 158, and provide charging functionality. The 5G-CN 155 may be based on a service-based architecture, in which the NFs making up the 5G-CN 155 offer services to each other and to other elements of the communication network 150 via interfaces. The 5G-CN 155 may include any number of other NFs and any number of instances of each NF.

FIG. 2A, FIG. 2B, FIG. 2C, and FIG. 2D illustrate various examples of a framework for a service-based architecture within a core network. In a service-based architecture, a service may be sought by a service consumer and provided by a service producer. Prior to obtaining a particular service, an NF may determine where such as service can be obtained. To discover a service, the NF may communicate with a network repository function (NRF). As an example, an NF that provides one or more services may register with a network repository function (NRF). The NRF may store data relating to the one or more services that the NF is prepared to provide to other NFs in the service-based architecture. A consumer NF may query the NRF to discover a producer NF (for example, by obtaining from the NRF a list of NF instances that provide a particular service).

Figures 2A, 2B, 2C, 2D:
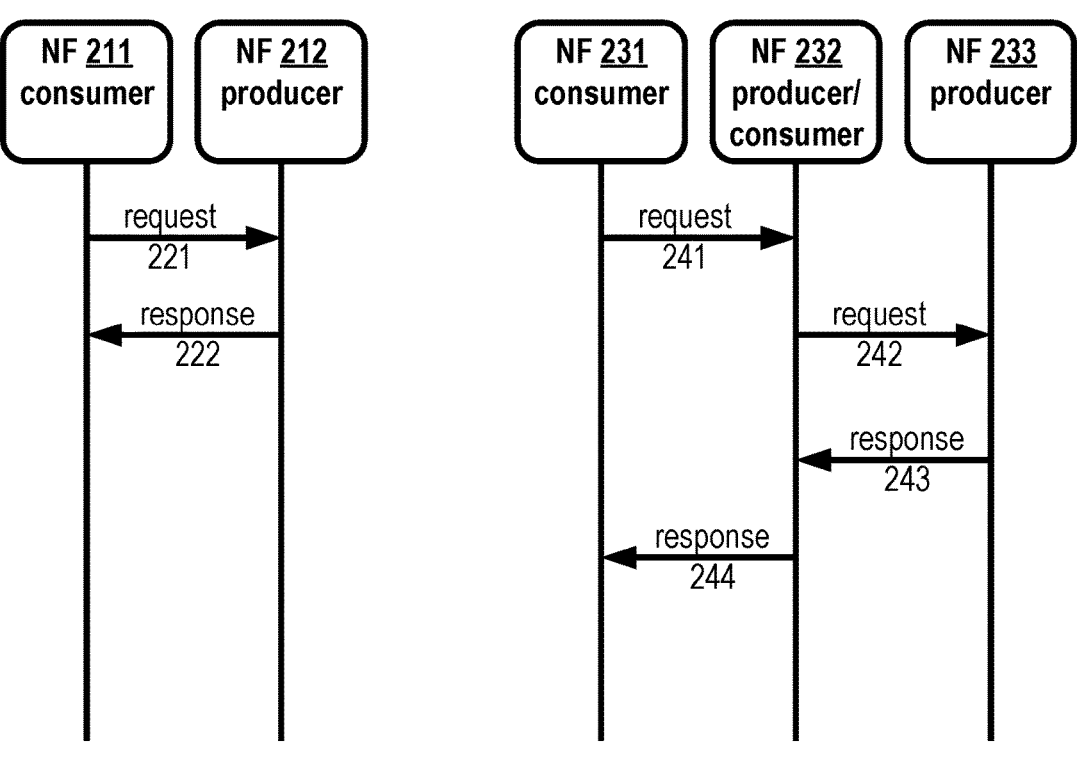
FIG. 2A, FIG. 2B, FIG. 2C, and FIG. 2D illustrate various examples of a framework for a service-based architecture within a core network.

In the example of FIG. 2A, an NF 211 (a consumer NF in this example) may send a request 221 to an NF 212 (a producer NF). The request 221 may be a request for a particular service and may be sent based on a discovery that NF 212 is a producer of that service. The request 221 may comprise data relating to NF 211 and/or the requested service. The NF 212 may receive request 221, perform one or more actions associated with the requested service (e.g., retrieving data), and provide a response 221. The one or more actions performed by the NF 212 may be based on request data included in the request 221, data stored by NF 212, and/or data retrieved by NF 212. The response 222 may notify NF 211 that the one or more actions have been completed. The response 222 may comprise response data relating to NF 212, the one or more actions, and/or the requested service.

In the example of FIG. 2B, an NF 231 sends a request 241 to an NF 232. In this example, part of the service produced by NF 232 is to send a request 242 to an NF 233. The NF 233 may perform one or more actions and provide a response 243 to NF 232. Based on response 243, NF 232 may send a response 244 to NF 231. It will be understood from FIG. 2B that a single NF may perform the role of producer of services, consumer of services, or both. A particular NF service may include any number of nested NF services produced by one or more other NFs.

FIG. 2C illustrates examples of subscribe-notify interactions between a consumer NF and a producer NF. In FIG. 2C, an NF 251 sends a subscription 261 to an NF 252. An NF 253 sends a subscription 262 to the NF 252. Two NFs are shown in FIG. 2C for illustrative purposes (to demonstrate that the NF 252 may provide multiple subscription services to different NFs), but it will be understood that a subscribe-notify interaction only requires one subscriber. The NFs 251, 253 may be independent from one another. For example, the NFs 251, 253 may independently discover NF 252 and/or independently determine to subscribe to the service offered by NF 252. In response to receipt of a subscription, the NF 252 may provide a notification to the subscribing NF. For example, NF 252 may send a notification 263 to NF 251 based on subscription 261 and may send a notification 264 to NF 253 based on subscription 262.

As shown in the example illustration of FIG. 2C, the sending of the notifications 263, 264 may be based on a determination that a condition has occurred. For example, the notifications 263, 264 may be based on a determination that a particular event has occurred, a determination that a particular condition is outstanding, and/or a determination that a duration of time associated with the subscription has elapsed (for example, a period associated with a subscription for periodic notifications). As shown in the example illustration of FIG. 2C, NF 252 may send notifications 263, 264 to NFs 251, 253 simultaneously and/or in response to the same condition. However, it will be understood that the NF 252 may provide notifications at different times and/or in response to different notification conditions. In an example, the NF 251 may request a notification when a certain parameter, as measured by the NF 252, exceeds a first threshold, and the NF 252 may request a notification when the parameter exceeds a second threshold different from the first threshold. In an example, a parameter of interest and/or a corresponding threshold may be indicated in the subscriptions 261, 262.

FIG. 2D illustrates another example of a subscribe-notify interaction. In FIG. 2D, an NF 271 sends a subscription 281 to an NF 272. In response to receipt of subscription 281 and/or a determination that a notification condition has occurred, NF 272 may send a notification 284. The notification 284 may be sent to an NF 273. Unlike the example in FIG. 2C (in which a notification is sent to the subscribing NF), FIG. 2D demonstrates that a subscription and its corresponding notification may be associated with different NFs. For example, NF 271 may subscribe to the service provided by NF 272 on behalf of NF 273.

Figure 3:
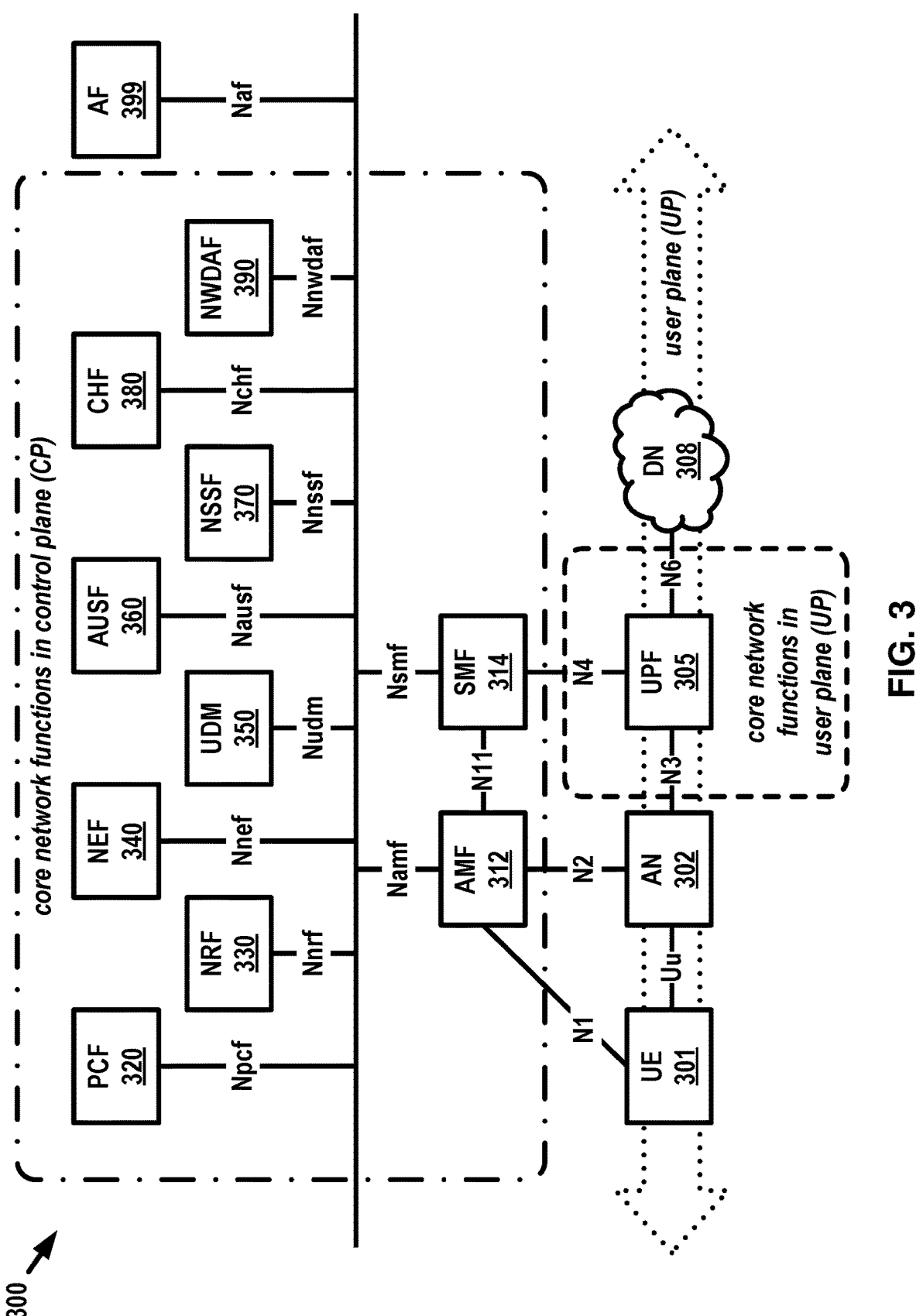
FIG. 3 illustrates an example communication network including core network functions.

FIG. 3 illustrates another example communication network 300 in which embodiments of the present disclosure may be implemented. Communication network 300 includes a user equipment (UE) 301, an access network (AN) 302, and a data network (DN) 308. The remaining elements depicted in FIG. 3 may be included in and/or associated with a core network. Each element of the core network may be referred to as a network function (NF).

The NFs depicted in FIG. 3 include a user plane function (UPF) 305, an access and mobility management function (AMF) 312, a session management function (SMF) 314, a policy control function (PCF) 320, a network repository function (NRF) 330, a network exposure function (NEF) 340, a unified data management (UDM) 350, an authentication server function (AUSF) 360, a network slice selection function (NSSF) 370, a charging function (CHF) 380, a network data analytics function (NWDAF) 390, and an application function (AF) 399. The UPF 305 may be a user-plane core network function, whereas the NFs 312, 314, and 320-390 may be control-plane core network functions. Although not shown in the example of FIG. 3, the core network may include additional instances of any of the NFs depicted and/or one or more different NF types that provide different services. Other examples of NF type include a gateway mobile location center (GMLC), a location management function (LMF), an operations, administration, and maintenance function (OAM), a public warning system (PWS), a short message service function (SMSF), a unified data repository (UDR), and an unstructured data storage function (UDSF).

Each element depicted in FIG. 3 has an interface with at least one other element. The interface may be a logical connection rather than, for example, a direct physical connection. Any interface may be identified using a reference point representation and/or a service-based representation. In a reference point representation, the letter 'N' is followed by a numeral, indicating an interface between two specific elements. For example, as shown in FIG. 3, AN 302 and UPF 305 interface via 'N3', whereas UPF 305 and DN 308 interface via 'N6'. By contrast, in a service-based representation, the letter 'N' is followed by letters. The letters identify an NF that provides services to the core network. For example, PCF 320 may provide services via interface 'Npcf'. The PCF 320 may provide services to any NF in the core network via 'Npcf'. Accordingly, a service-based representation may correspond to a bundle of reference point representations. For example, the Npcf interface between PCF 320 and the core network generally may correspond to an N7 interface between PCF 320 and SMF 314, an N30 interface between PCF 320 and NEF 340, etc.

The UPF 305 may serve as a gateway for user plane traffic between AN 302 and DN 308. The UE 301 may connect to UPF 305 via a Uu interface and an N3 interface (also described as NG-U interface). The UPF 305 may connect to DN 308 via an N6 interface. The UPF 305 may connect to one or more other UPFs (not shown) via an N9 interface. The UE 301 may be configured to receive services through a protocol data unit (PDU) session, which is a logical connection between UE 301 and DN 308. The UPF 305 (or a plurality of UPFs if desired) may be selected by SMF 314 to handle a particular PDU session between UE 301 and DN 308. The SMF 314 may control the functions of UPF 305 with respect to the PDU session. The SMF 314 may connect to UPF 305 via an N4 interface. The UPF 305 may handle any number of PDU sessions associated with any number of UEs (via any number of ANs). For purposes of handling the one or more PDU sessions, UPF 305 may be controlled by any number of SMFs via any number of corresponding N4 interfaces.

The AMF 312 depicted in FIG. 3 may control UE access to the core network. The UE 301 may register with the network via AMF 312. It may be necessary for UE 301 to register prior to establishing a PDU session. The AMF 312 may manage a registration area of UE 301, enabling the network to track the physical location of UE 301 within the network. For a UE in connected mode, AMF 312 may manage UE mobility, for example, handovers from one AN or portion thereof to another. For a UE in idle mode, AMF 312 may perform registration updates and/or page the UE to transition the UE to connected mode.

The AMF 312 may receive, from UE 301, non-access stratum (NAS) messages transmitted in accordance with NAS protocol. NAS messages relate to communications between UE 301 and the core network. Although NAS messages may be relayed to AMF 312 via AN 302, they may be described as communications via the N1 interface. NAS messages may facilitate UE registration and mobility management, for example, by authenticating, identifying, configuring, and/or managing a connection of UE 301. NAS messages may support session management procedures for maintaining user plane connectivity and quality of service (QoS) of a session between UE 301 and DN 309. If the NAS message involves session management, AMF 312 may send the NAS message to SMF 314. NAS messages may be used to transport messages between UE 301 and other components of the core network (e.g., core network components other than AMF 312 and SMF 314). The AMF 312 may act on a particular NAS message itself, or alternatively, forward the NAS message to an appropriate core network function (e.g., SMF 314, etc.)

The SMF 314 depicted in FIG. 3 may establish, modify, and/or release a PDU session based on messaging received UE 301. The SMF 314 may allocate, manage, and/or assign an IP address to UE 301, for example, upon establishment of a PDU session. There may be multiple SMFs in the network, each of which may be associated with a respective group of wireless devices, base stations, and/or UPFs. A UE with multiple PDU sessions may be associated with a different SMF for each PDU session. As noted above, SMF 314 may select one or more UPFs to handle a PDU session and may control the handling of the PDU session by the selected UPF by providing rules for packet handling (PDR, FAR, QER, etc.). Rules relating to QoS and/or charging for a particular PDU session may be obtained from PCF 320 and provided to UPF 305.

The PCF 320 may provide, to other NFs, services relating to policy rules. The PCF 320 may use subscription data and information about network conditions to determine policy rules and then provide the policy rules to a particular NF which may be responsible for enforcement of those rules. Policy rules may relate to policy control for access and mobility, and may be enforced by the AMF. Policy rules may relate to session management, and may be enforced by the SMF 314. Policy rules may be, for example, network-specific, wireless device-specific, session-specific, or data flow-specific.

The NRF 330 may provide service discovery. The NRF 330 may belong to a particular PLMN. The NRF 330 may maintain NF profiles relating to other NFs in the communication network 300. The NF profile may include, for example, an address, PLMN, and/or type of the NF, a slice identifier, a list of the one or more services provided by the NF, and the authorization required to access the services.

The NEF 340 depicted in FIG. 3 may provide an interface to external domains, permitting external domains to selectively access the control plane of the communication network 300. The external domain may comprise, for example, third-party network functions, application functions, etc. The NEF 340 may act as a proxy between external elements and network functions such as AMF 312, SMF 314, PCF 320, UDM 350, etc. As an example, NEF 340 may determine a location or reachability status of UE 301 based on reports from AMF 312, and provide status information to an external element. As an example, an external element may provide, via NEF 340, information that facilitates the setting of parameters for establishment of a PDU session. The NEF 340 may determine which data and capabilities of the control plane are exposed to the external domain. The NEF 340 may provide secure exposure that authenticates and/or authorizes an external entity to which data or capabilities of the communication network 300 are exposed. The NEF 340 may selectively control the exposure such that the internal architecture of the core network is hidden from the external domain.

The UDM 350 may provide data storage for other NFs. The UDM 350 may permit a consolidated view of network information that may be used to ensure that the most relevant information can be made available to different NFs from a single resource. The UDM 350 may store and/or retrieve information from a unified data repository (UDR). For example, UDM 350 may obtain user subscription data relating to UE 301 from the UDR.

The AUSF 360 may support mutual authentication of UE 301 by the core network and authentication of the core network by UE 301. The AUSF 360 may perform key agreement procedures and provide keying material that can be used to improve security.

The NSSF 370 may select one or more network slices to be used by the UE 301. The NSSF 370 may select a slice based on slice selection information. For example, the NSSF 370 may receive Single Network Slice Selection Assistance Information (S-NSSAI) and map the S-NSSAI to a network slice instance identifier (NSI).

The CHF 380 may control network billing-related tasks associated with UE 301. For example, UPF 305 may report traffic usage associated with UE 301 to SMF 314. The SMF 314 may collect usage data from UPF 305 and one or more other UPFs. The usage data may indicate how much data is exchanged, what DN the data is exchanged with, a network slice associated with the data, or any other information that may influence billing. The SMF 314 may share the collected usage data with the CHF. The CHF may use the collected usage data to perform billing-related tasks associated with UE 301. The CHF may, depending on the billing status of UE 301, instruct SMF 314 to limit or influence access of UE 301 and/or to provide billing-related notifications to UE 301.

The NWDAF 390 may collect and analyze data from other network functions and offer data analysis services to other network functions. As an example, NWDAF 390 may collect data relating to a load level for a particular network slice instance from UPF 305, AMF 312, and/or SMF 314. Based on the collected data, NWDAF 390 may provide load level data to the PCF 320 and/or NSSF 370, and/or notify the PC220 and/or NSSF 370 if load level for a slice reaches and/or exceeds a load level threshold.

The AF 399 may be outside the core network, but may interact with the core network to provide information relating to the QoS requirements or traffic routing preferences associated with a particular application. The AF 399 may access the core network based on the exposure constraints imposed by the NEF 340. However, an operator of the core network may consider the AF 399 to be a trusted domain that can access the network directly.

Figure 4A:
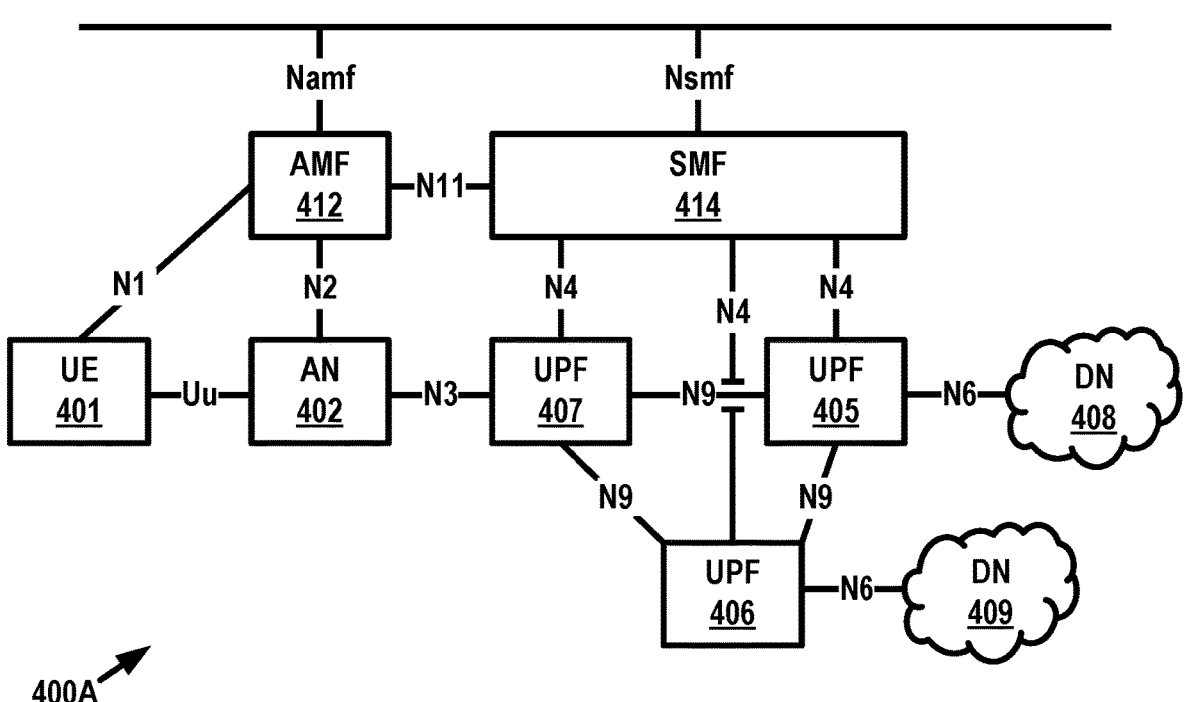
FIG. 4A and FIG. 4B illustrate example of core network architecture with multiple user plane functions and untrusted access.
Figure 4B:
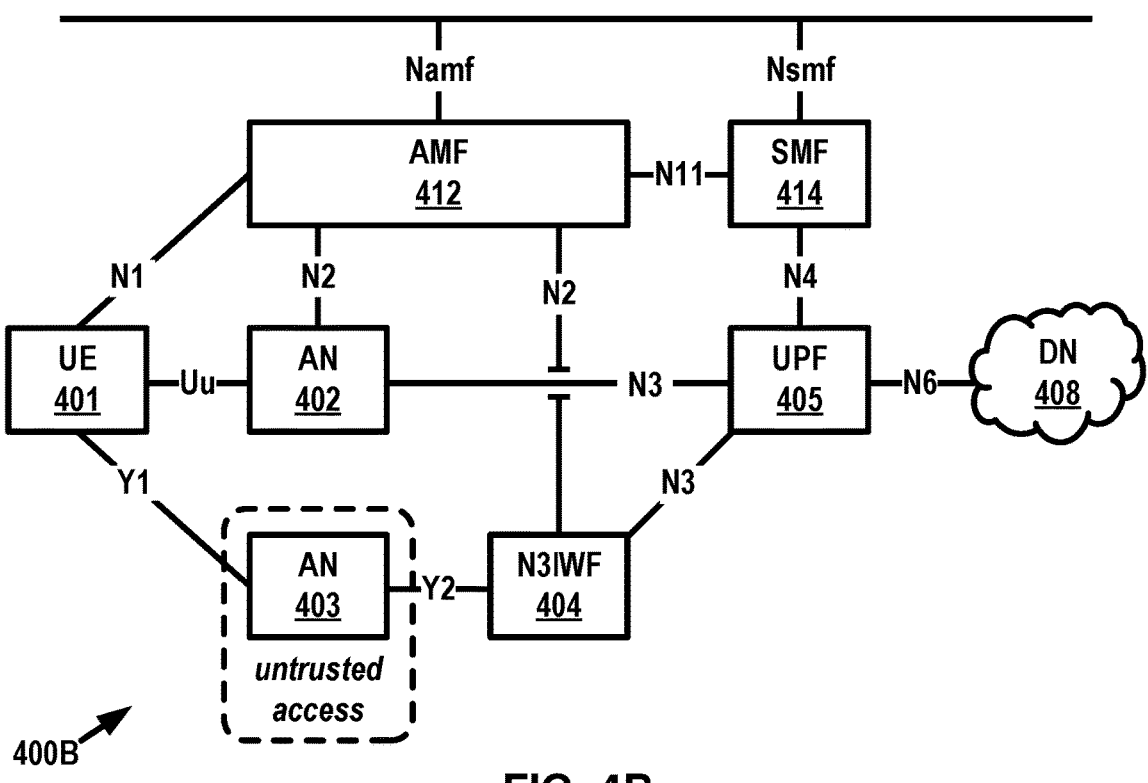
Figure 5:
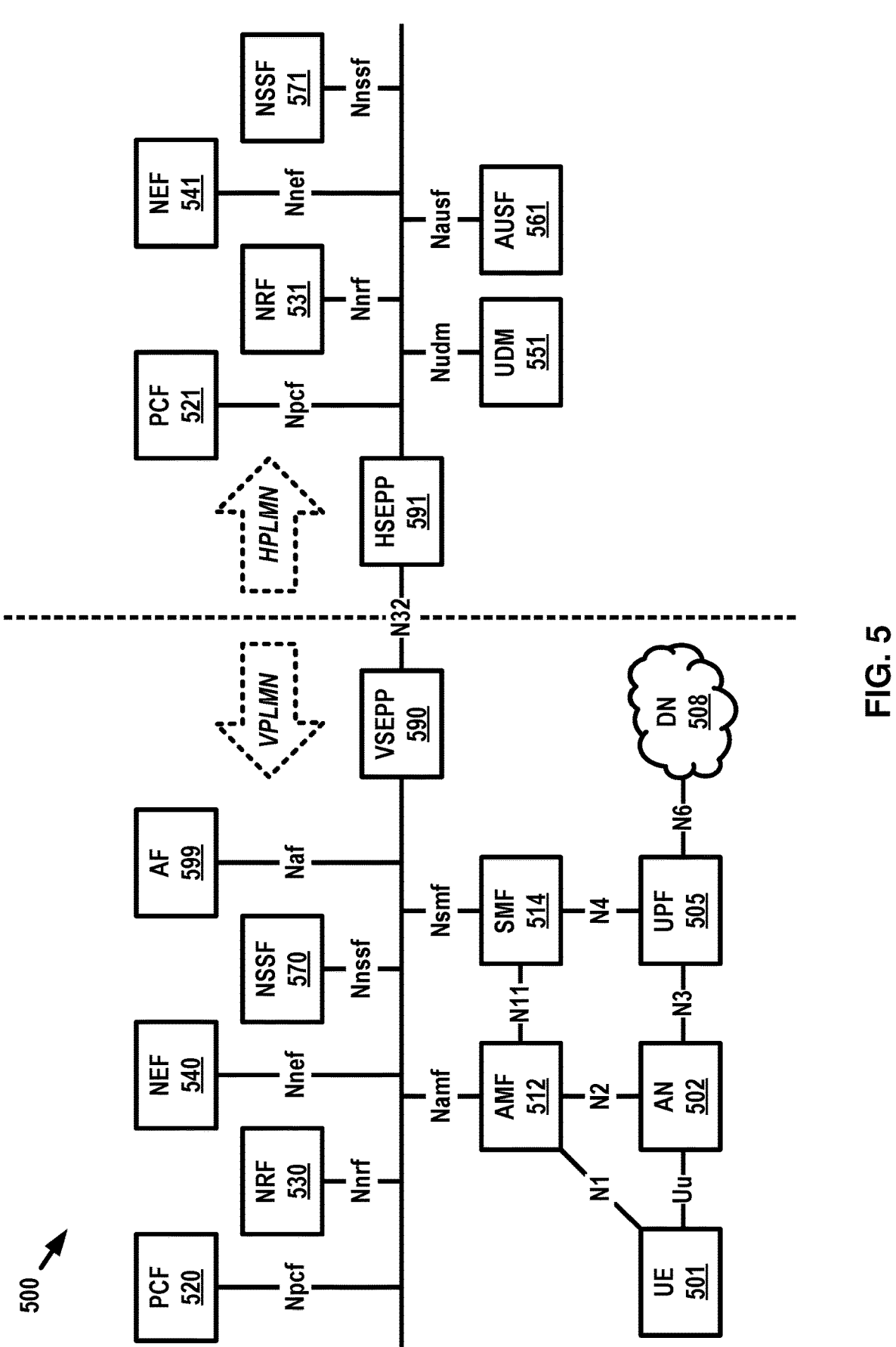
FIG. 5 illustrates an example of a core network architecture for a roaming scenario.

FIGS. 4A, 4B, and 5 illustrate other examples of core network architectures that are analogous in some respects to the core network architecture 300 depicted in FIG. 3. For conciseness, some of the core network elements depicted in FIG. 3 are omitted. Many of the elements depicted in FIGS. 4A, 4B, and 5 are analogous in some respects to elements depicted in FIG. 3. For conciseness, some of the details relating to their functions or operation are omitted.

FIG. 4A illustrates an example of a core network architecture 400A comprising an arrangement of multiple UPFs. Core network architecture 400A includes a UE 401, an AN 402, an AMF 412, and an SMF 414. Unlike previous examples of core network architectures described above, FIG. 4A depicts multiple UPFs, including a UPF 405, a UPF 406, and a UPF 407, and multiple DNs, including a DN 408 and a DN 409. Each of the multiple UPFs 405, 406, 407 may communicate with the SMF 414 via an N4 interface. The DNs 408, 409 communicate with the UPFs 405, 406, respectively, via N6 interfaces. As shown in FIG. 4A, the multiple UPFs 405, 406, 407 may communicate with one another via N9 interfaces.

The UPFs 405, 406, 407 may perform traffic detection, in which the UPFs identify and/or classify packets. Packet identification may be performed based on packet detection rules (PDR) provided by the SMF 414. A PDR may include packet detection information comprising one or more of: a source interface, a UE IP address, core network (CN) tunnel information (e.g., a CN address of an N3/N9 tunnel corresponding to a PDU session), a network instance identifier, a quality of service flow identifier (QFI), a filter set (for example, an IP packet filter set or an ethernet packet filter set), and/or an application identifier.

In addition to indicating how a particular packet is to be detected, a PDR may further indicate rules for handling the packet upon detection thereof. The rules may include, for example, forwarding action rules (FARs), multi-access rules (MARs), usage reporting rules (URRs), QoS enforcement rules (QERs), etc. For example, the PDR may comprise one or more FAR identifiers, MAR identifiers, URR identifiers, and/or QER identifiers. These identifiers may indicate the rules that are prescribed for the handling of a particular detected packet.

The UPF 405 may perform traffic forwarding in accordance with a FAR. For example, the FAR may indicate that a packet associated with a particular PDR is to be forwarded, duplicated, dropped, and/or buffered. The FAR may indicate a destination interface, for example, "access" for downlink or "core" for uplink. If a packet is to be buffered, the FAR may indicate a buffering action rule (BAR). As an example, UPF 405 may perform data buffering of a certain number downlink packets if a PDU session is deactivated.

The UPF 405 may perform QoS enforcement in accordance with a QER. For example, the QER may indicate a guaranteed bitrate that is authorized and/or a maximum bitrate to be enforced for a packet associated with a particular PDR. The QER may indicate that a particular guaranteed and/or maximum bitrate may be for uplink packets and/or downlink packets. The UPF 405 may mark packets belonging to a particular QoS flow with a corresponding QFI. The marking may enable a recipient of the packet to determine a QoS of the packet.

The UPF 405 may provide usage reports to the SMF 414 in accordance with a URR. The URR may indicate one or more triggering conditions for generation and reporting of the usage report, for example, immediate reporting, periodic reporting, a threshold for incoming uplink traffic, or any other suitable triggering condition. The URR may indicate a method for measuring usage of network resources, for example, data volume, duration, and/or event.

As noted above, the DNs 408, 409 may comprise public DNs (e.g., the Internet), private DNs (e.g., private, internal corporate-owned DNs), and/or intra-operator DNs. Each DN may provide an operator service and/or a third-party service. The service provided by a DN may be the Internet, an IP multimedia subsystem (IMS), an augmented or virtual reality network, an edge computing or mobile edge computing (MEC) network, etc. Each DN may be identified using a data network name (DNN). The UE 401 may be configured to establish a first logical connection with DN 408 (a first PDU session), a second logical connection with DN 409 (a second PDU session), or both simultaneously (first and second PDU sessions).

Each PDU session may be associated with at least one UPF configured to operate as a PDU session anchor (PSA, or "anchor"). The anchor may be a UPF that provides an N6 interface with a DN.

In the example of FIG. 4A, UPF 405 may be the anchor for the first PDU session between UE 401 and DN 408, whereas the UPF 406 may be the anchor for the second PDU session between UE 401 and DN 409. The core network may use the anchor to provide service continuity of a particular PDU session (for example, IP address continuity) as UE 401 moves from one access network to another. For example, suppose that UE 401 establishes a PDU session using a data path to the DN 408 using an access network other than AN 402. The data path may include UPF 405 acting as anchor. Suppose further that the UE 401 later moves into the coverage area of the AN 402. In such a scenario, SMF 414 may select a new UPF (UPF 407) to bridge the gap between the newly-entered access network (AN 402) and the anchor UPF (UPF 405). The continuity of the PDU session may be preserved as any number of UPFs are added or removed from the data path. When a UPF is added to a data path, as shown in FIG. 4A, it may be described as an intermediate UPF and/or a cascaded UPF.

As noted above, UPF 406 may be the anchor for the second PDU session between UE 401 and DN 409. Although the anchor for the first and second PDU sessions are associated with different UPFs in FIG. 4A, it will be understood that this is merely an example. It will also be understood that multiple PDU sessions with a single DN may correspond to any number of anchors. When there are multiple UPFs, a UPF at the branching point (UPF 407 in FIG. 4) may operate as an uplink classifier (UL-CL). The UL-CL may divert uplink user plane traffic to different UPFs.

The SMF 414 may allocate, manage, and/or assign an IP address to UE 401, for example, upon establishment of a PDU session. The SMF 414 may maintain an internal pool of IP addresses to be assigned. The SMF 414 may, if necessary, assign an IP address provided by a dynamic host configuration protocol (DHCP) server or an authentication, authorization, and accounting (AAA) server. IP address management may be performed in accordance with a session and service continuity (SSC) mode. In SSC mode 1, an IP address of UE 401 may be maintained (and the same anchor UPF may be used) as the wireless device moves within the network. In SSC mode 2, the IP address of UE 401 changes as UE 401 moves within the network (e.g., the old IP address and UPF may be abandoned and a new IP address and anchor UPF may be established). In SSC mode 3, it may be possible to maintain an old IP address (similar to SSC mode 1) temporarily while establishing a new IP address (similar to SSC mode 2), thus combining features of SSC modes 1 and 2. Applications that are sensitive to IP address changes may operate in accordance with SSC mode 1.

UPF selection may be controlled by SMF 414. For example, upon establishment and/or modification of a PDU session between UE 401 and DN 408, SMF 414 may select UPF 405 as the anchor for the PDU session and/or UPF 407 as an intermediate UPF. Criteria for UPF selection include path efficiency and/or speed between AN 402 and DN 408. The reliability, load status, location, slice support and/or other capabilities of candidate UPFs may also be considered.

FIG. 4B illustrates an example of a core network architecture 400B that accommodates untrusted access. Similar to FIG. 4A, UE 401 as depicted in FIG. 4B connects to DN 408 via AN 402 and UPF 405. The AN 402 and UPF 405 constitute trusted (e.g., 3GPP) access to the DN 408. By contrast, UE 401 may also access DN 408 using an untrusted access network, AN 403, and a non-3GPP interworking function (N3IWF) 404.

The AN 403 may be, for example, a wireless land area network (WLAN) operating in accordance with the IEEE 802.11 standard. The UE 401 may connect to AN 403, via an interface Y1, in whatever manner is prescribed for AN 403. The connection to AN 403 may or may not involve authentication. The UE 401 may obtain an IP address from AN 403. The UE 401 may determine to connect to core network 400B and select untrusted access for that purpose. The AN 403 may communicate with N3IWF 404 via a Y2 interface. After selecting untrusted access, the UE 401 may provide N3IWF 404 with sufficient information to select an AMF. The selected AMF may be, for example, the same AMF that is used by UE 401 for 3GPP access (AMF 412 in the present example). The N3IWF 404 may communicate with AMF 412 via an N2 interface. The UPF 405 may be selected and N3IWF 404 may communicate with UPF 405 via an N3 interface. The UPF 405 may be a PDU session anchor (PSA) and may remain the anchor for the PDU session even as UE 401 shifts between trusted access and untrusted access.

FIG. 5 illustrates an example of a core network architecture 500 in which a UE 501 is in a roaming scenario. In a roaming scenario, UE 501 is a subscriber of a first PLMN (a home PLMN, or HPLMN) but attaches to a second PLMN (a visited PLMN, or VPLMN). Core network architecture 500 includes UE 501, an AN 502, a UPF 505, and a DN 508. The AN 502 and UPF 505 may be associated with a VPLMN. The VPLMN may manage the AN 502 and UPF 505 using core network elements associated with the VPLMN, including an AMF 512, an SMF 514, a PCF 520, an NRF 530, an NEF 540, and an NSSF 570. An AF 599 may be adjacent the core network of the VPLMN.

The UE 501 may not be a subscriber of the VPLMN. The AMF 512 may authorize UE 501 to access the network based on, for example, roaming restrictions that apply to UE 501. In order to obtain network services provided by the VPLMN, it may be necessary for the core network of the VPLMN to interact with core network elements of a HPLMN of UE 501, in particular, a PCF 521, an NRF 531, an NEF 541, a UDM 551, and/or an AUSF 561. The VPLMN and HPLMN may communicate using an N32 interface connecting respective security edge protection proxies (SEPPs). In FIG. 5, the respective SEPPs are depicted as a VSEPP 590 and an HSEPP 591.

The VSEPP 590 and the HSEPP 591 communicate via an N32 interface for defined purposes while concealing information about each PLMN from the other. The SEPPs may apply roaming policies based on communications via the N32 interface. The PCF 520 and PCF 521 may communicate via the SEPPs to exchange policy-related signaling. The NRF 530 and NRF 531 may communicate via the SEPPs to enable service discovery of NFs in the respective PLMNs. The VPLMN and HPLMN may independently maintain NEF 540 and NEF 541. The NSSF 570 and NSSF 571 may communicate via the SEPPs to coordinate slice selection for UE 501. The HPLMN may handle all authentication and subscription related signaling. For example, when the UE 501 registers or requests service via the VPLMN, the VPLMN may authenticate UE 501 and/or obtain subscription data of UE 501 by accessing, via the SEPPs, the UDM 551 and AUSF 561 of the HPLMN.

The core network architecture 500 depicted in FIG. 5 may be referred to as a local breakout configuration, in which UE 501 accesses DN 508 using one or more UPFs of the VPLMN (i.e., UPF 505). However, other configurations are possible. For example, in a home-routed configuration (not shown in FIG. 5), UE 501 may access a DN using one or more UPFs of the HPLMN. In the home-routed configuration, an N9 interface may run parallel to the N32 interface, crossing the frontier between the VPLMN and the HPLMN to carry user plane data. One or more SMFs of the respective PLMNs may communicate via the N32 interface to coordinate session management for UE 501. The SMFs may control their respective UPFs on either side of the frontier.

Figure 6:
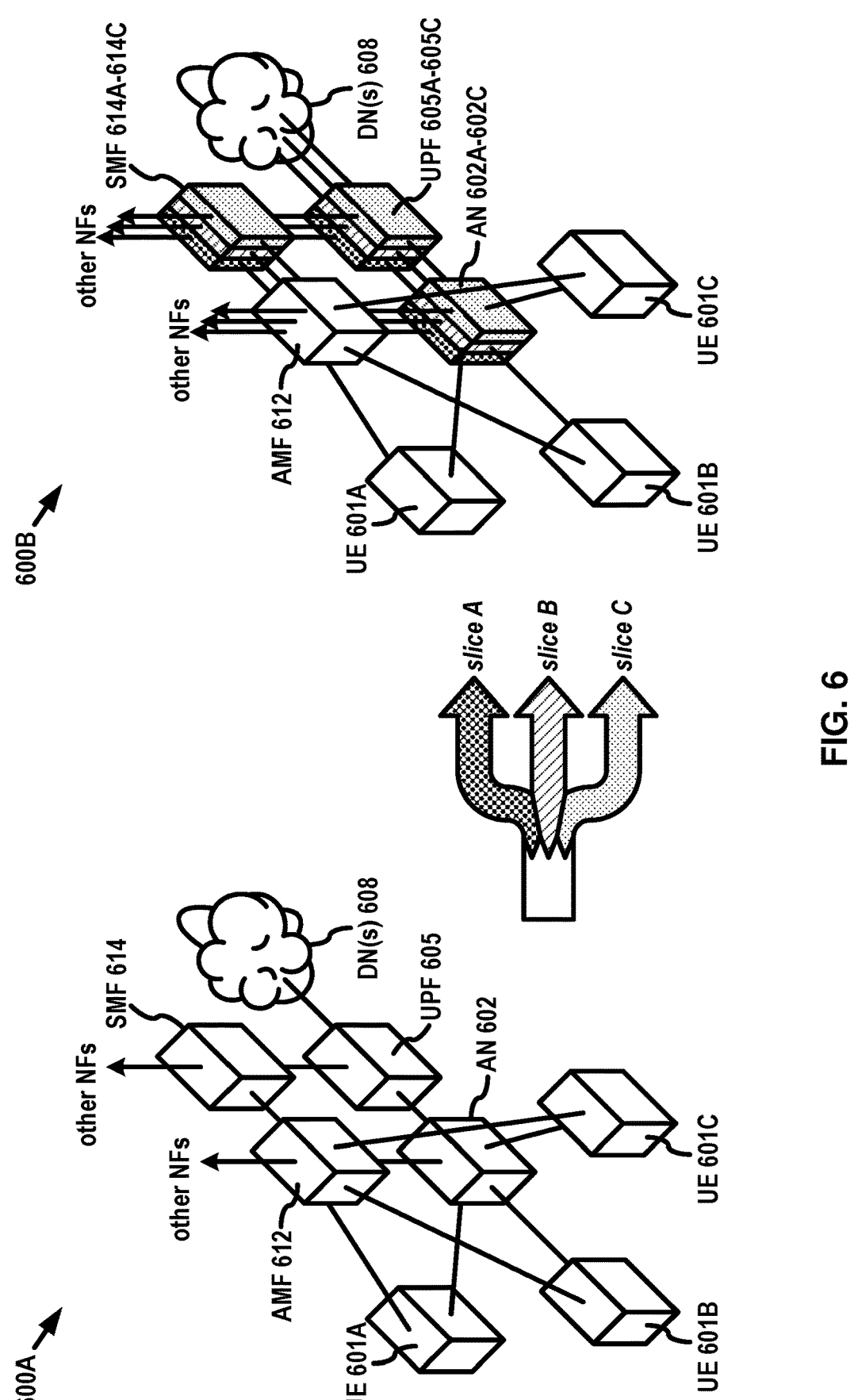
FIG. 6 illustrates an example of network slicing.

FIG. 6 illustrates an example of network slicing. Network slicing may refer to division of shared infrastructure (e.g., physical infrastructure) into distinct logical networks. These distinct logical networks may be independently controlled, isolated from one another, and/or associated with dedicated resources.

Network architecture 600A illustrates an un-sliced physical network corresponding to a single logical network. The network architecture 600A comprises a user plane wherein UEs 601A, 601B, 601C (collectively, UEs 601) have a physical and logical connection to a DN 608 via an AN 602 and a UPF 605. The network architecture 600A comprises a control plane wherein an AMF 612 and a SMF 614 control various aspects of the user plane.

The network architecture 600A may have a specific set of characteristics (e.g., relating to maximum bit rate, reliability, latency, bandwidth usage, power consumption, etc.). This set of characteristics may be affected by the nature of the network elements themselves (e.g., processing power, availability of free memory, proximity to other network elements, etc.) or the management thereof (e.g., optimized to maximize bit rate or reliability, reduce latency or power bandwidth usage, etc.). The characteristics of network architecture 600A may change over time, for example, by upgrading equipment or by modifying procedures to target a particular characteristic. However, at any given time, network architecture 600A will have a single set of characteristics that may or may not be optimized for a particular use case. For example, UEs 601A, 601B, 601C may have different requirements, but network architecture 600A can only be optimized for one of the three.

Network architecture 600B is an example of a sliced physical network divided into multiple logical networks. In FIG. 6, the physical network is divided into three logical networks, referred to as slice A, slice B, and slice C. For example, UE 601A may be served by AN 602A, UPF 605A, AMF 612, and SMF 614A. UE 601B may be served by AN 602B, UPF 605B, AMF 612, and SMF 614B. UE 601C may be served by AN 602C, UPF 605C, AMF 612, and SMF 614C. Although the respective UEs 601 communicate with different network elements from a logical perspective, these network elements may be deployed by a network operator using the same physical network elements.

Each network slice may be tailored to network services having different sets of characteristics. For example, slice A may correspond to enhanced mobile broadband (eMBB) service. Mobile broadband may refer to internet access by mobile users, commonly associated with smartphones. Slice B may correspond to ultra-reliable low-latency communication (URLLC), which focuses on reliability and speed. Relative to eMBB, URLLC may improve the feasibility of use cases such as autonomous driving and telesurgery. Slice C may correspond to massive machine type communication (mMTC), which focuses on low-power services delivered to a large number of users. For example, slice C may be optimized for a dense network of battery-powered sensors that provide small amounts of data at regular intervals. Many mMTC use cases would be prohibitively expensive if they operated using an eMBB or URLLC network.

If the service requirements for one of the UEs 601 changes, then the network slice serving that UE can be updated to provide better service. Moreover, the set of network characteristics corresponding to eMBB, URLLC, and mMTC may be varied, such that differentiated species of eMBB, URLLC, and mMTC are provided. Alternatively, network operators may provide entirely new services in response to, for example, customer demand.

In FIG. 6, each of the UEs 601 has its own network slice. However, it will be understood that a single slice may serve any number of UEs and a single UE may operate using any number of slices. Moreover, in the example network architecture 600B, the AN 602, UPF 605 and SMF 614 are separated into three separate slices, whereas the AMF 612 is unsliced. However, it will be understood that a network operator may deploy any architecture that selectively utilizes any mix of sliced and unsliced network elements, with different network elements divided into different numbers of slices. Although FIG. 6 only depicts three core network functions, it will be understood that other core network functions may be sliced as well. A PLMN that supports multiple network slices may maintain a separate network repository function (NFR) for each slice, enabling other NFs to discover network services associated with that slice.

Network slice selection may be controlled by an AMF, or alternatively, by a separate network slice selection function (NSSF). For example, a network operator may define and implement distinct network slice instances (NSIs). Each NSI may be associated with single network slice selection assistance information (S-NSSAI). The S-NSSAI may include a particular slice/service type (SST) indicator (indicating eMBB, URLLC, mMTC, etc.). as an example, a particular tracking area may be associated with one or more configured S-NSSAIs. UEs may identify one or more requested and/or subscribed S-NSSAIs (e.g., during registration). The network may indicate to the UE one or more allowed and/or rejected S-NSSAIs.

The S-NSSAI may further include a slice differentiator (SD) to distinguish between different tenants of a particular slice and/or service type. For example, a tenant may be a customer (e.g., vehicle manufacture, service provider, etc.) of a network operator that obtains (for example, purchases) guaranteed network resources and/or specific policies for handling its subscribers. The network operator may configure different slices and/or slice types, and use the SD to determine which tenant is associated with a particular slice.

FIG. 7A, FIG. 7B, and FIG. 7C illustrate a user plane (UP) protocol stack, a control plane (CP) protocol stack, and services provided between protocol layers of the UP protocol stack.

The layers may be associated with an open system interconnection (OSI) model of computer networking functionality. In the OSI model, layer 1 may correspond to the bottom layer, with higher layers on top of the bottom layer. Layer 1 may correspond to a physical layer, which is concerned with the physical infrastructure used for transfer of signals (for example, cables, fiber optics, and/or radio frequency transceivers). In New Radio (NR), layer 1 may comprise a physical layer (PHY). Layer 2 may correspond to a data link layer. Layer 2 may be concerned with packaging of data (into, e.g., data frames) for transfer, between nodes of the network, using the physical infrastructure of layer 1. In NR, layer 2 may comprise a media access control layer (MAC), a radio link control layer (RLC), a packet data convergence layer (PDCP), and a service data application protocol layer (SDAP).

Layer 3 may correspond to a network layer. Layer 3 may be concerned with routing of the data which has been packaged in layer 2. Layer 3 may handle prioritization of data and traffic avoidance. In NR, layer 3 may comprise a radio resource control layer (RRC) and a non-access stratum layer (NAS). Layers 4 through 7 may correspond to a transport layer, a session layer, a presentation layer, and an application layer. The application layer interacts with an end user to provide data associated with an application. In an example, an end user implementing the application may generate data associated with the application and initiate sending of that information to a targeted data network (e.g., the Internet, an application server, etc.). Starting at the application layer, each layer in the OSI model may manipulate and/or repackage the information and deliver it to a lower layer. At the lowest layer, the manipulated and/or repackaged information may be exchanged via physical infrastructure (for example, electrically, optically, and/or electromagnetically). As it approaches the targeted data network, the information will be unpackaged and provided to higher and higher layers, until it once again reaches the application layer in a form that is usable by the targeted data network (e.g., the same form in which it was provided by the end user). To respond to the end user, the data network may perform this procedure in reverse.

FIG. 7A illustrates a user plane protocol stack. The user plane protocol stack may be a new radio (NR) protocol stack for a Uu interface between a UE 701 and a gNB 702. In layer 1 of the UP protocol stack, the UE 701 may implement PHY 731 and the gNB 702 may implement PHY 732. In layer 2 of the UP protocol stack, the UE 701 may implement MAC 741, RLC 751, PDCP 761, and SDAP 771. The gNB 702 may implement MAC 742, RLC 752, PDCP 762, and SDAP 772.

FIG. 7B illustrates a control plane protocol stack. The control plane protocol stack may be an NR protocol stack for the Uu interface between the UE 701 and the gNB 702 and/or an N1 interface between the UE 701 and an AMF 712. In layer 1 of the CP protocol stack, the UE 701 may implement PHY 731 and the gNB 702 may implement PHY 732. In layer 2 of the CP protocol stack, the UE 701 may implement MAC 741, RLC 751, PDCP 761, RRC 781, and NAS 791. The gNB 702 may implement MAC 742, RLC 752, PDCP 762, and RRC 782. The AMF 712 may implement NAS 792.

The NAS may be concerned with the non-access stratum, in particular, communication between the UE 701 and the core network (e.g., the AMF 712). Lower layers may be concerned with the access stratum, for example, communication between the UE 701 and the gNB 702. Messages sent between the UE 701 and the core network may be referred to as NAS messages. In an example, a NAS message may be relayed by the gNB 702, but the content of the NAS message (e.g., information elements of the NAS message) may not be visible to the gNB 702.

FIG. 7C illustrates an example of services provided between protocol layers of the NR user plane protocol stack illustrated in FIG. 7A. The UE 701 may receive services through a PDU session, which may be a logical connection between the UE 701 and a data network (DN). The UE 701 and the DN may exchange data packets associated with the PDU session. The PDU session may comprise one or more quality of service (QoS) flows. SDAP 771 and SDAP 772 may perform mapping and/or demapping between the one or more QoS flows of the PDU session and one or more radio bearers (e.g., data radio bearers). The mapping between the QoS flows and the data radio bearers may be determined in the SDAP 772 by the gNB 702, and the UE 701 may be notified of the mapping (e.g., based on control signaling and/or reflective mapping). For reflective mapping, the SDAP 772 of the gNB 220 may mark downlink packets with a QoS flow indicator (QFI) and deliver the downlink packets to the UE 701. The UE 701 may determine the mapping based on the QFI of the downlink packets.

PDCP 761 and PDCP 762 may perform header compression and/or decompression. Header compression may reduce the amount of data transmitted over the physical layer. The PDCP 761 and PDCP 762 may perform ciphering and/or deciphering. Ciphering may reduce unauthorized decoding of data transmitted over the physical layer (e.g., intercepted on an air interface), and protect data integrity (e.g., to ensure control messages originate from intended sources). The PDCP 761 and PDCP 762 may perform retransmissions of undelivered packets, in-sequence delivery and reordering of packets, duplication of packets, and/or identification and removal of duplicate packets. In a dual connectivity scenario, PDCP 761 and PDCP 762 may perform mapping between a split radio bearer and RLC channels.

RLC 751 and RLC 752 may perform segmentation, retransmission through Automatic Repeat Request (ARQ). The RLC 751 and RLC 752 may perform removal of duplicate data units received from MAC 741 and MAC 742, respectively. The RLCs 213 and 223 may provide RLC channels as a service to PDCPs 214 and 224, respectively.

MAC 741 and MAC 742 may perform multiplexing and/or demultiplexing of logical channels. MAC 741 and MAC 742 may map logical channels to transport channels. In an example, UE 701 may, in MAC 741, multiplex data units of one or more logical channels into a transport block. The UE 701 may transmit the transport block to the gNB 702 using PHY 731. The gNB 702 may receive the transport block using PHY 732 and demultiplex data units of the transport blocks back into logical channels. MAC 741 and MAC 742 may perform error correction through Hybrid Automatic Repeat Request (HARQ), logical channel prioritization, and/or padding.

PHY 731 and PHY 732 may perform mapping of transport channels to physical channels. PHY 731 and PHY 732 may perform digital and analog signal processing functions (e.g., coding/decoding and modulation/demodulation) for sending and receiving information (e.g., transmission via an air interface). PHY 731 and PHY 732 may perform multi-antenna mapping.

Figure 8:
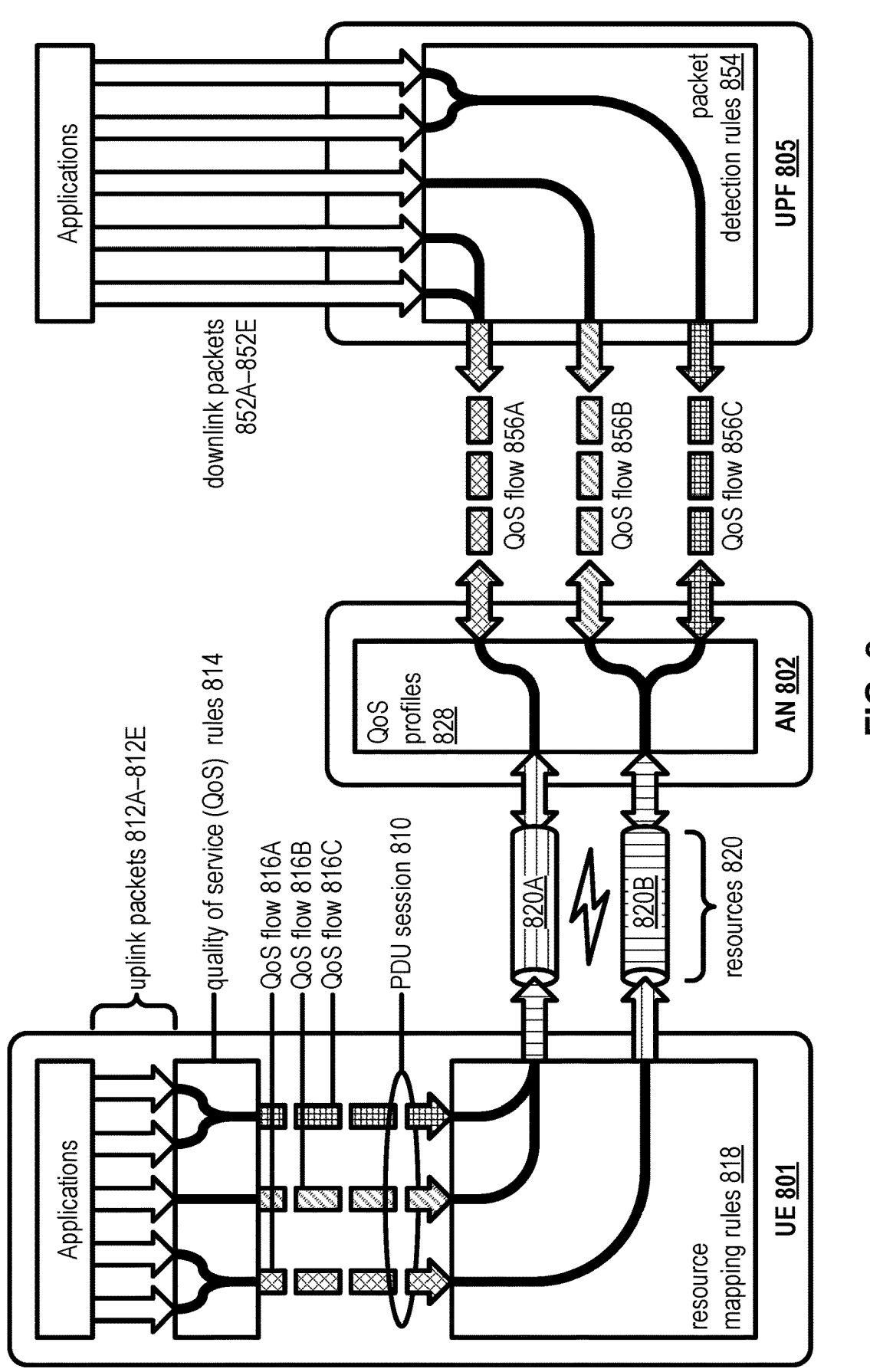
FIG. 8 illustrates an example of a quality of service model for data exchange.

FIG. 8 illustrates an example of a quality of service (QoS) model for differentiated data exchange. In the QoS model of FIG. 8, there are a UE 801, a AN 802, and a UPF 805. The QoS model facilitates prioritization of certain packet or protocol data units (PDUs), also referred to as packets. For example, higher-priority packets may be exchanged faster and/or more reliably than lower-priority packets. The network may devote more resources to exchange of high-QoS packets.

In the example of FIG. 8, a PDU session 810 is established between UE 801 and UPF 805. The PDU session 810 may be a logical connection enabling the UE 801 to exchange data with a particular data network (for example, the Internet). The UE 801 may request establishment of the PDU session 810. At the time that the PDU session 810 is established, the UE 801 may, for example, identify the targeted data network based on its data network name (DNN). The PDU session 810 may be managed, for example, by a session management function (SMF, not shown). In order to facilitate exchange of data associated with the PDU session 810, between the UE 801 and the data network, the SMF may select the UPF 805 (and optionally, one or more other UPFs, not shown).

One or more applications associated with UE 801 may generate uplink packets 812A-812E associated with the PDU session 810. In order to work within the QoS model, UE 801 may apply QoS rules 814 to uplink packets 812A-812E. The QoS rules 814 may be associated with PDU session 810 and may be determined and/or provided to the UE 801 when PDU session 810 is established and/or modified. Based on QoS rules 814, UE 801 may classify uplink packets 812A-812E, map each of the uplink packets 812A-812E to a QoS flow, and/or mark uplink packets 812A-812E with a QoS flow indicator (QFI). As a packet travels through the network, and potentially mixes with other packets from other UEs having potentially different priorities, the QFI indicates how the packet should be handled in accordance with the QoS model. In the present illustration, uplink packets 812A, 812B are mapped to QoS flow 816A, uplink packet 812C is mapped to QoS flow 816B, and the remaining packets are mapped to QoS flow 816C.

The QoS flows may be the finest granularity of QoS differentiation in a PDU session. In the figure, three QoS flows 816A-816C are illustrated. However, it will be understood that there may be any number of QoS flows. Some QoS flows may be associated with a guaranteed bit rate (GBR QoS flows) and others may have bit rates that are not guaranteed (non-GBR QoS flows). QoS flows may also be subject to per-UE and per-session aggregate bit rates. One of the QoS flows may be a default QoS flow. The QoS flows may have different priorities. For example, QoS flow 816A may have a higher priority than QoS flow 816B, which may have a higher priority than QoS flow 816C. Different priorities may be reflected by different QoS flow characteristics. For example, QoS flows may be associated with flow bit rates. A particular QoS flow may be associated with a guaranteed flow bit rate (GFBR) and/or a maximum flow bit rate (MFBR). QoS flows may be associated with specific packet delay budgets (PDBs), packet error rates (PERs), and/or maximum packet loss rates. QoS flows may also be subject to per-UE and per-session aggregate bit rates.

In order to work within the QoS model, UE 801 may apply resource mapping rules 818 to the QoS flows 816A-816C. The air interface between UE 801 and AN 802 may be associated with resources 820. In the present illustration, QoS flow 816A is mapped to resource 820A, whereas QoS flows 816B, 816C are mapped to resource 820B. The resource mapping rules 818 may be provided by the AN 802. In order to meet QoS requirements, the resource mapping rules 818 may designate more resources for relatively high-priority QoS flows. With more resources, a high-priority QoS flow such as QoS flow 816A may be more likely to obtain the high flow bit rate, low packet delay budget, or other characteristic associated with QoS rules 814. The resources 820 may comprise, for example, radio bearers. The radio bearers (e.g., data radio bearers) may be established between the UE 801 and the AN 802. The radio bearers in 5G, between the UE 801 and the AN 802, may be distinct from bearers in LTE, for example, Evolved Packet System (EPS) bearers between a UE and a packet data network gateway (PGW), S1 bearers between an eNB and a serving gateway (SGW), and/or an S5/S8 bearer between an SGW and a PGW.

Once a packet associated with a particular QoS flow is received at AN 802 via resource 820A or resource 820B, AN 802 may separate packets into respective QoS flows 856A-

856C based on QoS profiles 828. The QoS profiles 828 may be received from an SMF. Each QoS profile may correspond to a QFI, for example, the QFI marked on the uplink packets 812A-812E. Each QoS profile may include QoS parameters such as 5G QoS identifier (5QI) and an allocation and retention priority (ARP). The QoS profile for non-GBR QoS flows may further include additional QoS parameters such as a reflective QoS attribute (RQA). The QoS profile for GBR QoS flows may further include additional QoS parameters such as a guaranteed flow bit rate (GFBR), a maximum flow bit rate (MFBR), and/or a maximum packet loss rate. The 5QI may be a standardized 5QI which have one-to-one mapping to a standardized combination of 5G QoS characteristics per well-known services. The 5QI may be a dynamically assigned 5QI which the standardized 5QI values are not defined. The 5QI may represent 5G QoS characteristics. The 5QI may comprise a resource type, a default priority level, a packet delay budget (PDB), a packet error rate (PER), a maximum data burst volume, and/or an averaging window. The resource type may indicate a non-GBR QoS flow, a GBR QoS flow or a delay-critical GBR QoS flow. The averaging window may represent a duration over which the GFBR and/or MFBR is calculated. ARP may be a priority level comprising pre-emption capability and a pre-emption vulnerability. Based on the ARP, the AN 802 may apply admission control for the QoS flows in a case of resource limitations.

The AN 802 may select one or more N3 tunnels 850 for transmission of the QoS flows 856A-856C. After the packets are divided into QoS flows 856A-856C, the packet may be sent to UPF 805 (e.g., towards a DN) via the selected one or more N3 tunnels 850. The UPF 805 may verify that the QFIs of the uplink packets 812A-812E are aligned with the QoS rules 814 provided to the UE 801. The UPF 805 may measure and/or count packets and/or provide packet metrics to, for example, a PCF.

The figure also illustrates a process for downlink. In particular, one or more applications may generate downlink packets 852A-852E. The UPF 805 may receive downlink packets 852A-852E from one or more DNs and/or one or more other UPFs. As per the QoS model, UPF 805 may apply packet detection rules (PDRs) 854 to downlink packets 852A-852E. Based on PDRs 854, UPF 805 may map packets 852A-852E into QoS flows. In the present illustration, downlink packets 852A, 852B are mapped to QoS flow 856A, downlink packet 852C is mapped to QoS flow 856B, and the remaining packets are mapped to QoS flow 856C.

The QoS flows 856A-856C may be sent to AN 802. The AN 802 may apply resource mapping rules to the QoS flows 856A-856C. In the present illustration, QoS flow 856A is mapped to resource 820A, whereas QoS flows 856B, 856C are mapped to resource 820B. In order to meet QoS requirements, the resource mapping rules may designate more resources to high-priority QoS flows.

FIGS. 9A-9D illustrate example states and state transitions of a wireless device (e.g., a UE). At any given time, the wireless device may have a radio resource control (RRC) state, a registration management (RM) state, and a connection management (CM) state.

Figure 9A:
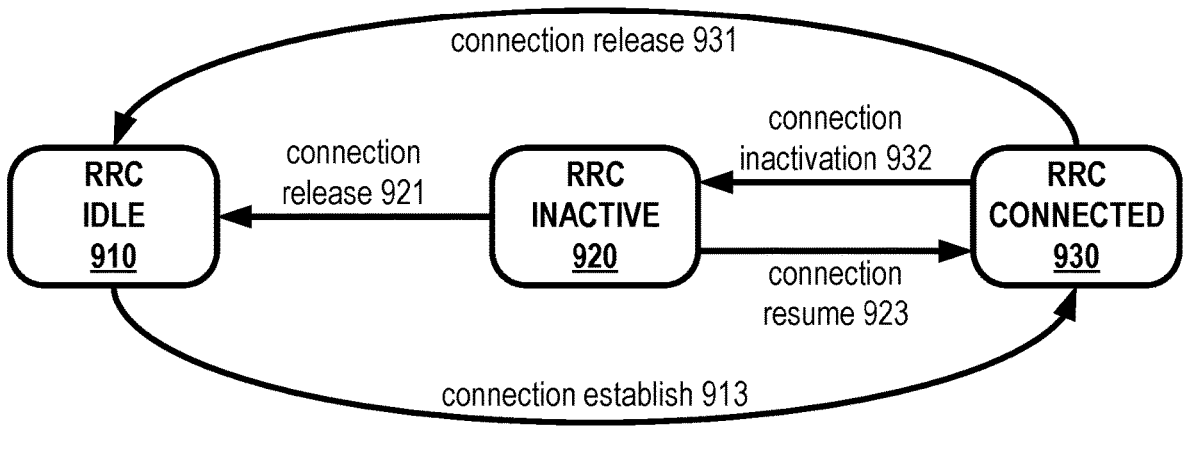
FIG. 9A, FIG. 9B, FIG. 9C, and FIG. 9D illustrate example states and state transitions of a wireless device.

FIG. 9A is an example diagram showing RRC state transitions of a wireless device (e.g., a UE). The UE may be in one of three RRC states: RRC idle 910, (e.g., RRC_IDLE), RRC inactive 920 (e.g., RRC_INACTIVE), or RRC connected 930 (e.g., RRC_CONNECTED). The UE may implement different RAN-related control-plane procedures depending on its RRC state. Other elements of the network, for example, a base station, may track the RRC state of one or more UEs and implement RAN-related control-plane procedures appropriate to the RRC state of each.

In RRC connected 930, it may be possible for the UE to exchange data with the network (for example, the base station). The parameters necessary for exchange of data may be established and known to both the UE and the network. The parameters may be referred to and/or included in an RRC context of the UE (sometimes referred to as a UE context). These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. The base station with which the UE is connected may store the RRC context of the UE.

While in RRC connected 930, mobility of the UE may be managed by the access network, whereas the UE itself may manage mobility while in RRC idle 910 and/or RRC inactive 920. While in RRC connected 930, the UE may manage mobility by measuring signal levels (e.g., reference signal levels) from a serving cell and neighboring cells and reporting these measurements to the base station currently serving the UE. The network may initiate handover based on the reported measurements. The RRC state may transition from RRC connected 930 to RRC idle 910 through a connection release procedure 930 or to RRC inactive 920 through a connection inactivation procedure 932.

In RRC idle 910, an RRC context may not be established for the UE. In RRC idle 910, the UE may not have an RRC connection with a base station. While in RRC idle 910, the UE may be in a sleep state for a majority of the time (e.g., to conserve battery power). The UE may wake up periodically (e.g., once in every discontinuous reception cycle) to monitor for paging messages from the access network. Mobility of the UE may be managed by the UE through a procedure known as cell reselection. The RRC state may transition from RRC idle 910 to RRC connected 930 through a connection establishment procedure 913, which may involve a random access procedure, as discussed in greater detail below.

In RRC inactive 920, the RRC context previously established is maintained in the UE and the base station. This may allow for a fast transition to RRC connected 930 with reduced signaling overhead as compared to the transition from RRC idle 910 to RRC connected 930. The RRC state may transition to RRC connected 930 through a connection resume procedure 923. The RRC state may transition to RRC idle 910 though a connection release procedure 921 that may be the same as or similar to connection release procedure 931.

An RRC state may be associated with a mobility management mechanism. In RRC idle 910 and RRC inactive 920, mobility may be managed by the UE through cell reselection. The purpose of mobility management in RRC idle 910 and/or RRC inactive 920 is to allow the network to be able to notify the UE of an event via a paging message without having to broadcast the paging message over the entire mobile communications network. The mobility management mechanism used in RRC idle 910 and/or RRC inactive 920 may allow the network to track the UE on a cell-group level so that the paging message may be broadcast over the cells of the cell group that the UE currently resides within instead of the entire communication network. Tracking may be based on different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 920 state, the UE may be assigned a RAN notification area. A RAN notification area may comprise one or more cell identities, a list of RAIs, and/or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 920.

Figure 9B:
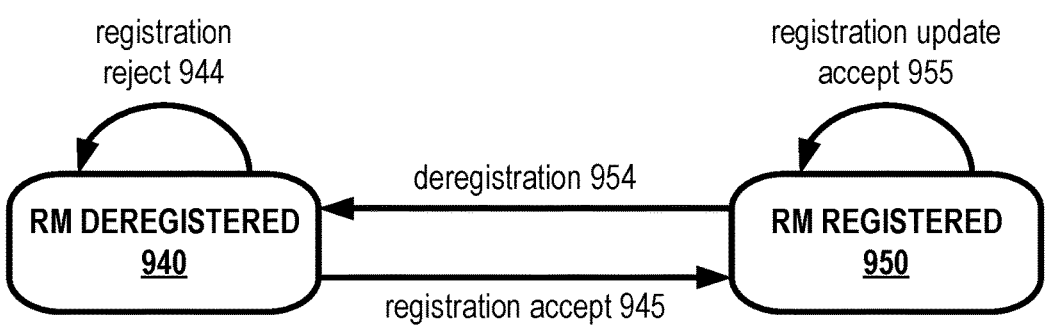

FIG. 9B is an example diagram showing registration management (RM) state transitions of a wireless device (e.g., a UE). The states are RM deregistered 940, (e.g., RM-DEREGISTERED) and RM registered 950 (e.g., RM-REGISTERED).

In RM deregistered 940, the UE is not registered with the network, and the UE is not reachable by the network. In order to be reachable by the network, the UE must perform an initial registration. As an example, the UE may register with an AMF of the network. If registration is rejected (registration reject 944), then the UE remains in RM deregistered 940. If registration is accepted (registration accept 945), then the UE transitions to RM registered 950. While the UE is RM registered 950, the network may store, keep, and/or maintain a UE context for the UE. The UE context may be referred to as wireless device context. The UE context corresponding to network registration (maintained by the core network) may be different from the RRC context corresponding to RRC state (maintained by an access network, e.g., a base station). The UE context may comprise a UE identifier and a record of various information relating to the UE, for example, UE capability information, policy information for access and mobility management of the UE, lists of allowed or established slices or PDU sessions, and/or a registration area of the UE (i.e., a list of tracking areas covering the geographical area where the wireless device is likely to be found).

While the UE is RM registered 950, the network may store the UE context of the UE, and if necessary use the UE context to reach the UE. Moreover, some services may not be provided by the network unless the UE is registered. The UE may update its UE context while remaining in RM registered 950 (registration update accept 955). For example, if the UE leaves one tracking area and enters another tracking area, the UE may provide a tracking area identifier to the network. The network may deregister the UE, or the UE may deregister itself (deregistration 954). For example, the network may automatically deregister the wireless device if the wireless device is inactive for a certain amount of time. Upon deregistration, the UE may transition to RM deregistered 940.

Figure 9C:
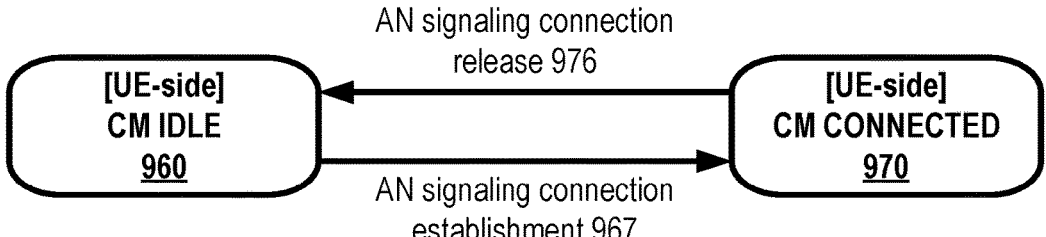

FIG. 9C is an example diagram showing connection management (CM) state transitions of a wireless device (e.g., a UE), shown from a perspective of the wireless device. The UE may be in CM idle 960 (e.g., CM-IDLE) or CM connected 970 (e.g., CM-CONNECTED).

In CM idle 960, the UE does not have a non access stratum (NAS) signaling connection with the network. As a result, the UE can not communicate with core network functions. The UE may transition to CM connected 970 by establishing an AN signaling connection (AN signaling connection establishment 967). This transition may be initiated by sending an initial NAS message. The initial NAS message may be a registration request (e.g., if the UE is RM deregistered 940) or a service request (e.g., if the UE is RM registered 950). If the UE is RM registered 950, then the UE may initiate the AN signaling connection establishment by sending a service request, or the network may send a page, thereby triggering the UE to send the service request.

In CM connected 970, the UE can communicate with core network functions using NAS signaling. As an example, the UE may exchange NAS signaling with an AMF for registration management purposes, service request procedures, and/or authentication procedures. As another example, the UE may exchange NAS signaling, with an SMF, to establish and/or modify a PDU session. The network may disconnect the UE, or the UE may disconnect itself (AN signaling connection release 976). For example, if the UE transitions to RM deregistered 940, then the UE may also transition to CM idle 960. When the UE transitions to CM idle 960, the network may deactivate a user plane connection of a PDU session of the UE.

Figure 9D:
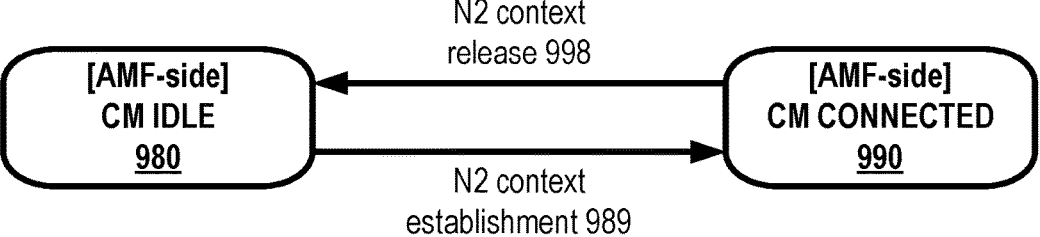

FIG. 9D is an example diagram showing CM state transitions of the wireless device (e.g., a UE), shown from a network perspective (e.g., an AMF). The CM state of the UE, as tracked by the AMF, may be in CM idle 980 (e.g., CM-IDLE) or CM connected 990 (e.g., CM-CONNECTED). When the UE transitions from CM idle 980 to CM connected 990, the AMF many establish an N2 context of the UE (N2 context establishment 989). When the UE transitions from CM connected 990 to CM idle 980, the AMF many release the N2 context of the UE (N2 context release 998).

Figure 10:
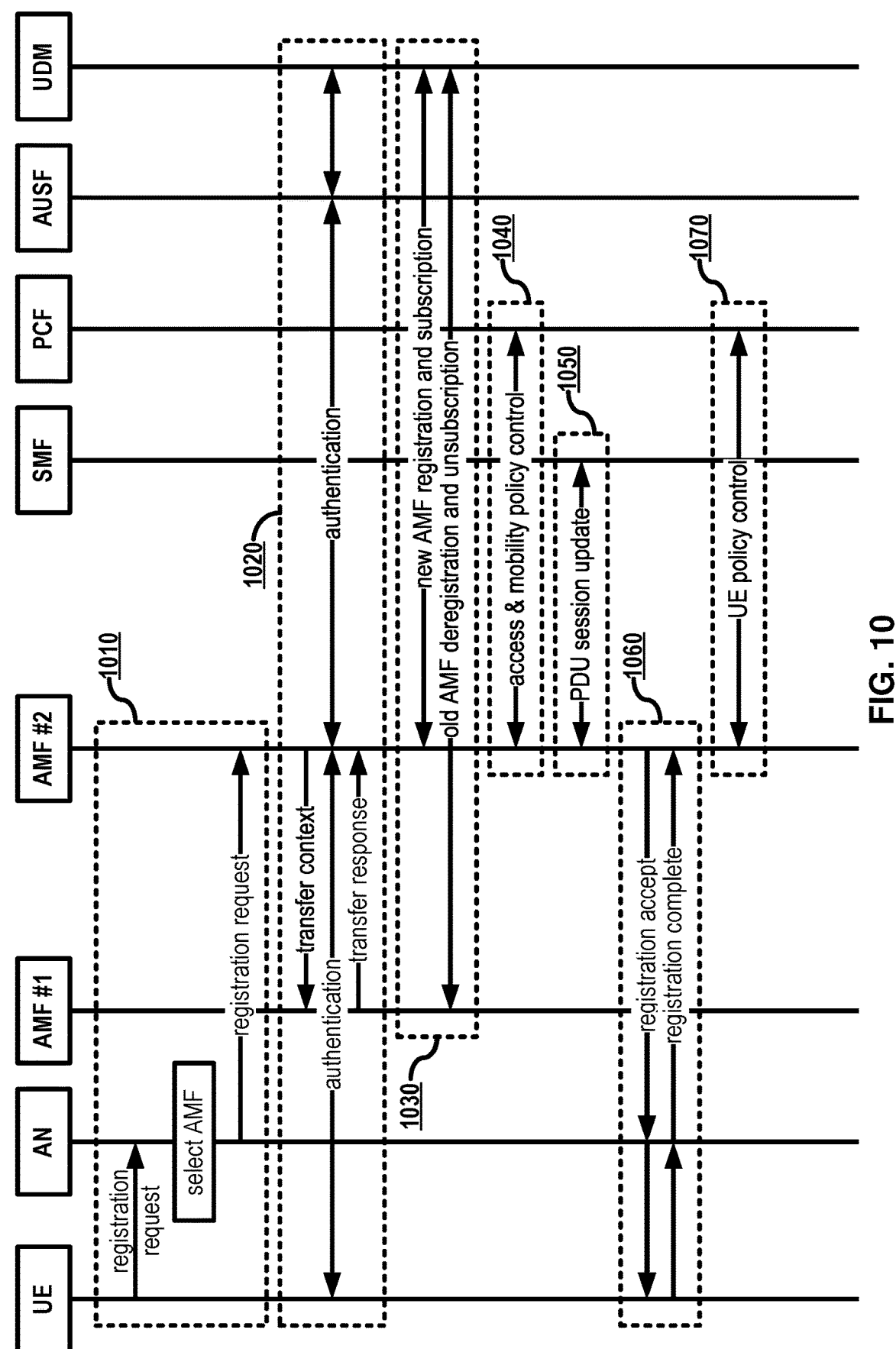
FIG. 10 illustrates an example of a registration procedure for a wireless device.
Figure 11:
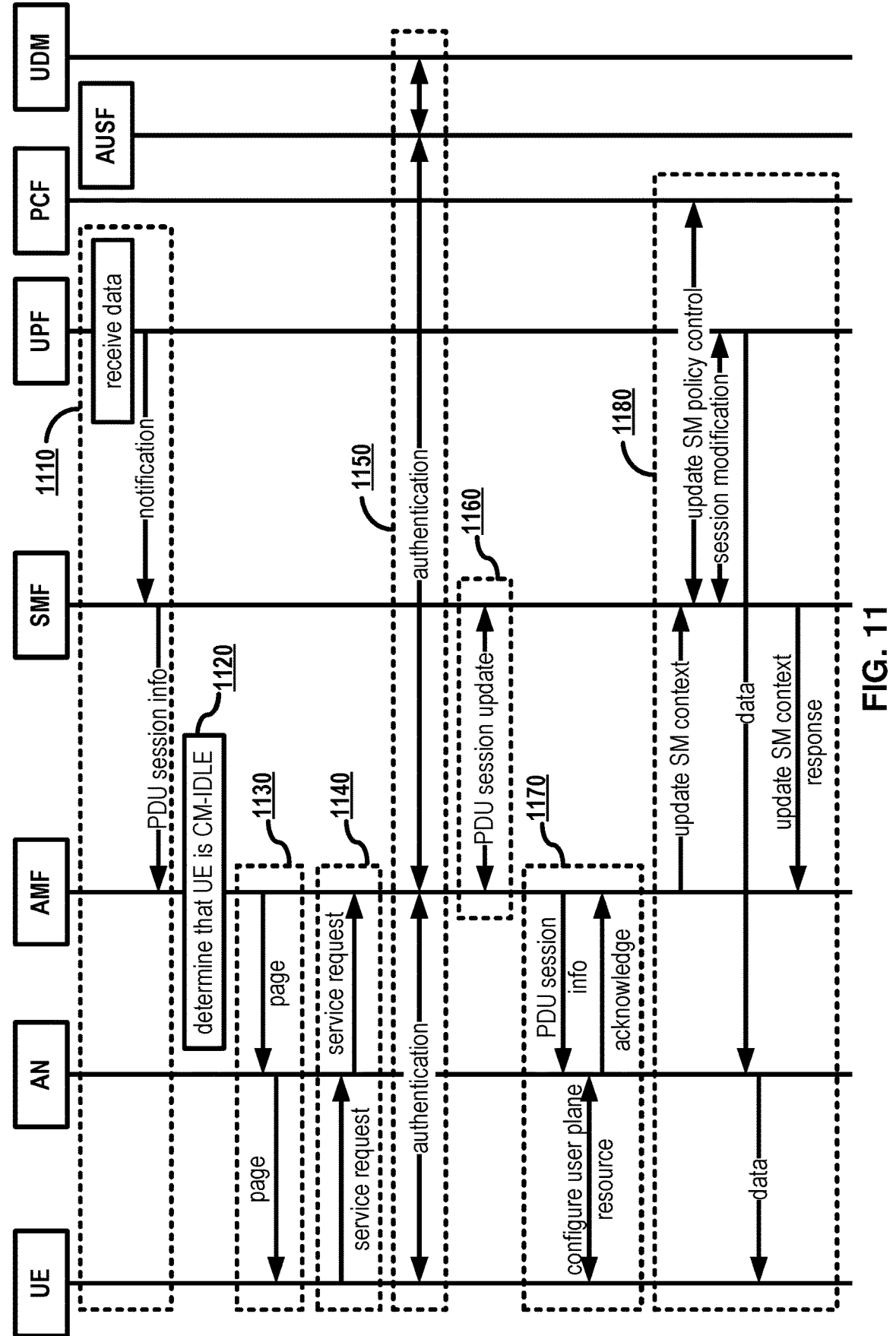
FIG. 11 illustrates an example of a service request procedure for a wireless device.
Figure 12:
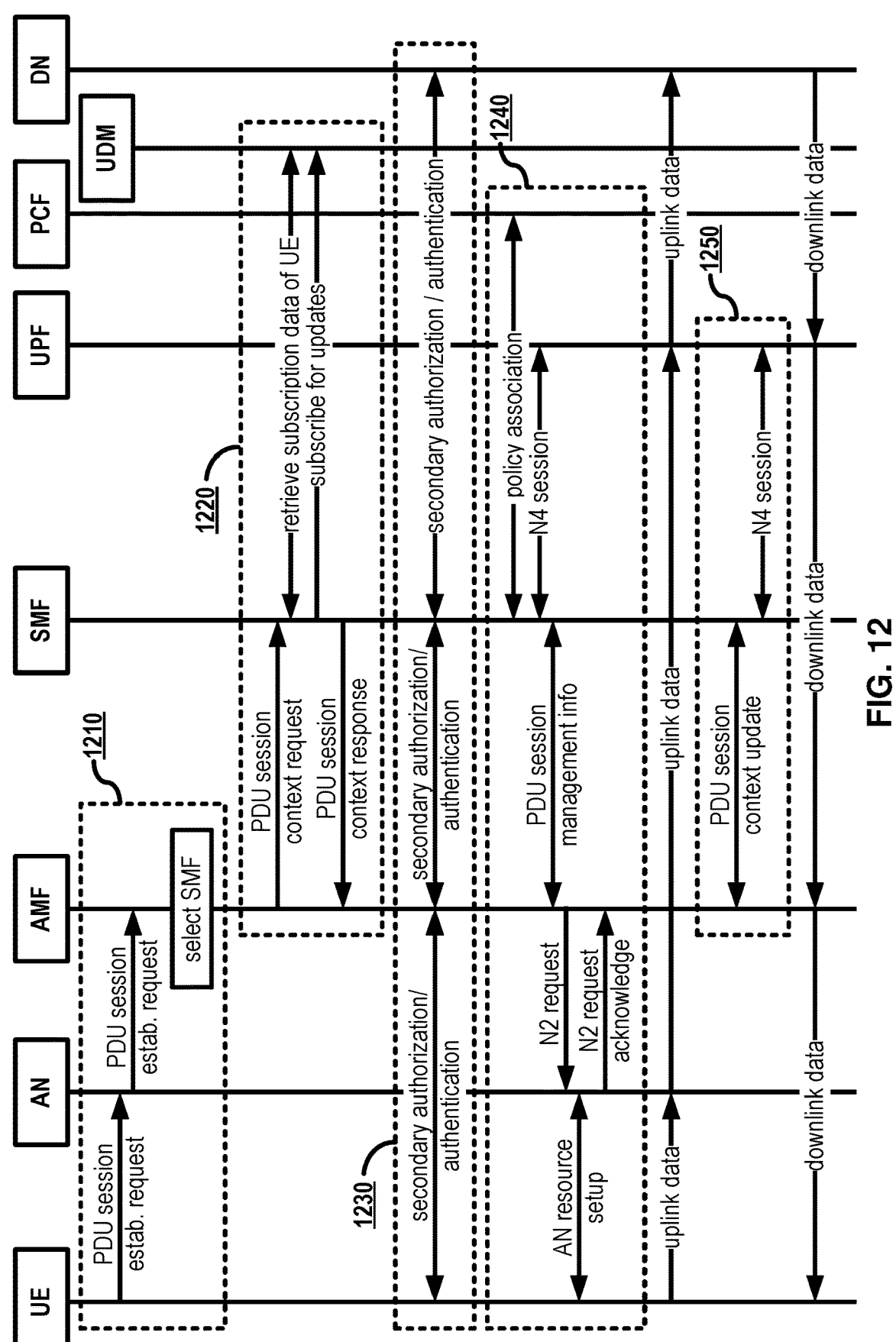
FIG. 12 illustrates an example of a protocol data unit session establishment procedure for a wireless device.

FIGS. 10-12 illustrate example procedures for registering, service request, and PDU session establishment of a UE.

FIG. 10 illustrates an example of a registration procedure for a wireless device (e.g., a UE). Based on the registration procedure, the UE may transition from, for example, RM deregistered 940 to RM registered 950.

Registration may be initiated by a UE for the purposes of obtaining authorization to receive services, enabling mobility tracking, enabling reachability, or other purposes. The UE may perform an initial registration as a first step toward connection to the network (for example, if the UE is powered on, airplane mode is turned off, etc.). Registration may also be performed periodically to keep the network informed of the UE's presence (for example, while in CM-IDLE state), or in response to a change in UE capability or registration area. Deregistration (not shown in FIG. 10) may be performed to stop network access.

At 1010, the UE transmits a registration request to an AN. As an example, the UE may have moved from a coverage area of a previous AMF (illustrated as AMF #1) into a coverage area of a new AMF (illustrated as AMF #2). The registration request may be a NAS message. The registration request may include a UE identifier. The AN may select an AMF for registration of the UE. For example, the AN may select a default AMF. For example, the AN may select an AMF that is already mapped to the UE (e.g., a previous AMF). The NAS registration request may include a network slice identifier and the AN may select an AMF based on the requested slice. After the AMF is selected, the AN may send the registration request to the selected AMF.

At 1020, the AMF that receives the registration request (AMF #2) performs a context transfer. The context may be a UE context, for example, an RRC context for the UE. As an example, AMF #2 may send AMF #1 a message requesting a context of the UE. The message may include the UE identifier. The message may be a Namf_Communication_ UEContextTransfer message. AMF #1 may send to AMF #2 a message that includes the requested UE context. This message may be a Namf_Communication_UEContext-Transfer message. After the UE context is received, the AMF #2 may coordinate authentication of the UE. After authentication is complete, AMF #2 may send to AMF #1 a message indicating that the UE context transfer is complete. This message may be a Namf_Communication_UEContext-Transfer Response message.

Authentication may require participation of the UE, an AUSF, a UDM and/or a UDR (not shown). For example, the AMF may request that the AUSF authenticate the UE. For example, the AUSF may execute authentication of the UE. For example, the AUSF may get authentication data from UDM. For example, the AUSF may send a subscription permanent identifier (SUPI) to the AMF based on the authentication being successful. For example, the AUSF may provide an intermediate key to the AMF. The intermediate key may be used to derive an access-specific security key for the UE, enabling the AMF to perform security context management (SCM). The AUSF may obtain subscription data from the UDM. The subscription data may be based on information obtained from the UDM (and/or the UDR). The subscription data may include subscription identifiers, security credentials, access and mobility related subscription data and/or session related data.

At 1030, the new AMF, AMF #2, registers and/or subscribes with the UDM. AMF #2 may perform registration using a UE context management service of the UDM (Nudm_UECM). AMF #2 may obtain subscription information of the UE using a subscriber data management service of the UDM (Nudm_SDM). AMF #2 may further request that the UDM notify AMF #2 if the subscription information of the UE changes. As the new AMF registers and subscribes, the old AMF, AMF #1, may deregister and unsubscribe. After deregistration, AMF #1 is free of responsibility for mobility management of the UE.

At 1040, AMF #2 retrieves access and mobility (AM) policies from the PCF. As an example, the AMF #2 may provide subscription data of the UE to the PCF. The PCF may determine access and mobility policies for the UE based on the subscription data, network operator data, current network conditions, and/or other suitable information. For example, the owner of a first UE may purchase a higher level of service than the owner of a second UE. The PCF may provide the rules associated with the different levels of service. Based on the subscription data of the respective UEs, the network may apply different policies which facilitate different levels of service.

For example, access and mobility policies may relate to service area restrictions, RAT/frequency selection priority (RFSP, where RAT stands for radio access technology), authorization and prioritization of access type (e.g., LTE versus NR), and/or selection of non-3GPP access (e.g., Access Network Discovery and Selection Policy (ANDSP)). The service area restrictions may comprise a list of tracking areas where the UE is allowed to be served (or forbidden from being served). The access and mobility policies may include a UE route selection policy (URSP)) that influences routing to an established PDU session or a new PDU session. As noted above, different policies may be obtained and/or enforced based on subscription data of the UE, location of the UE (i.e., location of the AN and/or AMF), or other suitable factors.

At 1050, AMF #2 may update a context of a PDU session. For example, if the UE has an existing PDU session, the AMF #2 may coordinate with an SMF to activate a user plane connection associated with the existing PDU session. The SMF may update and/or release a session management context of the PDU session (Nsmf_PDUSession_UpdateSMContext, Nsmf_PDUSession_ReleaseSMContext).

At 1060, AMF #2 sends a registration accept message to the AN, which forwards the registration accept message to the UE. The registration accept message may include a new UE identifier and/or a new configured slice identifier. The UE may transmit a registration complete message to the AN, which forwards the registration complete message to the AMF #2. The registration complete message may acknowledge receipt of the new UE identifier and/or new configured slice identifier.

At 1070, AMF #2 may obtain UE policy control information from the PCF. The PCF may provide an access network discovery and selection policy (ANDSP) to facilitate non-3GPP access. The PCF may provide a UE route selection policy (URSP) to facilitate mapping of particular data traffic to particular PDU session connectivity parameters. As an example, the URSP may indicate that data traffic associated with a particular application should be mapped to a particular SSC mode, network slice, PDU session type, or preferred access type (3GPP or non-3GPP).

FIG. 11 illustrates an example of a service request procedure for a wireless device (e.g., a UE). The service request procedure depicted in FIG. 11 is a network-triggered service request procedure for a UE in a CM-IDLE state. However, other service request procedures (e.g., a UE-triggered service request procedure) may also be understood by reference to FIG. 11, as will be discussed in greater detail below.

At 1110, a UPF receives data. The data may be downlink data for transmission to a UE. The data may be associated with an existing PDU session between the UE and a DN. The data may be received, for example, from a DN and/or another UPF. The UPF may buffer the received data. In response to the receiving of the data, the UPF may notify an SMF of the received data. The identity of the SMF to be notified may be determined based on the received data. The notification may be, for example, an N4 session report. The notification may indicate that the UPF has received data associated with the UE and/or a particular PDU session associated with the UE. In response to receiving the notification, the SMF may send PDU session information to an AMF. The PDU session information may be sent in an N1N2 message transfer for forwarding to an AN. The PDU session information may include, for example, UPF tunnel endpoint information and/or QoS information.

At 1120, the AMF determines that the UE is in a CM-IDLE state. The determining at 1120 may be in response to the receiving of the PDU session information. Based on the determination that the UE is CM-IDLE, the service request procedure may proceed to 1130 and 1140, as depicted in FIG. 11. However, if the UE is not CM-IDLE (e.g., the UE is CM-CONNECTED), then 1130 and 1140 may be skipped, and the service request procedure may proceed directly to 1150.

At 1130, the AMF pages the UE. The paging at 1130 may be performed based on the UE being CM-IDLE. To perform the paging, the AMF may send a page to the AN. The page may be referred to as a paging or a paging message. The page may be an N2 request message. The AN may be one of a plurality of ANs in a RAN notification area of the UE. The AN may send a page to the UE. The UE may be in a coverage area of the AN and may receive the page.

At 1140, the UE may request service. The UE may transmit a service request to the AMF via the AN. As depicted in FIG. 11, the UE may request service at 1140 in response to receiving the paging at 1130. However, as noted above, this is for the specific case of a network-triggered service request procedure. In some scenarios (for example, if uplink data becomes available at the UE), then the UE may commence a UE-triggered service request procedure. The UE-triggered service request procedure may commence starting at 1140.

At 1150, the network may authenticate the UE. Authentication may require participation of the UE, an AUSF, and/or a UDM, for example, similar to authentication described elsewhere in the present disclosure. In some cases (for example, if the UE has recently been authenticated), the authentication at 1150 may be skipped.

At 1160, the AMF and SMF may perform a PDU session update. As part of the PDU session update, the SMF may provide the AMF with one or more UPF tunnel endpoint identifiers. In some cases (not shown in FIG. 11), it may be necessary for the SMF to coordinate with one or more other SMFs and/or one or more other UPFs to set up a user plane.

At 1170, the AMF may send PDU session information to the AN. The PDU session information may be included in an N2 request message. Based on the PDU session information, the AN may configure a user plane resource for the UE. To configure the user plane resource, the AN may, for example, perform an RRC reconfiguration of the UE. The AN may acknowledge to the AMF that the PDU session information has been received. The AN may notify the AMF that the user plane resource has been configured, and/or provide information relating to the user plane resource configuration.

In the case of a UE-triggered service request procedure, the UE may receive, at 1170, a NAS service accept message from the AMF via the AN. After the user plane resource is configured, the UE may transmit uplink data (for example, the uplink data that caused the UE to trigger the service request procedure).

At 1180, the AMF may update a session management (SM) context of the PDU session. For example, the AMF may notify the SMF (and/or one or more other associated SMFs) that the user plane resource has been configured, and/or provide information relating to the user plane resource configuration. The AMF may provide the SMF (and/or one or more other associated SMFs) with one or more AN tunnel endpoint identifiers of the AN. After the SM context update is complete, the SMF may send an update SM context response message to the AMF.

Based on the update of the session management context, the SMF may update a PCF for purposes of policy control. For example, if a location of the UE has changed, the SMF may notify the PCF of the UE's a new location.

Based on the update of the session management context, the SMF and UPF may perform a session modification. The session modification may be performed using N4 session modification messages. After the session modification is complete, the UPF may transmit downlink data (for example, the downlink data that caused the UPF to trigger the network-triggered service request procedure) to the UE. The transmitting of the downlink data may be based on the one or more AN tunnel endpoint identifiers of the AN.

FIG. 12 illustrates an example of a protocol data unit (PDU) session establishment procedure for a wireless device (e.g., a UE). The UE may determine to transmit the PDU session establishment request to create a new PDU session, to hand over an existing PDU session to a 3GPP network, or for any other suitable reason.

At 1210, the UE initiates PDU session establishment. The UE may transmit a PDU session establishment request to an AMF via an AN. The PDU session establishment request may be a NAS message. The PDU session establishment request may indicate: a PDU session ID; a requested PDU session type (new or existing); a requested DN (DNN); a requested network slice (S-NSSAI); a requested SSC mode; and/or any other suitable information. The PDU session ID may be generated by the UE. The PDU session type may be, for example, an Internet Protocol (IP)-based type (e.g., IPv4, IPv6, or dual stack IPv4/IPv6), an Ethernet type, or an unstructured type.

The AMF may select an SMF based on the PDU session establishment request. In some scenarios, the requested PDU session may already be associated with a particular SMF. For example, the AMF may store a UE context of the UE, and the UE context may indicate that the PDU session ID of the requested PDU session is already associated with the particular SMF. In some scenarios, the AMF may select the SMF based on a determination that the SMF is prepared to handle the requested PDU session. For example, the requested PDU session may be associated with a particular DNN and/or S-NSSAI, and the SMF may be selected based on a determination that the SMF can manage a PDU session associated with the particular DNN and/or S-NSSAI.

At 1220, the network manages a context of the PDU session. After selecting the SMF at 1210, the AMF sends a PDU session context request to the SMF. The PDU session context request may include the PDU session establishment request received from the UE at 1210. The PDU session context request may be a Nsmf_PDUSession_CreateSM-Context Request and/or a Nsmf_PDUSession_UpdateSM-Context Request. The PDU session context request may indicate identifiers of the UE; the requested DN; and/or the requested network slice. Based on the PDU session context request, the SMF may retrieve subscription data from a UDM. The subscription data may be session management subscription data of the UE. The SMF may subscribe for updates to the subscription data, so that the PCF will send new information if the subscription data of the UE changes. After the subscription data of the UE is obtained, the SMF may transmit a PDU session context response to the AMG. The PDU session context response may be a Nsmf_P-DUSession_CreateSMContext Response and/or a Nsmf_P-DUSession_UpdateSMContext Response. The PDU session context response may include a session management context ID.

At 1230, secondary authorization/authentication may be performed, if necessary. The secondary authorization/authentication may involve the UE, the AMF, the SMF, and the DN. The SMF may access the DN via a Data Network Authentication, Authorization and Accounting (DN AAA) server.

At 1240, the network sets up a data path for uplink data associated with the PDU session. The SMF may select a PCF and establish a session management policy association. Based on the association, the PCF may provide an initial set of policy control and charging rules (PCC rules) for the PDU session. When targeting a particular PDU session, the PCF may indicate, to the SMF, a method for allocating an IP address to the PDU Session, a default charging method for the PDU session, an address of the corresponding charging entity, triggers for requesting new policies, etc. The PCF may also target a service data flow (SDF) comprising one or more PDU sessions. When targeting an SDF, the PCF may indicate, to the SMF, policies for applying QoS requirements, monitoring traffic (e.g., for charging purposes), and/or steering traffic (e.g., by using one or more particular N6 interfaces).

The SMF may determine and/or allocate an IP address for the PDU session. The SMF may select one or more UPFs (a single UPF in the example of FIG. 12) to handle the PDU session. The SMF may send an N4 session message to the selected UPF. The N4 session message may be an N4 Session Establishment Request and/or an N4 Session Modification Request. The N4 session message may include packet detection, enforcement, and reporting rules associated with the PDU session. In response, the UPF may acknowledge by sending an N4 session establishment response and/or an N4 session modification response.

The SMF may send PDU session management information to the AMF. The PDU session management information may be a Namf_Communication_N1N2MessageTransfer message. The PDU session management information may include the PDU session ID. The PDU session management information may be a NAS message. The PDU session management information may include N1 session management information and/or N2 session management information. The N1 session management information may include a PDU session establishment accept message. The PDU session establishment accept message may include tunneling endpoint information of the UPF and quality of service (QoS) information associated with the PDU session.

The AMF may send an N2 request to the AN. The N2 request may include the PDU session establishment accept message. Based on the N2 request, the AN may determine AN resources for the UE. The AN resources may be used by the UE to establish the PDU session, via the AN, with the DN. The AN may determine resources to be used for the PDU session and indicate the determined resources to the UE. The AN may send the PDU session establishment accept message to the UE. For example, the AN may perform an RRC reconfiguration of the UE. After the AN resources are set up, the AN may send an N2 request acknowledge to the AMF. The N2 request acknowledge may include N2 session management information, for example, the PDU session ID and tunneling endpoint information of the AN.

After the data path for uplink data is set up at 1240, the UE may optionally send uplink data associated with the PDU session. As shown in FIG. 12, the uplink data may be sent to a DN associated with the PDU session via the AN and the UPF.

At 1250, the network may update the PDU session context. The AMF may transmit a PDU session context update request to the SMF. The PDU session context update request may be a Nsmf_PDUSession_UpdateSMContext Request. The PDU session context update request may include the N2 session management information received from the AN. The SMF may acknowledge the PDU session context update. The acknowledgement may be a Nsmf_P-DUSession_UpdateSMContext Response. The acknowledgement may include a subscription requesting that the SMF be notified of any UE mobility event. Based on the PDU session context update request, the SMF may send an N4 session message to the UPF. The N4 session message may be an N4 Session Modification Request. The N4 session message may include tunneling endpoint information of the AN. The N4 session message may include forwarding rules associated with the PDU session. In response, the UPF may acknowledge by sending an N4 session modification response.

After the UPF receives the tunneling endpoint information of the AN, the UPF may relay downlink data associated with the PDU session. As shown in FIG. 12, the downlink data may be received from a DN associated with the PDU session via the AN and the UPF.

Figure 13:
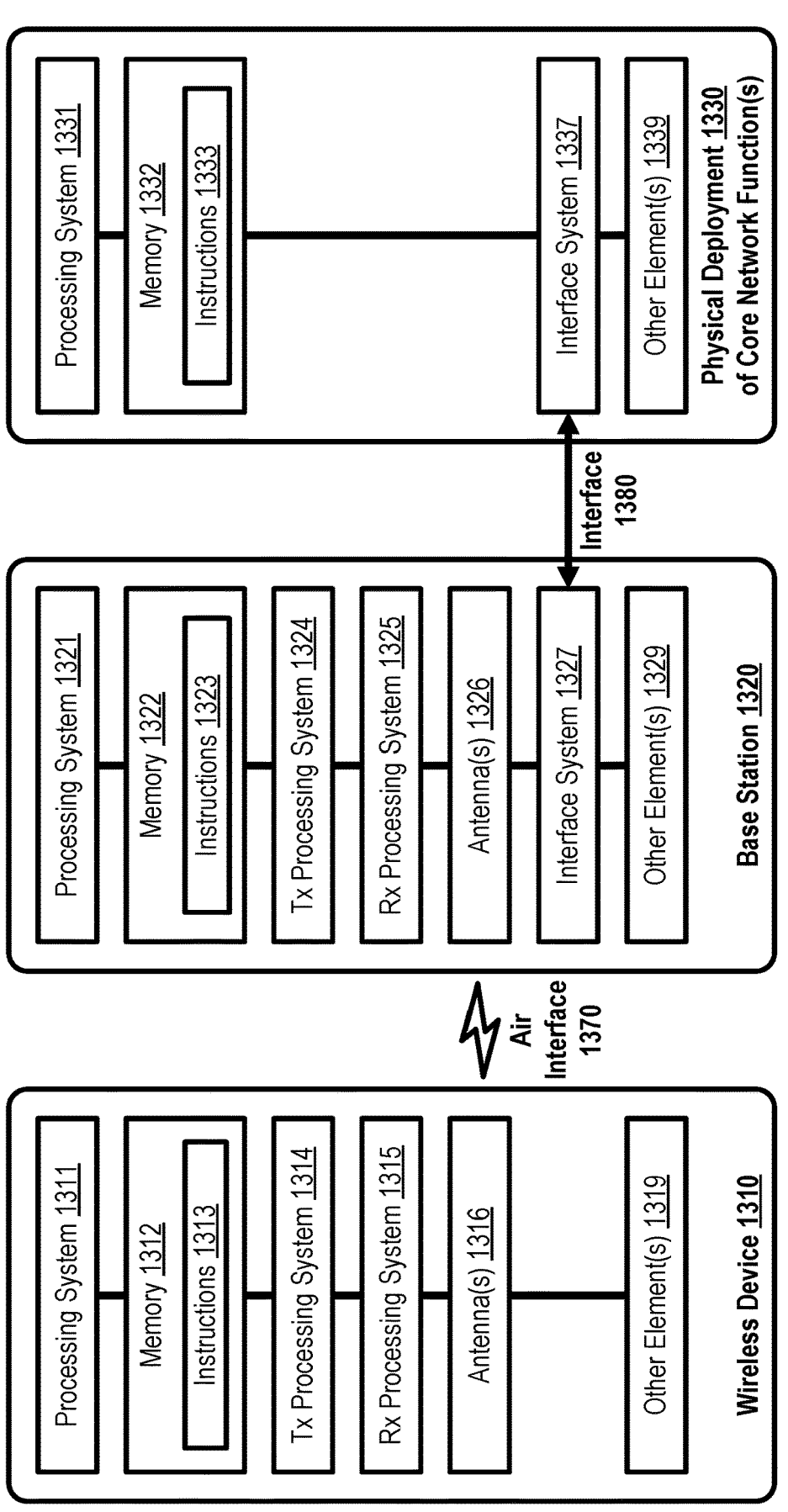
FIG. 13 illustrates examples of components of the elements in a communications network.

FIG. 13 illustrates examples of components of the elements in a communications network. FIG. 13 includes a wireless device 1310, a base station 1320, and a physical deployment of one or more network functions 1330 (henceforth "deployment 1330"). Any wireless device described in the present disclosure may have similar components and may be implemented in a similar manner as the wireless device 1310. Any other base station described in the present disclosure (or any portion thereof, depending on the architecture of the base station) may have similar components and may be implemented in a similar manner as the base station 1320. Any physical core network deployment in the present disclosure (or any portion thereof, depending on the architecture of the base station) may have similar components and may be implemented in a similar manner as the deployment 1330.

The wireless device 1310 may communicate with base station 1320 over an air interface 1370. The communication direction from wireless device 1310 to base station 1320 over air interface 1370 is known as uplink, and the communication direction from base station 1320 to wireless device 1310 over air interface 1370 is known as downlink. Downlink transmissions may be separated from uplink transmissions using FDD, TDD, and/or some combination of duplexing techniques. FIG. 13 shows a single wireless device 1310 and a single base station 1320, but it will be understood that wireless device 1310 may communicate with any number of base stations or other access network components over air interface 1370, and that base station 1320 may communicate with any number of wireless devices over air interface 1370.

The wireless device 1310 may comprise a processing system 1311 and a memory 1312. The memory 1312 may comprise one or more computer-readable media, for example, one or more non-transitory computer readable media. The memory 1312 may include instructions 1313. The processing system 1311 may process and/or execute instructions 1313. Processing and/or execution of instructions 1313 may cause wireless device 1310 and/or processing system 1311 to perform one or more functions or activities. The memory 1312 may include data (not shown). One of the functions or activities performed by processing system 1311 may be to store data in memory 1312 and/or retrieve previously-stored data from memory 1312. In an example, downlink data received from base station 1320 may be stored in memory 1312, and uplink data for transmission to base station 1320 may be retrieved from memory 1312. As illustrated in FIG. 13, the wireless device 1310 may communicate with base station 1320 using a transmission processing system 1314 and/or a reception processing system 1315. Alternatively, transmission processing system 1314 and reception processing system 1315 may be implemented as a single processing system, or both may be omitted and all processing in the wireless device 1310 may be performed by the processing system 1311. Although not shown in FIG. 13, transmission processing system 1314 and/or reception processing system 1315 may be coupled to a dedicated memory that is analogous to but separate from memory 1312, and comprises instructions that may be processed and/or executed to carry out one or more of their respective functionalities. The wireless device 1310 may comprise one or more antennas 1316 to access air interface 1370.

The wireless device 1310 may comprise one or more other elements 1319. The one or more other elements 1319 may comprise software and/or hardware that provide features and/or functionalities, for example, a speaker, a microphone, a keypad, a display, a touchpad, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, a global positioning sensor (GPS) and/or the like). The wireless device 1310 may receive user input data from and/or provide user output data to the one or more one or more other elements 1319. The one or more other elements 1319 may comprise a power source. The wireless device 1310 may receive power from the power source and may be configured to distribute the power to the other components in wireless device 1310. The power source may comprise one or more sources of power, for example, a battery, a solar cell, a fuel cell, or any combination thereof.

The wireless device 1310 may transmit uplink data to and/or receive downlink data from base station 1320 via air interface 1370. To perform the transmission and/or reception, one or more of the processing system 1311, transmission processing system 1314, and/or reception system 1315 may implement open systems interconnection (OSI) functionality. As an example, transmission processing system 1314 and/or reception system 1315 may perform layer 1 OSI functionality, and processing system 1311 may perform higher layer functionality. The wireless device 1310 may transmit and/or receive data over air interface 1370 using one or more antennas 1316. For scenarios where the one or more antennas 1316 include multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise a processing system 1321 and a memory 1322. The memory 1322 may comprise one or more computer-readable media, for example, one or more non-transitory computer readable media. The memory 1322 may include instructions 1323. The processing system 1321 may process and/or execute instructions 1323. Processing and/or execution of instructions 1323 may cause base station 1320 and/or processing system 1321 to perform one or more functions or activities. The memory 1322 may include data (not shown). One of the functions or activities performed by processing system 1321 may be to store data in memory 1322 and/or retrieve previously-stored data from memory 1322. The base station 1320 may communicate with wireless device 1310 using a transmission processing system 1324 and a reception processing system 1325. Although not shown in FIG. 13, transmission processing system 1324 and/or reception processing system 1325 may be coupled to a dedicated memory that is analogous to but separate from memory 1322, and comprises instructions that may be processed and/or executed to carry out one or more of their respective functionalities. The wireless device 1320 may comprise one or more antennas 1326 to access air interface 1370.

The base station 1320 may transmit downlink data to and/or receive uplink data from wireless device 1310 via air interface 1370. To perform the transmission and/or reception, one or more of the processing system 1321, transmission processing system 1324, and/or reception system 1325 may implement OSI functionality. As an example, transmission processing system 1324 and/or reception system 1325 may perform layer 1 OSI functionality, and processing system 1321 may perform higher layer functionality. The base station 1320 may transmit and/or receive data over air interface 1370 using one or more antennas 1326. For scenarios where the one or more antennas 1326 include multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise an interface system 1327. The interface system 1327 may communicate with one or more base stations and/or one or more elements of the core network via an interface 1380. The interface 1380 may be wired and/or wireless and interface system 1327 may include one or more components suitable for communicating via interface 1380. In FIG. 13, interface 1380 connects base station 1320 to a single deployment 1330, but it will be understood that wireless device 1310 may communicate with any number of base stations and/or CN deployments over interface 1380, and that deployment 1330 may communicate with any number of base stations and/or other CN deployments over interface 1380. The base station 1320 may comprise one or more other elements 1329 analogous to one or more of the one or more other elements 1319.

The deployment 1330 may comprise any number of portions of any number of instances of one or more network functions (NFs). The deployment 1330 may comprise a processing system 1331 and a memory 1332. The memory 1332 may comprise one or more computer-readable media, for example, one or more non-transitory computer readable media. The memory 1332 may include instructions 1333. The processing system 1331 may process and/or execute instructions 1333. Processing and/or execution of instructions 1333 may cause the deployment 1330 and/or processing system 1331 to perform one or more functions or activities. The memory 1332 may include data (not shown). One of the functions or activities performed by processing system 1331 may be to store data in memory 1332 and/or retrieve previously-stored data from memory 1332. The deployment 1330 may access the interface 1380 using an interface system 1337. The deployment 1330 may comprise one or more other elements 1339 analogous to one or more of the one or more other elements 1319.

One or more of the systems 1311, 1314, 1315, 1321, 1324, 1325, and/or 1331 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. One or more of the systems 1311, 1314, 1315, 1321, 1324, 1325, and/or 1331 may perform signal coding/processing, data processing, power control, input/output processing, and/or any other functionality that may enable wireless device 1310, base station 1320, and/or deployment 1330 to operate in a mobile communications system.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise computers, microcontrollers, microprocessors, DSPs, ASICs, FPGAs, and complex programmable logic devices (CPLDs). Computers, microcontrollers and microprocessors may be programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

The wireless device 1310, base station 1320, and/or deployment 1330 may implement timers and/or counters. A timer/counter may start at an initial value. As used herein, starting may comprise restarting. Once started, the timer/counter may run. Running of the timer/counter may be associated with an occurrence. When the occurrence occurs, the value of the timer/counter may change (for example, increment or decrement). The occurrence may be, for example, an exogenous event (for example, a reception of a signal, a measurement of a condition, etc.), an endogenous event (for example, a transmission of a signal, a calculation, a comparison, a performance of an action or a decision to so perform, etc.), or any combination thereof. In the case of a timer, the occurrence may be the passage of a particular amount of time. However, it will be understood that a timer may be described and/or implemented as a counter that counts the passage of a particular unit of time. A timer/counter may run in a direction of a final value until it reaches the final value. The reaching of the final value may be referred to as expiration of the timer/counter. The final value may be referred to as a threshold. A timer/counter may be paused, wherein the present value of the timer/counter is held, maintained, and/or carried over, even upon the occurrence of one or more occurrences that would otherwise cause the value of the timer/counter to change. The timer/counter may be un-paused or continued, wherein the value that was held, maintained, and/or carried over begins changing again when the one or more occurrence occur. A timer/counter may be set and/or reset. As used herein, setting may comprise resetting. When the timer/counter sets and/or resets, the value of the timer/counter may be set to the initial value. A timer/counter may be started and/or restarted. As used herein, starting may comprise restarting. In some embodiments, when the timer/counter restarts, the value of the timer/counter may be set to the initial value and the timer/counter may begin to run.

FIGS. 14A, 14B, 14C, and 14D illustrate various example arrangements of physical core network deployments, each having one or more network functions or portions thereof. The core network deployments comprise a deployment 1410, a deployment 1420, a deployment 1430, a deployment 1440, and/or a deployment 1450. Each deployment may be analogous to, for example, the deployment 1330 depicted in FIG. 13. In particular, each deployment may comprise a processing system for performing one or more functions or activities, memory for storing data and/or instructions, and an interface system for communicating with other network elements (for example, other core network deployments). Each deployment may comprise one or more network functions (NFs). The term NF may refer to a particular set of functionalities and/or one or more physical elements configured to perform those functionalities (e.g., a processing system and memory comprising instructions that, when executed by the processing system, cause the processing system to perform the functionalities). For example, in the present disclosure, when a network function is described as performing X, Y, and Z, it will be understood that this refers to the one or more physical elements configured to perform X, Y, and Z, no matter how or where the one or more physical elements are deployed. The term NF may refer to a network node, network element, and/or network device.

As will be discussed in greater detail below, there are many different types of NF and each type of NF may be associated with a different set of functionalities. A plurality of different NFs may be flexibly deployed at different locations (for example, in different physical core network deployments) or in a same location (for example, co-located in a same deployment). A single NF may be flexibly deployed at different locations (implemented using different physical core network deployments) or in a same location. Moreover, physical core network deployments may also implement one or more base stations, application functions (AFs), data networks (DNs), or any portions thereof. NFs may be implemented in many ways, including as network elements on dedicated or shared hardware, as software instances running on dedicated or shared hardware, or as virtualized functions instantiated on a platform (e.g., a cloud-based platform).

FIG. 14A illustrates an example arrangement of core network deployments in which each deployment comprises one network function. A deployment 1410 comprises an NF 1411, a deployment 1420 comprises an NF 1421, and a deployment 1430 comprises an NF 1431. The deployments 1410, 1420, 1430 communicate via an interface 1490. The deployments 1410, 1420, 1430 may have different physical locations with different signal propagation delays relative to other network elements. The diversity of physical locations of deployments 1410, 1420, 1430 may enable provision of services to a wide area with improved speed, coverage, security, and/or efficiency.

FIG. 14B illustrates an example arrangement wherein a single deployment comprises more than one NF. Unlike FIG. 14A, where each NF is deployed in a separate deployment, FIG. 14B illustrates multiple NFs in deployments 1410, 1420. In an example, deployments 1410, 1420 may implement a software-defined network (SDN) and/or a network function virtualization (NFV).

For example, deployment 1410 comprises an additional network function, NF 1411A. The NFs 1411, 1411A may consist of multiple instances of the same NF type, co-located at a same physical location within the same deployment

1410. The NFs 1411, 1411A may be implemented independently from one another (e.g., isolated and/or independently controlled). For example, the NFs 1411, 1411A may be associated with different network slices. A processing system and memory associated with the deployment 1410 may perform all of the functionalities associated with the NF 1411 in addition to all of the functionalities associated with the NF 1411A. In an example, NFs 1411, 1411A may be associated with different PLMNs, but deployment 1410, which implements NFs 1411, 1411A, may be owned and/or operated by a single entity.

Elsewhere in FIG. 14B, deployment 1420 comprises NF 1421 and an additional network function, NF 1422. The NFs 1421, 1422 may be different NF types. Similar to NFs 1411, 1411A, the NFs 1421, 1422 may be co-located within the same deployment 1420, but separately implemented. As an example, a first PLMN may own and/or operate deployment 1420 having NFs 1421, 1422. As another example, the first PLMN may implement NF 1421 and a second PLMN may obtain from the first PLMN (e.g., rent, lease, procure, etc.) at least a portion of the capabilities of deployment 1420 (e.g., processing power, data storage, etc.) in order to implement NF 1422. As yet another example, the deployment may be owned and/or operated by one or more third parties, and the first PLMN and/or second PLMN may procure respective portions of the capabilities of the deployment 1420. When multiple NFs are provided at a single deployment, networks may operate with greater speed, coverage, security, and/or efficiency.

FIG. 14C illustrates an example arrangement of core network deployments in which a single instance of an NF is implemented using a plurality of different deployments. In particular, a single instance of NF 1422 is implemented at deployments 1420, 1440. As an example, the functionality provided by NF 1422 may be implemented as a bundle or sequence of subservices. Each subservice may be implemented independently, for example, at a different deployment. Each subservices may be implemented in a different physical location. By distributing implementation of subservices of a single NF across different physical locations, the mobile communications network may operate with greater speed, coverage, security, and/or efficiency.

FIG. 14D illustrates an example arrangement of core network deployments in which one or more network functions are implemented using a data processing service. In FIG. 14D, NFs 1411, 1411A, 1421, 1422 are included in a deployment 1450 that is implemented as a data processing service. The deployment 1450 may comprise, for example, a cloud network and/or data center. The deployment 1450 may be owned and/or operated by a PLMN or by a non-PLMN third party. The NFs 1411, 1411A, 1421, 1422 that are implemented using the deployment 1450 may belong to the same PLMN or to different PLMNs. The PLMN(s) may obtain (e.g., rent, lease, procure, etc.) at least a portion of the capabilities of the deployment 1450 (e.g., processing power, data storage, etc.). By providing one or more NFs using a data processing service, the mobile communications network may operate with greater speed, coverage, security, and/or efficiency.

As shown in the figures, different network elements (e.g., NFs) may be located in different physical deployments, or co-located in a single physical deployment. It will be understood that in the present disclosure, the sending and receiving of messages among different network elements is not limited to inter-deployment transmission or intra-deployment transmission, unless explicitly indicated.

In an example, a deployment may be a 'black box' that is preconfigured with one or more NFs and preconfigured to communicate, in a prescribed manner, with other 'black box' deployments (e.g., via the interface 1490). Additionally or alternatively, a deployment may be configured to operate in accordance with open-source instructions (e.g., software) designed to implement NFs and communicate with other deployments in a transparent manner. The deployment may operate in accordance with open RAN (O-RAN) standards.

Figures 15A, 15B, 15C:
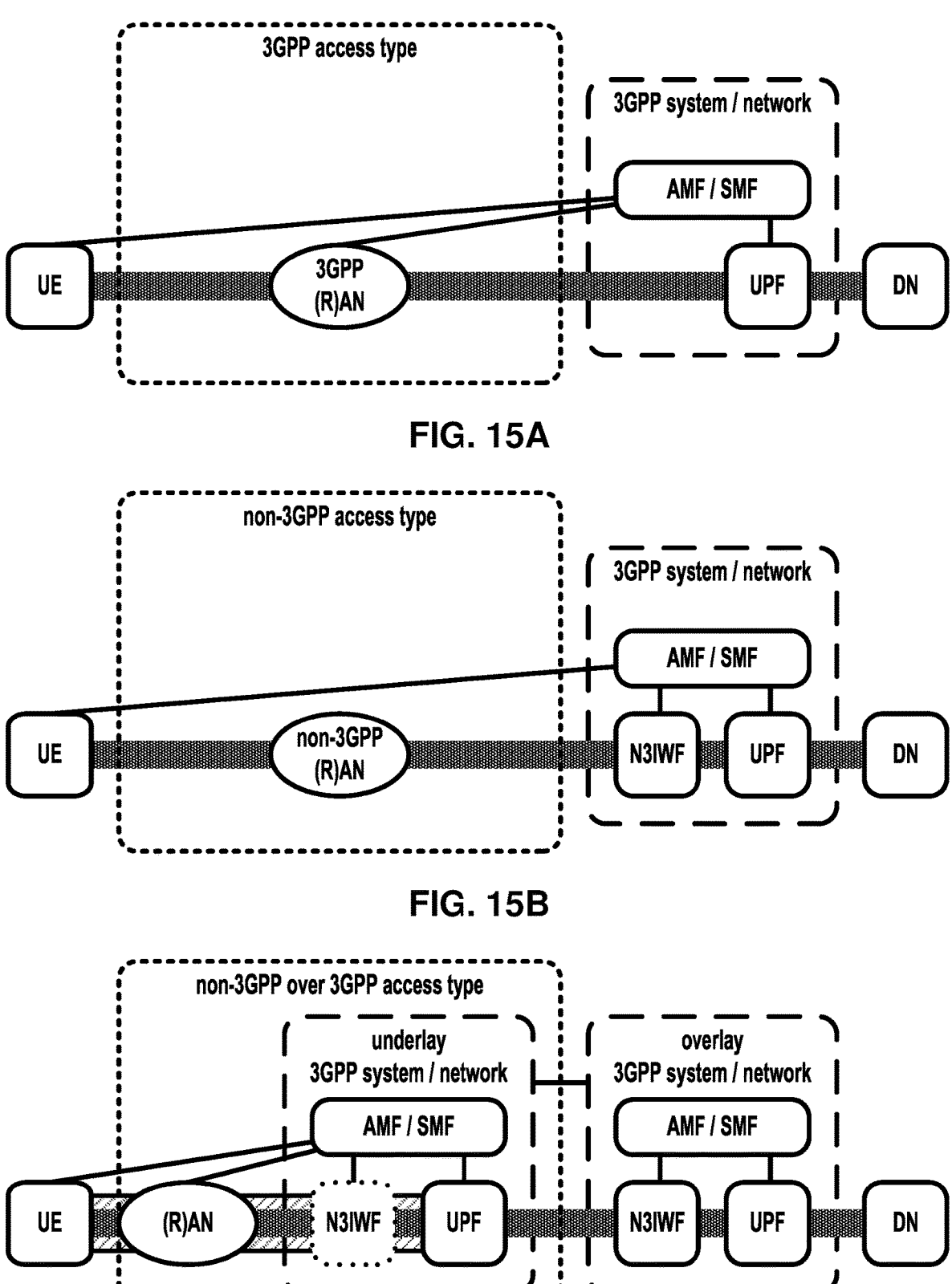
FIG. 15A illustrates an example embodiment of a present disclosure.
FIG. 15B illustrates an example embodiment of a present disclosure.
FIG. 15C illustrates an example embodiment of a present disclosure.

In an example embodiment as depicted in FIG. 15A, FIG. 15B and FIG. 15C, a UE may access a network via different access types. The UE may access the network via a 3GPP access type as in FIG. 15A. A 3GPP access type may comprise GRAN: GSM radio access network (GRAN), EDGE packet radio services with GRAN (GERAN), UMTS radio access network (UTRAN), E-UTRAN: The Long Term Evolution (LTE) high speed and low latency radio access network, New Radio (NR), 5G NR, and/or the like.

In an example, as depicted in FIG. 15B, a non-3GPP (N3GPP) access type may be employed. Examples of N3GPP access type may comprise trusted or untrusted WiFi access, IEEE based access, wireline access, fixed access, WiMAX, and/or the like. In an example, N31WF—Non-3GPP Interworking Function may be employed for access of a UE to the network via N3GPP access. The N3IWF may be employed for interworking between untrusted non-3GPP networks and the 5G Core. As such, the N3IWF may support both N2 and N3 based connectivity to the core, whilst supporting IPSec connectivity towards the UE.

Figure 16:
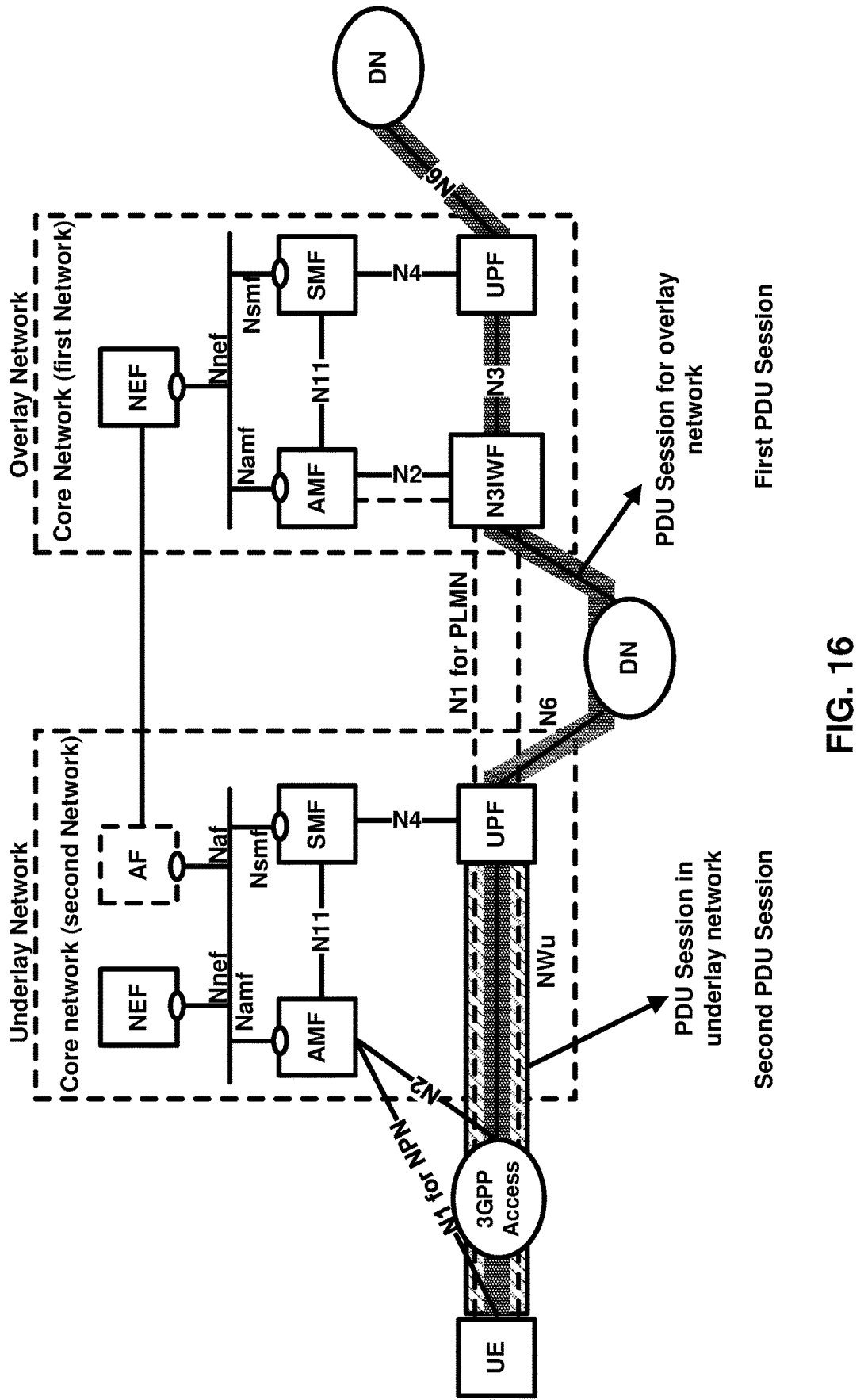
FIG. 16 illustrates an example embodiment of a present disclosure.
Figure 17:
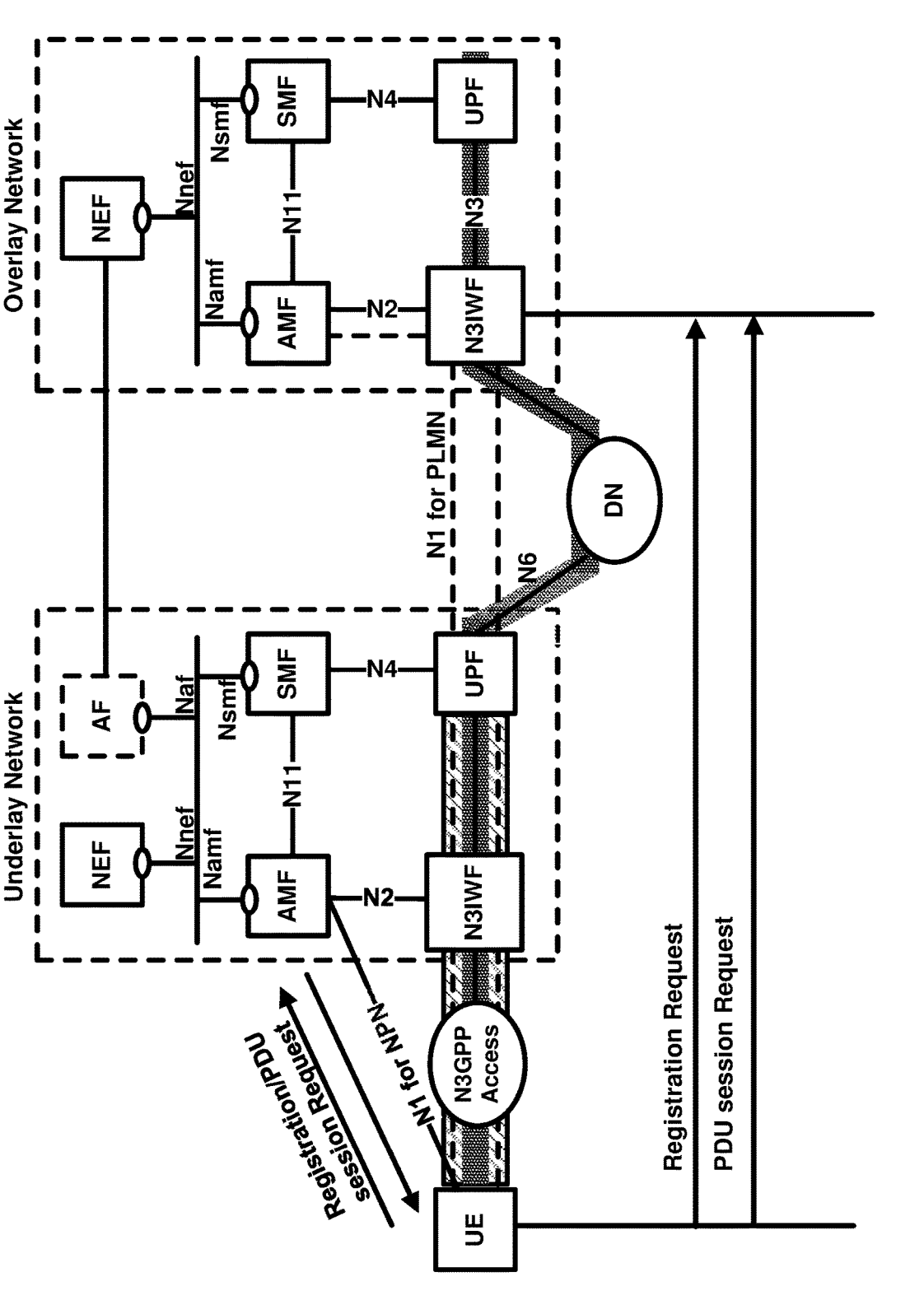
FIG. 17 illustrates an example embodiment of a present disclosure.

In an example embodiment as depicted in FIG. 15C, the UE may access the network (e.g., a PLMN, SNPN/NPN, etc.) via another network (referred to as an underlay network e.g., a PLMN, SNPN/NPN, and/or the like) such as a 3GPP network/system. In an example embodiment, an underlay network may be referred to as a hosting network, local hosting network, and/or the like. In an example embodiment the network may be an overlay network. In an example, the overlay network may be referred to as a home network. Access of the UE to the network via an underlay network may be referred to as an extended access type, an auxiliary access type, an underlay network access type, an intermediate access type, and/or the like. In an example, the extended access type may refer to access of the UE to an overlay network (or a first network) via a 3GPP access of an underlay network (a second network). In an example, the extended access type may refer to access of the UE to the overlay network (or the first network) via a N3GPP access of the underlay network (the second network). For example, the UE may access a network via 3GPP access or via non-3GPP access. In an example as depicted in FIG. 16, the UE may access an underlay network via the 3GPP access in order to access an overlay network via non-3GPP interworking function of the overlay network. As depicted in FIG. 17, the UE may access a network via the non-3GPP access of the underlay network in order to access an overlay network via non-3GPP interworking function of the overlay network. In an example, the extended access type may be a third access type such as underlay access, non-3GPP access over(via) 3GPP access, IPsec access over 3GPP access, and/or the like. In an example, an extended access type indication may be an indication that a UE may access a network via an underlay network. In an example, an extended access type indication may be an indication that an overlay network may be involved. The extended access type indication may comprise an indication that the UE may employ configuration parameters from at least one of a first network (overlay network) and a second network (underlay network). The configuration parameters may comprise UE route selection policy URSP, TAI, registration area, mobility restrictions, and/or the like.

In an example embodiment, the extended access type or extended access type indication may refer to a RAT type whereby the RAT type may be within a 3GPP access or a N3GPP access. In an example, when the extended access type refers to the RAT type, the RAT type may indicate that the access is via a user plane of the underlay network (e.g., a 3GPP network/system) and the 3GPP access type or N3GPP access type of the underlay network may be employed. In an example embodiment, access via an underlay network to an overlay network may be defined and/or interpreted as a RAT type. In an example, the RAT type may be the extended access type.

In an example embodiment, mobility restrictions may be employed to restrict mobility handling or service access of a UE. the mobility restriction functionality is provided by the UE, the radio access network and the core network. In an example, service area restrictions and handling of forbidden areas for CM-IDLE state and, for CM-CONNECTED state when in RRC Inactive state may be executed by the UE based on information received from the core network. Mobility restrictions for CM-CONNECTED state when in RRC-Connected state may be executed by the radio access network and the core network. In CM-CONNECTED state, the core network may provide mobility restrictions to the radio access network within mobility restriction list.

In an example embodiment, mobility restrictions may comprise RAT restriction, forbidden area, service area restrictions, core network type restriction and closed access group information as follows.

In an example, RAT restriction may define the 3GPP Radio Access Technology(ies), a UE is not allowed to access in a PLMN. In a restricted RAT a UE based on subscription is not permitted access to the network for this PLMN. For CM-CONNECTED state, when radio access network determines target RAT and target PLMN during Handover procedure, it should take per PLMN RAT restriction into consideration. The RAT restriction may be enforced in the network, and may (or may not) be provided to the UE.

In an example, in a forbidden area, the UE, based on subscription, may not be permitted to initiate any communication with the network for this PLMN. The UE behaviour in terms of cell selection, RAT selection and PLMN selection may depend on the network response that informs the UE of forbidden area. A forbidden area may apply either to 3GPP access or to non-3GPP access. If the N3GPP TAI is forbidden in a PLMN, non-3GPP Access may be forbidden altogether in this PLMN.

Service area restriction may define areas in which the UE may or may not initiate communication with the network as follows: Allowed Area: in an Allowed Area, the UE is permitted to initiate communication with the network as allowed by the subscription. Non-Allowed Area: in a Non-Allowed Area a UE is service area restricted based on subscription. The UE and the network are not allowed to initiate Service Request, or any connection requests for user plane data, control plane data, exception data reporting, or SM signalling (except for PS Data Off status change reporting) to obtain user services that are not related to mobility. The UE may (or may not) use the entering of a Non-Allowed Area as a criterion for Cell Reselection, a trigger for PLMN Selection or Domain selection for UE originating sessions or calls. The UE in a Non-Allowed Area may respond to core network paging or NAS notification message from non-3GPP access with service request and RAN paging. The UE in a Non-Allowed Area may initiate MA PDU Session establishment or activation over a non-3GPP access other than wireline access, but the User Plane resources on the 3GPP access for the MA-PDU may not be established or activated.

In an example, core Network type restriction may defines whether UE is allowed to connect to 5GC only, EPC only, both 5GC and EPC for this PLMN. The Core Network type restriction when received applies in the PLMN either to both 3GPP and non-3GPP Access Types or to non-3GPP Access Type only. The core network type restriction may be used e.g. in network deployments where the E-UTRAN connects to both EPC and 5GC. When the core network type restriction applies to non-3GPP Access Type, the UE may be restricted from using any connectivity to an N3IWF.

In an example, closed access group (CAG) information may identify a group of subscribers who are permitted to access one or more CAG cells associated to the CAG. CAG may be employed for public network integrated non-public network (PNI-NPNs) to prevent UE(s), which are not allowed to access the NPN via the associated cell(s), from automatically selecting and accessing the associated CAG cell(s).

For a given UE, the core network determines the Mobility Restrictions based on UE subscription information, UE location and/or local policy (e.g. if the HPLMN has not deployed 5GC, HPLMN ID of the UE and the operator's policy are used in the VPLMN for determining the Core Network type restriction). The Mobility Restriction may change due to e.g., UE's subscription, location change and local policy. Optionally the service area restrictions or the non-allowed area may in addition be fine-tuned by the PCF e.g., based on UE location, PEI and network policies. Service area restrictions may be updated during a registration procedure or UE configuration update procedure.

In an example embodiment as depicted in FIG. 16 and FIG. 17, a UE may access to a first network (overlay network) services via a second network (e.g., non-public network, PLMN, underlay network). The UE may first obtain IP connectivity by registering with the underlay network. Then the UE may obtain connectivity to the 5GC in the overlay network via an interworking function (e.g., a proxy, N3IWF, and/or the like). The underlay network may deploy a 3GPP RAT (as in FIG. 16), N3GPP RAT (as in FIG. 17), and/or the like.

Figure 18A:
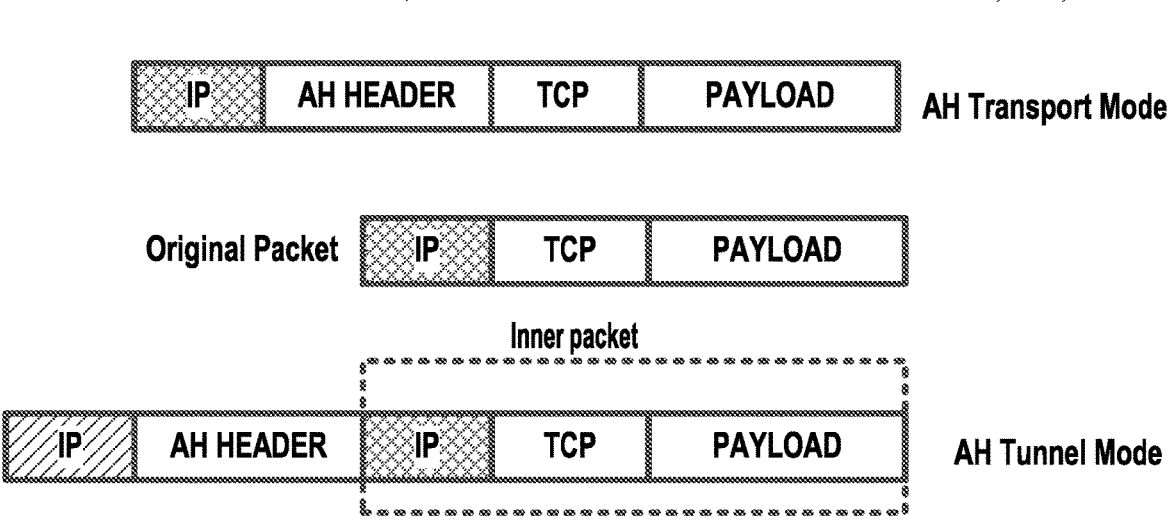
FIG. 18A illustrates an example embodiment of a present disclosure.
Figure 18B:
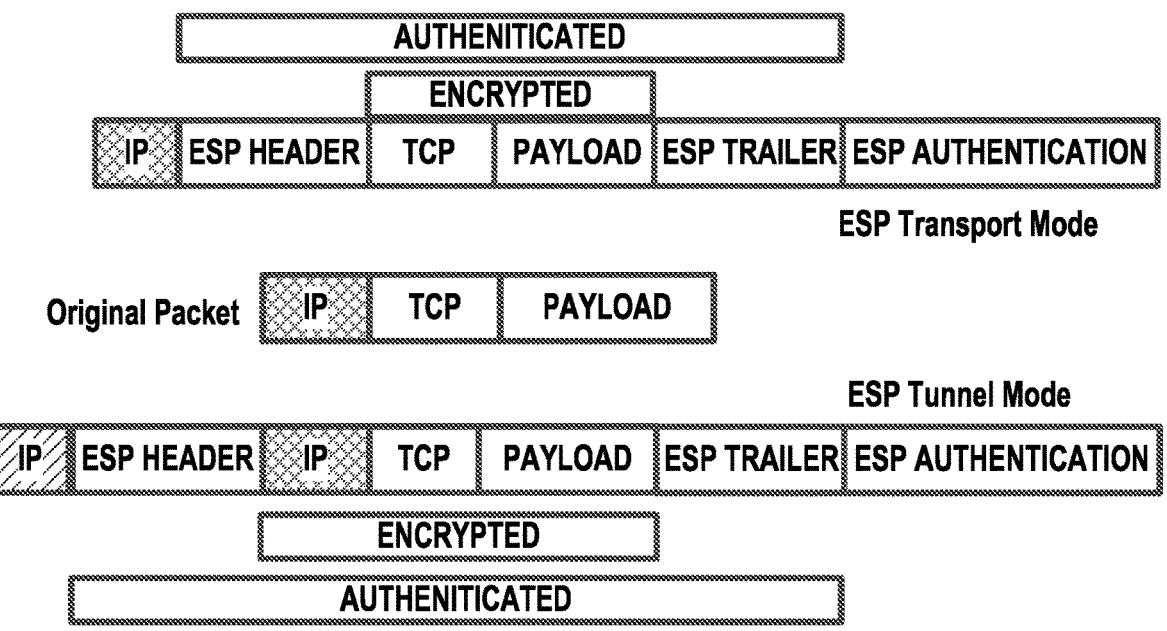
FIG. 18B illustrates an example embodiment of a present disclosure.

In an example embodiment as depicted in FIG. 18, Internet Protocol Security (IPsec) may be a secure network protocol suite that authenticates and encrypts the packets of data to provide secure encrypted communication between two computers over an Internet Protocol network. IPsec may include protocols for establishing mutual authentication between agents at the beginning of a session and negotiation of cryptographic keys to use during the session. IPsec may protect data flows between a UE and an N3IWF, between a pair of hosts (host-to-host), between a pair of security gateways (network-to-network), or between a security gateway and a host (network-to-host). IPsec may employ cryptographic security services to protect communications over Internet Protocol (IP) networks. It may support network-level peer authentication, data-origin authentication, data integrity, data confidentiality (encryption), and replay protection. In an example, IPsec may be a layer 3 OSI model or internet layer end-to-end security scheme. In an example, IPsec may employ the following protocols to perform various functions: Authentication Headers (AH) as in FIG. 18(*a*) may provide connectionless data integrity and data origin authentication for IP datagrams and may provide protection against replay attacks. In an example, Encapsulating Security Payloads (ESP) as in FIG. 18(*b*) may provide confidentiality, connectionless data integrity, data-origin authentication, an anti-replay service (a form of partial sequence integrity), and limited traffic-flow confidentiality. Internet Security Association and Key Management Protocol (ISAKMP) may provide a framework for authentication and key exchange, with actual authenticated keying material provided either by manual configuration with pre-shared keys, Internet Key Exchange (IKE and IKEv2), Kerberized Internet Negotiation of Keys (KINK), or IPSECKEY DNS records. The purpose is to generate the Security Associations (SA) with the bundle of algorithms and parameters necessary for AH and/or ESP operations. In an example, AH header format may comprise Next Header (8 bits) (e.g., Type of the next header, indicating what upper-layer protocol was protected. The value may be taken from the list of IP protocol numbers), Payload Len (8 bits) (e.g., the length of this Authentication Header in 4-octet units, minus 2. For example, an AH value of 4 equals 3×(32-bit fixed-length AH fields)+3×(32-bit ICV fields)−2 and thus an AH value of 4 means 24 octets. Although the size is measured in 4-octet units, the length of this header needs to be a multiple of 8 octets if carried in an IPv6 packet. This restriction does not apply to an Authentication Header carried in an IPv4 packet), Reserved (16 bits) bits, Security Parameters Index SPI (32 bits) (e.g., an arbitrary value which is used (together with the destination IP address) to identify the security association of the receiving party), Sequence Number (32 bits) (e.g., a monotonic strictly increasing sequence number (incremented by 1 for every packet sent) to prevent replay attacks. When replay detection is enabled, sequence numbers are never reused, because a new security association must be renegotiated before an attempt to increment the sequence number beyond its maximum value), Integrity Check Value (multiple of 32 bits) (e.g., variable length check value. It may contain padding to align the field to an 8-octet boundary for IPv6, or a 4-octet boundary for IPv4).

In an example, ESP header format may comprise Security Parameters Index SPI (32 bits) (an arbitrary value used (together with the destination IP address) to identify the security association of the receiving party), Sequence Number (32 bits) (a monotonically increasing sequence number (incremented by 1 for every packet sent) to protect against replay attacks. There is a separate counter kept for every security association), Payload data (variable size)(e.g., the protected contents of the original IP packet, including any data used to protect the contents (e.g., an Initialization Vector for the cryptographic algorithm). The type of content that was protected is indicated by the Next Header field), padding (0-255 octets)(Padding for encryption, to extend the payload data to a size that fits the encryption's cipher block size, and to align the next field.), Pad Length (8 bits)(Size of the padding (in octets)), Next Header (8 bits) (e.g., type of the next header. The value is taken from the list of IP protocol numbers), and Integrity Check Value (multiple of 32 bits)(Variable length check value. It may contain padding to align the field to an 8-octet boundary for IPv6, or a 4-octet boundary for IPv4).

In an example, Generic Routing Encapsulation (GRE) may be employed for tunneling between the N3IWF and the UE. GRE is a tunneling protocol that may encapsulate a wide variety of network layer protocols inside virtual point-to-point links or point-to-multipoint links over an Internet Protocol (IP) network.

In an example embodiment as depicted in FIG. 18, a UE may access network 1 via network 2. In an example, the UE may have two subscription e.g., one PLMN (aka "PLMN UE" for PLMN parts of the UE) and one SNPN (aka "SNPN UE" for SNPN parts of the UE) subscription. The scenarios described may employ PLMN and SNPN, but same principles may apply between SNPNs, if allowed.

In an example embodiment as depicted in FIG. 18, the UE may be either in connected state or in a power saving state in the serving network (network 1) and still get service from the other network. The UE may be always in CM connected state in both networks and that the IPsec tunnel between the UE and N3IWF over Nwu may be always maintained. It may involve that the UE send IPsec keep alive messages. In an example, in order for the UE to maintain an IPSec tunnel to network 1, a PDU session in network 1 may be required. As depicted in FIG. 18, the UE may register to the network 2 (e.g., NPN). The UE may request service in order to setup an IPsec tunnel to the N3IWF. The service request may need to indicate the specific service (connection to the PLMN/ network 2). The PDU session may be setup in network 2. The AMF may include in the RRC inactive assistance information that this UE may only be released to RRC Inactive and may send the RRC inactive assistance information to the RAN. This behavior in the AMF may be triggered by 1) either based on the UE indication in the NAS message (SR or PDU session establishment), or 2) informed by the SMF/UPF. The SMF/UPF, when the SMF/UPF detect that the target address for the IPSec tunnel is a known N3IWF of a PLMN (in this case the RRC Inactive Assistance IE may need to be updated if already sent). UE sets up the IPSec tunnel and registers to the PLMN (network 1). Due to inactivity in the network 1 (NPN) the RAN may release the UE to RRC Inactive mode. RAN may receive DL data or NAS message from the PLMN (network 1) to the UE. The RAN node may page the UE. The UE may resume the RRC-Connection. The DL data or NAS message may be sent to the UE.

In an example, FIG. 18 may depict an example registration and access procedure of a UE to the second network (network 2) in accordance with embodiments of the present disclosure. In an example, the UE may send a registration request message or a NAS message to the AMF via a base station of the second network. Upon completion of the registration procedure, the AMF may send a registration accept message to the UE that may comprise a support indication for IPSec with the first network, an underlying network capability support indication, one or more network IDs (e.g., SNPN ID). The one or more network IDs may indicate that the network may support underlying network capability for the one or more networks e.g., SNPN. The one or more network IDs may indicate that the network supports onboarding for the one or more networks. The registration accept message may comprise a CAG ID, S-NSSAI, and/or the like that may be employed for underlying network capability support, or IPSec tunnel to the second network. The UE may employ an element of the registration accept message to send a PDU session establishment request message. The PDU session establishment request message may comprise the CAG ID for underlying network access to the first network via the second network, the S-NSSAI for underlying network access to the first network via the second network, and/or the like. Upon establishment of the PDU session for underlying network access, the UE may establish or configure a connection, IPSec tunnel, and/or the like to an interworking function (N3IWF) of the first network. In an example, during the PDU session establishment procedure the SMF of the second network may select a UPF that can be connected to or have a logical/physical connectivity to the N3IWF of the first network. The SMF may select the UPF that may support underlying network capability.

Figure 19:
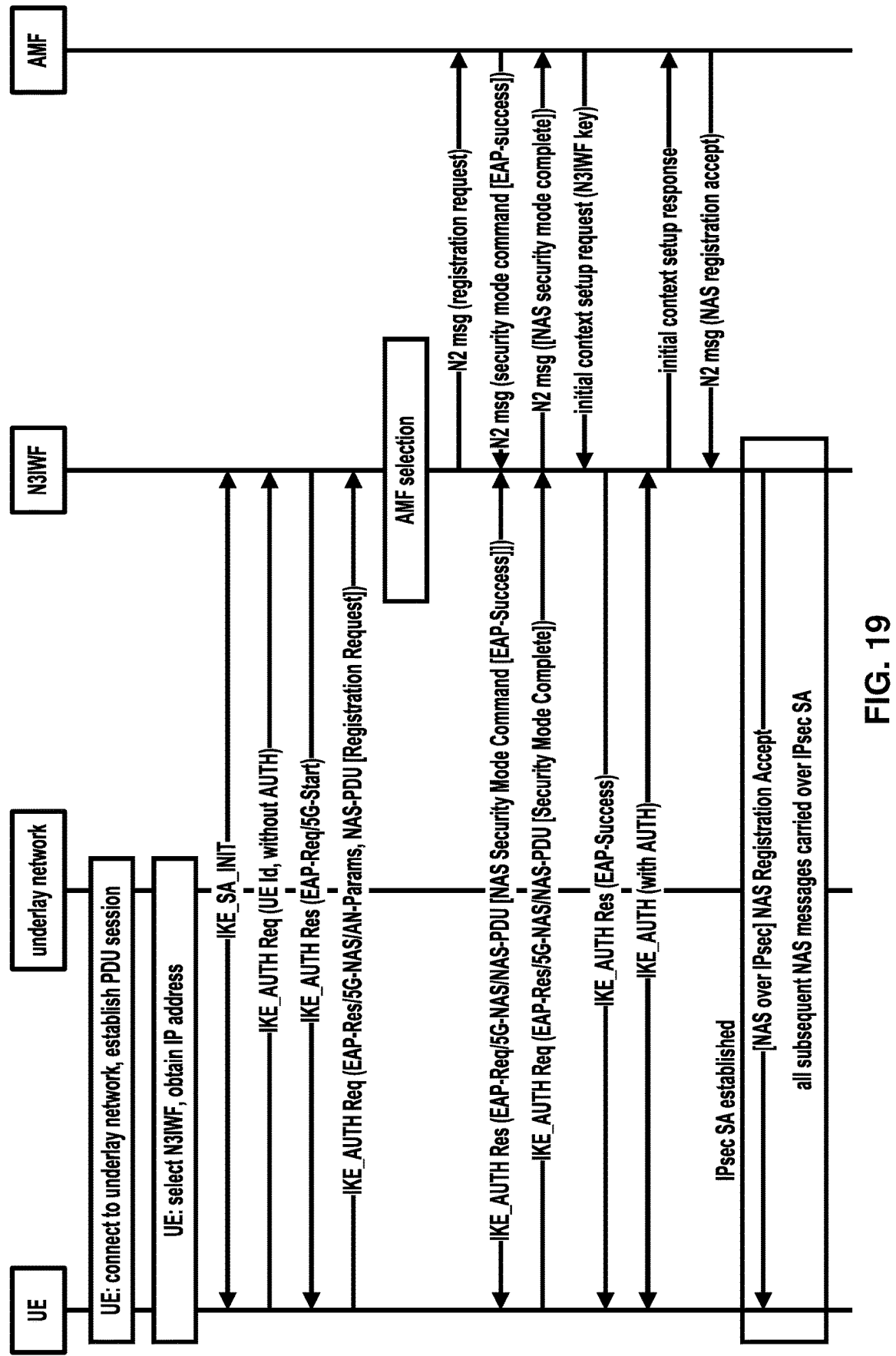
FIG. 19 illustrates an example embodiment of a present disclosure.

In an example as depicted in FIG. 19, the UE may connect to the underlay network using the registration procedure. The UE may establish a PDU session with the underlying network using the PDU session establishment procedure. In an example, to connect to an N3IWF of the overlay network, the UE may select an N31WF.

In an example, the UE may the establish an IPsec Security Association (SA) with the selected N3IWF by initiating an IKE initial exchange. All subsequent IKE messages may be encrypted and integrity protected by using the IKE SA established. In an example, the UE may initiate an IKE_ AUTH exchange by sending an IKE_AUTH request message. The AUTH payload may or may not be included in the IKE_AUTH request message, which may indicate that the IKE_AUTH exchange may use EAP signaling (for example, EAP-5G signalling). If the UE supports MOBIKE, it may include a notify payload in the IKE_AUTH request, indicating that MOBIKE is supported. In an example, if the UE is provisioned with the N3IWF root certificate, it may include the CERTREQ payload within the IKE_AUTH request message to request the N3IWF's certificate.

In an example, the N3IWF may respond with an IKE_ AUTH response message, which may include an EAP-Request/5G-Start packet. The EAP-Request/5G-Start packet may inform the UE to initiate an EAP-5G session, e.g., to start sending NAS messages encapsulated within EAP-5G packets. If the N3IWF has received a CERTREQ payload from the UE, the N3IWF may include the CERT payload in the IKE_AUTH response message comprising the N3IWF's certificate.

In an example, the UE may send an IKE_AUTH request, which may comprise an EAP-Response/5G-NAS packet that may comprise the access network parameters (AN parameters) and a registration request message. The AN parameters may comprise information that is used by the N3IWF for selecting an AMF in the 5G core network (e.g., overlay network). This information may comprise e.g., the GUAMI, the selected PLMN ID (or PLMN ID and NID, SNPN ID, and/or the like), the requested NSSAI, the establishment cause, and/or the like. The establishment cause may provide the reason for requesting a signaling connection with 5GC.

In an example, the N3IWF may select an AMF based on the received AN parameters and local policy. The N3IWF may forward the registration request received from the UE to the selected AMF within an N2 message. The N2 message may comprise N2 parameters that include the selected PLMN ID and the establishment cause. The selected AMF may determine/decide to request the SUCI by sending a NAS identity request message to the UE. This NAS message and all subsequent NAS messages may be sent to the UE encapsulated within EAP/5G-NAS packets. In an example, the AMF may determine/decide to authenticate the UE by invoking an AUSF. The AMF may select an AUSF based on the SUPI or SUCI. In an example, the AUSF may execute the authentication of the UE. The AUSF may select a UDM and may get or receive the authentication data from the UDM. The authentication packets may be encapsulated within NAS authentication messages and the NAS authentication messages are encapsulated within EAP/5G-NAS packets. In an example, upon successful authentication: the AUSF may send the anchor key (SEAF key) to AMF which may be used by AMF to derive NAS security keys and a security key for N3IWF (N3IWF key). The UE may derive the anchor key (SEAF key) and from that key it derives the NAS security keys and the security key for N3IWF (N3IWF key). The N3IWF key may used by the UE and N3IWF for establishing the IPsec Security Association. The AUSF may include the SUPI that the AMF provided to AUSF a SUCI.

In an example, the AMF may send a NAS security mode command to the UE in order to activate NAS security. If an EAP-AKA' authentication was successfully executed, the AMF may encapsulate the EAP-Success received from AUSF within the NAS security mode command message. The N3IWF may forward the NAS security mode command message to the UE within an EAP/5G-NAS packet. The UE may complete the EAP-AKA' authentication, creates a NAS security context and an N3IWF key and may send the NAS security mode complete message within an EAP/5G-NAS packet. The N31WF may relay/transmit the NAS security mode complete message to the AMF.

In an example, upon receiving NAS security mode complete, the AMF may send an NGAP initial context setup request message that includes the N3IWF key. This may trigger the N3IWF to send an EAP-Success to the UE, which completes the EAP-5G session.

In an example, the IPsec SA may be established between the UE and N3IWF by using the common N3IWF key that was created in the UE and received by the N3IWF. The established IPsec SA may be referred to as the signalling IPsec SA. After the establishment of the signalling IPsec SA, the N3IWF may notify the AMF that the UE context (including AN security) was created by sending a NGAP initial context setup response. The signalling IPsec SA may be configured to operate in tunnel mode and the N31WF may assign to UE an inner IP address (a first IP address). If the N31WF has received an indication that the UE supports MOBIKE, then the N31WF may include a notify payload in the IKE_AUTH response message, indicating that MOBIKE may be supported.

In an example, all subsequent NAS messages exchanged between the UE and N3IWF may be sent via the signaling IPsec SA and may be carried over TCP/IP or the like. The UE may send NAS messages within TCP/IP packets with source address the inner IP address of the UE and destination address the NAS_IP_ADDRESS. The N3IWF may send NAS messages within TCP/IP packets with source address the NAS_IP_ADDRESS and destination address the inner IP address of the UE. The TCP connection used for reliable NAS transport between the UE and N3IWF may be initiated by the UE after the signalling IPsec SA is established. The UE may send the TCP connection request to the NAS_IP_ADDRESS and to the TCP port number.

In an example, the AMF may send the NAS registration accept message to the N3IWF. The N2 Message may comprise the Allowed NSSAI for the access type for the UE. The N3IWF may send or forward the NAS registration accept to the UE via the established signaling IPsec SA. If the NAS registration request message is received by the N3IWF before the IPsec SA is established, the N3IWF may store it and forward it to the UE only after the establishment of the signaling IPsec SA. In an example, the AMF may provide the access type set to Non-3GPP access to the UDM when it registers with the UDM. In an example, the AMF may provide the access type set to underlay network access, IPSec tunnel access, the underlay or underlying network 3GPP access, and/or the like to the UDM when it registers with the UDM. In an example embodiment, the access type may be set to non-3GPP access over 3GPP access.

Figure 20:
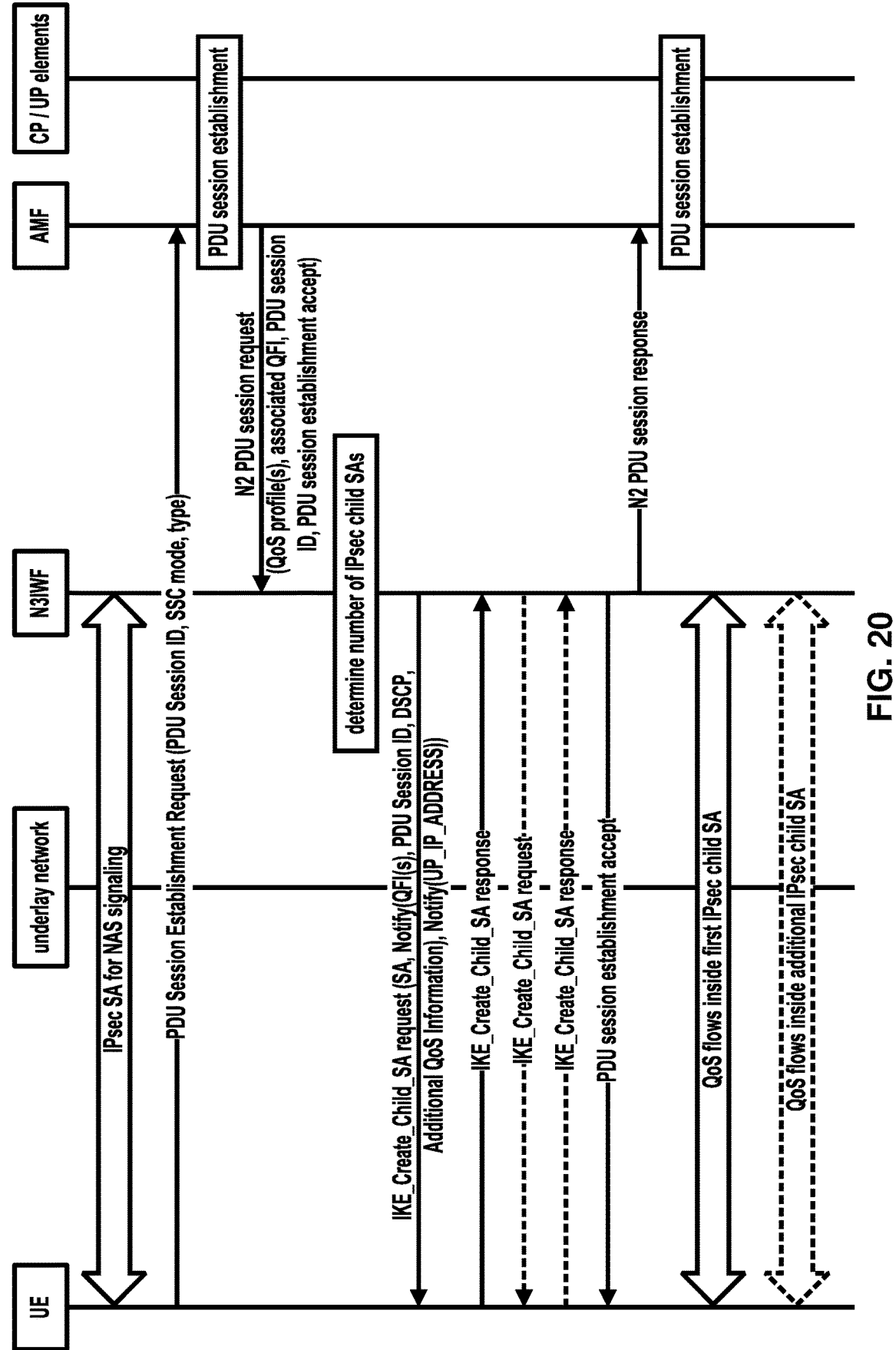
FIG. 20 illustrates an example embodiment of a present disclosure.

In an example embodiment as depicted in FIG. 20, the UE may send a PDU session establishment request message to the AMF of the overlay network via the N3IWF. The PDU session establishment request message may be sent to the N3IWF via the IPsec SA for NAS signalling and the N3IWF may transparently forward/send it to the AMF in the 5GC (e.g., the overlay network). In an example, the AMF may send a N2 PDU session request message to N3IWF to establish the access resources for this PDU Session. Based on its own policies and configuration, and based on the QoS profiles received, the N3IWF may determine the number of IPsec Child SAs to establish and the QoS profiles associated with each IPsec Child SA. For example, the N3IWF may decide/determine to establish one IPsec Child SA and associate all QoS profiles with this IPsec Child SA. In this case, all QoS Flows of the PDU Session may be transferred over one IPsec Child SA. The N3IWF may send to the UE an IKE Create_Child_SA request to establish the first IPsec Child SA for the PDU Session. In an example, the IKE Create_Child_SA request may be an IPsec create child SA request. The IKE Create_Child_SA request indicates that the requested IPsec Child SA may operate in tunnel mode. This request may include a 3GPP-specific notify payload which contains (a) the QFI(s) associated with the Child SA, (b) the identity of the PDU session associated with this Child SA, (c) a DSCP value associated with the Child SA, (d) a Default Child SA indication, and (e) the additional QoS Information, and/or the like. The IKE Create_Child_SA request may comprise another 3GPP-specific notify payload, which contains a UP_IP_ADDRESS. If a DSCP value is included, then the UE and the N31WF may mark all IP packets sent over this Child SA with this DSCP value. There may be one default child SA per PDU session. The UE may send all QoS flows to this Child SA for which there is no mapping information to a specific Child SA. The IKE Create_Child_SA request may comprise other information such as the SA payload, the traffic selectors (TS) for the N3IWF and the UE. After receiving the IKE Create_Child_SA request, if the Additional QoS Information is received, the UE may reserve non-3GPP access network resources according to the additional QoS information.

In an example, if the UE accepts the new IPsec Child SA, the UE may send an IKE Create_Child_SA response. During the IPsec Child SA establishment the UE may or may not be assigned an IP address. If the N3IWF determined to establish multiple IPsec Child SAs for the PDU session, then additional IPsec Child SAs may be established, additional IPsec Child SAs may be associated with one or more QFI(s), with a DSCP value, with a UP_IP_ADDRESS and with the Additional QoS Information. For IPsec Child SA, if the additional QoS information is received, the UE may reserve non-3GPP access network resources according to the additional QoS information for the IPsec Child SA.

In an example, after IPsec Child SAs are established, the N3IWF may forward to UE via the signalling IPsec SA the PDU session establishment accept message. The N3IWF may send to the AMF an N2 PDU session response.

In an example, on the user-plane, when the UE has to transmit an UL PDU, the UE may determine the QFI associated with the UL PDU (by using the QoS rules of the PDU Session), it may encapsulate the UL PDU inside a GRE packet and may forward the GRE packet to N3IWF via the IPsec Child SA associated with this QFI. The header of the GRE packet carries the QFI associated with the UL PDU. The UE may encapsulate the GRE packet into an IP packet with source address the inner IP address of the UE and destination address the UP_IP_ADDRESS associated with the Child SA.

In an example, when the N3IWF receives a DL PDU via N3, the N3IWF may use the QFI and the identity of the PDU session in order to determine the IPsec Child SA to use for sending the DL PDU over NWu. The N3IWF may encapsulate the DL PDU inside a GRE packet and copies the QFI in the header of the GRE packet. The N3IWF may include in the GRE header a Reflective QoS Indicator (RQI), which may be used by the UE to enable reflective QoS. The N3IWF may encapsulate the GRE packet into an IP packet with source address the UP_IP_ADDRESS associated with the Child SA and destination address the inner IP address of the UE.

In an example embodiment, an extended access type, an auxiliary access type, an underlay network access type, an intermediate access type, and/or the like, may refer to an access type wherein the UE may access a network (e.g., an overlay network) via an access network and user plane connection of another network (referred to as an underlay network). The extended access type may be associated or be employed to establish a first PDU session of the UE in the overlay network. The user plane connection of the UE in the underlay network may be provided by a second PDU session of the UE in the underlay network. The second PDU session may be employed to establish an IPsec connectivity between the UE and the N3IWF of the overlay network. In an example, access of the UE to the N31WF of the overlay network via the user plane resources of the underlay network may be referred to as the extended access type. For example, the UE may access the overlay network via 3GPP access or via non-3GPP access. In an example the UE may access the underlay network via the 3GPP access in order to access an overlay network via the N3IWF of the overlay network. In an example the UE may access a network via the non-3GPP access of the underlay network in order to access an overlay network via non-3GPP interworking function of the overlay network. From the overlay network perspective, such access may be referred to as extended access type (or the auxiliary access type, underlay network access type, intermediate access type, and/or the like). In an example, the extended access type may be a third access type such as underlay access, non-3GPP access over(via) 3GPP access, IPsec access over 3GPP access, and/or the like. In an example, an extended access type indication may be an indication that an overlay network may be accessed via an underlay network. The extended access type indication may comprise an indication that the UE may employ configuration parameters from at least one of the first network (overlay network) and the second network (underlay network). The configuration parameters may comprise UE route selection policy URSP, TAI, registration area, the mobility restrictions, and/or the like.

In an example embodiment, a rejection cause may be sent by the network to the UE. The rejection cause may comprise an indication that N1 mode is not allowed for N3GPP access type, N1 mode is not allowed for the extended access type, and/or the like. The N1 mode is not allowed indication may indicate that access of the UE to the network via N3GPP, 3GPP, or extended access type may not be permitted based on subscription or operator policy. In an example, the N1 mode not allowed indication may be an access rejection indication that may be based on an AN parameter, access type, radio access type (RAT type), access restrictions, the mobility restrictions, and/or the like. In an example, when EPC and E-UTRA is used, S1 mode capability may be employed. In an example, the error or rejection cause may indicate S1 mode not allowed. The MME may send to the RAN node and to the UE a NAS message indicating that S1 mode is not allowed for the access type or the RAT type.

In an example, FIG. 16 and FIG. 17 may depict an example wherein a UE may send access request to an underlay network. The access request may comprise an indication that the UE may access the underlay network to establish a connection for accessing an overlay network. In an example, access restrictions may apply to the UE. The access restrictions may be determined by the underlay network based on the subscription of the UE in the underlay network and/or the overlay network. The access restrictions may be determined by the overlay network based on the subscription of the UE in the overlay network. In an example, access restrictions may comprise the mobility restrictions. In an example, the mobility restrictions may comprise RAT restriction, forbidden area, service area restrictions, core network type restriction and closed access group information, and/or the like.

In an example embodiment as depicted in FIG. 16 and FIG. 17, the access restrictions may be configured by the overlay network, or underlay network and may be implemented (applied, imposed, enforced) by the UE, or an entity (such as RAN node, a core network entity) of the overlay network or the underlay network.

Figure 21:
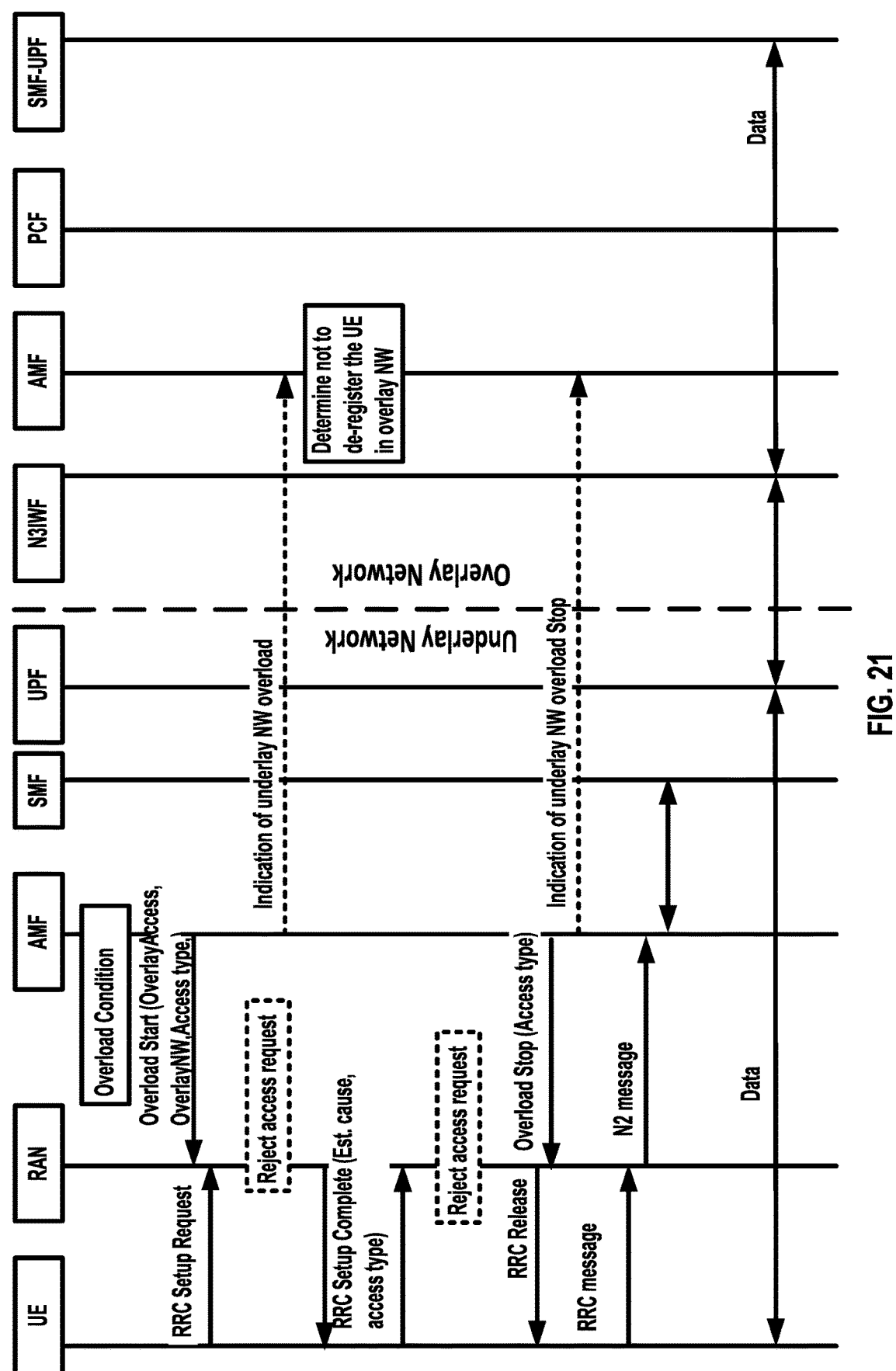
FIG. 21 illustrates an example embodiment of a present disclosure.

A wireless device (UE) may determine to establish a first PDU session with an overlay network. As depicted in FIG. 21, the UE may access the overlay network (e.g., a PLMN, or SNPN) via an underlay network (e.g., a PLMN or SNPN). The UE may access the overlay network via a 3GPP access (e.g., a RAN node). The UE may register with the underlay network, then establish a second PDU session with the underlay network. The UE may employ the second PDU session to establish IPsec connectivity with an N3IWF of the overlay network. The UE may employ the IPsec connection to register with the overlay network and establish the first PDU session with the overlay network.

In an example as depicted in FIG. 21, when a network is employed to provide underlay access to one or more overlay networks, overload or congestion may occur. In an example, in existing technologies when an overlay network is overloaded or congested, and transmission and reception of traffic may be suspended, an associated PDU session in the underlay network may be deactivated or release resources of the associated PDU session (e.g., the second PDU session). In an example, when the underlay network is in overload or congestion state and traffic of the second PDU session may not be transmitted, the overlay network may trigger deactivation of resources in the overlay network and may deregister the UE in the overlay network. Upon alleviation of the overload in overlay network, excessive signalling and delay may occur to activate or re-establish the resources.

Example embodiments improve system performance by signalling enhancements between the UE and the underlay network to assist the underlay network in a determination of status based on the condition of the overlay network. Furthermore, example embodiments improve system performance by signalling enhancements between the underlay network and the overlay network to assist the underlay network in a determination of status based on the condition of the overlay network.

In an example, in existing technologies, an N3IWF may perform an overload or congestion notification to the UE based on internal load or based on receiving an overload start message from an AMF. The overload start message may comprise an overload action information element (IE) that determines actions based on a N3GPP establishment cause. When the UE is accessing the network via an underlay network, the N3GPP establishment cause may not be sufficient to determine (distinguish) establishment cause of underlay access from a N3GPP access. The N3IWF may not perform appropriate action based on an element of a message received from the AMF.

Example embodiments improve system performance by signalling enhancements of access request with an establishment cause associated with the underlay access to assist the N3IWF perform overload control based on the overload action IE. Furthermore, example embodiments, enhance signalling of N2 interface between the AMF and the N3IWF to assist the N3IWF actions based on the access type. Example embodiments comprise overload procedures based on an extended access establishment cause (EAEC), or an underlay access establishment cause.

In an example, in existing technologies, the UE may receive from the network a backoff timer. When the N3IWF performs overload control, the N3IWF may send a N3GPP backoff timer and a congestion notify payload. The UE may determine that the received parameters may associate to a N3GPP access such as WiFi. In an example, the UE may apply the received parameters for an access attempt via a N3GPP access instead of the underlay network access. Excessive signalling and inconsistent UE behaviours may degrade system performance.

Example embodiments improve system performance by signalling enhancements between the UE and the N3IWF for overload control. Example embodiments may comprise a backoff timer and indication of overload control for underlay access type.

In an example embodiment, The AMF may perform mechanisms for avoiding and handling overload situations. The overload control may comprise at least one of the following measures: N2 overload control that may result in RRC reject and unified access barring, NAS congestion control, and/or the like.

In an example, AMF Overload Control may be employed. Under unusual circumstances, if AMF (e.g., of the underlay network or overlay network) has reached overload situation, the AMF may activates NAS level congestion control and AMF may restricts the load that the AN node(s) (RAN, N3IWF, and/or the like) are generating, if the AN is configured to support overload control. In an example, the N2 overload control may be achieved by the AMF invoking the N2 overload procedure to all or to a proportion of the AN nodes with which the AMF has N2 connections. To reflect the amount of load that the AMF determines to reduce, the AMF may adjust the proportion of AN nodes which are sent NGAP OVERLOAD START message, and the content of the overload start procedure/message. In an example, the AMF may select the 5G-AN node(s) or AN nodes to which it triggers overload start procedure at random to avoid that multiple AMFs in an AMF Set request reduction of load from the same subset of 5G-AN node(s) or AN nodes. In an example, an AN node may support rejecting of AN signalling connection establishments for certain UEs. In an example, an AN node may support rejecting of AN signalling connection establishments for one or more access types, access categories, and/or the like. In an example, an AN node may provide support for the barring of UEs based on an access type. In an example, the AN node may be an interworking function such as N3GPP interworking function node (N3IWF node). In an example, by employing the overload start procedure, the AMF may request the AN node to: reject AN signaling connection (RRC connection over 3GPP access or UE-N3IWF connection over N3GPP access) requests that are for non-emergency and non-high priority mobile originated services; reject new AN signaling connection requests for 5GS NAS Mobility Management signaling (e.g. for Registration procedure) for that AMF; only permit AN signaling connection requests for emergency sessions and mobile terminated services for that AMF; only permit AN signaling connection requests for high priority sessions and mobile terminated services for that AMF. In an example, the AMF may request the AN node to: reject AN signaling connection (RRC connection over extended access via 3GPP access or N3GPP access). In an example, the AN signaling connection requests may comprise a request for RRC connection resume.

In an example, when rejecting an AN signaling connection request for overload reasons the AN may indicate to the UE an appropriate wait timer value that limits further AN signaling connection requests for a while. In an example, the RAN node of the underlay network may send an RRC message to the UE. The RRC message may comprise a wait timer value associated with the extended access type. In an example, the RRC message may comprise an access type indicating the extended access type (e.g., underlay access type), the wait timer associated with the access type, an identifier of the overlay network for which the extended access type is used.

In an example, when the AMF is recovering or the overload condition changes, the AMF may either: trigger overload start procedure with new percentage value that permit more traffic to be carried, or the AMF may trigger overload stop procedure by sending an overload stop message to the AN node or to some or all of the 5G-AN node(s).

In an example, SMF overload control may be performed. The SMF may employ/contain mechanisms for avoiding and handling overload situations. This may include the following measures: SMF overload control that could result in rejections of NAS requests. In an example, the SMF overload control may be activated by a SMF of an underlay network or an SMF of an overlay network due to congestion situation at the SMF e.g., configuration, by a restart or recovery condition of a UPF, or by a partial failure or recovery of a UPF for a particular UPF(s). In an example, the SMF congestion control may be due to excessive load in the underlay network for traffic (e.g., signaling and data transmission) associated with one or more overlay networks.

In an example, if the SMF has reached overload situation, the SMF may activates NAS level congestion control. The SMF may restrict the load that the AMF(s) are generating, if the AMF is configured to enable the overload restriction. In an example, the SMF may perform NAS level congestion control for signaling or data traffic from the AMF based on the access type. In an example, when the SMF determines to perform congestion control or overload control for access of a UE to an overlay network, the SMF may restrict NAS messages that comprise extended access type (e.g., underlay access). The access type may be associated to a PDU session in the underlay network (e.g., the second PDU session).

In an example embodiment, NAS level congestion control may be applied in general for all NAS messages, per DNN, per DNN and S-NSSAI or for a specific group of UEs. In an example embodiment, NAS level congestion control may be applied per access type for a UE or per access type for a PDU session (that is associated with the access type). In an example, a PDU session of the UE (e.g., the second PDU session) may be associated with the extended access type (e.g., underlay access). In an example, the UE may have one or more PDU session in the underlay network via a 3GPP access type or via a N3GPP access type. When the PDU session is for access of the UE to the N3IWF of the underlay network (such as the second PDU session), the access type of the PDU session may be extended access type. In an example, NAS level congestion may be performed based on the extended access type.

In an example, NAS level congestion control applied on all NAS messages may be performed/achieved by the AMF rejecting NAS messages, from the UE, with a back-off timer. To avoid that large amounts of UEs initiate deferred requests (almost) simultaneously, the AMF may select the back-off timer value so that the deferred requests are not synchronized. In an example, the back-off timer may be determined based on the overlay network (e.g., an identifier of the overlay network). For example when the network (e.g., the underlay network) provides access of UE to one or more overlay networks, based on the operator policy, agreement, priority of overlay network and/or the like, the underlay network may determine a different back-off timer. When the UE receives a rejection of a NAS message with a back-off timer, the UE may not initiate any NAS signalling until the back-off timer expires or the UE receives a paging request from the network, or the UE initiates signalling with a higher priority than was used when the UE received the back-off timer. In an example embodiment, when the UE receives the back-off timer, the UE may select a different underlay network to access the overlay network. In an example embodiment, when the UE receives the back-off timer from the underlay network, the UE may access the overlay network via an AN (3GPP access, or N3GPP access) of the overlay network if within the coverage.

In an example embodiment, NAS level congestion control may comprise rejection of requests (or release of a NAS connection) by the AMF or the SMF. In an example, under overload conditions the AMF may reject Registration and Mobility Management signalling requests from UEs. When a NAS request is rejected, a Mobility Management back-off timer may be sent by the AMF and AMF may store the back-off time per UE if AMF maintains the UE context. In an example, the Mobility Management back-off timer may be sent by the AMF and AMF may store the back-off time per access type (e.g., extended access type) or per extended access type per overlay network. The AMF may immediately reject any subsequent request from the UE before the stored back-off time is expired. While the Mobility Management back-off timer is running, the UE may not initiate any NAS request for Registration or Mobility Management procedures except for Deregistration procedure and except for high priority access, emergency services and mobile terminated services. In an example, while the Mobility Management back-off timer is running, the UE may not initiate any NAS request for Registration or Mobility Management procedures related to access to the overlay network or related to the second PDU session that is associated with the extended access type.

In an example embodiment, the Mobility Management back-off timer may trigger a network (e.g., SNPN, PLMN) reselection e.g., reselection of an underlay network.

To avoid that large amounts of UEs initiate deferred requests (almost) simultaneously, the AMF should select the mobility management back-off timer value so that the deferred requests are not synchronized. In an example, the mobility management back-off timer value may be determined per extended access type per overlay network (identifier).

Figure 22:
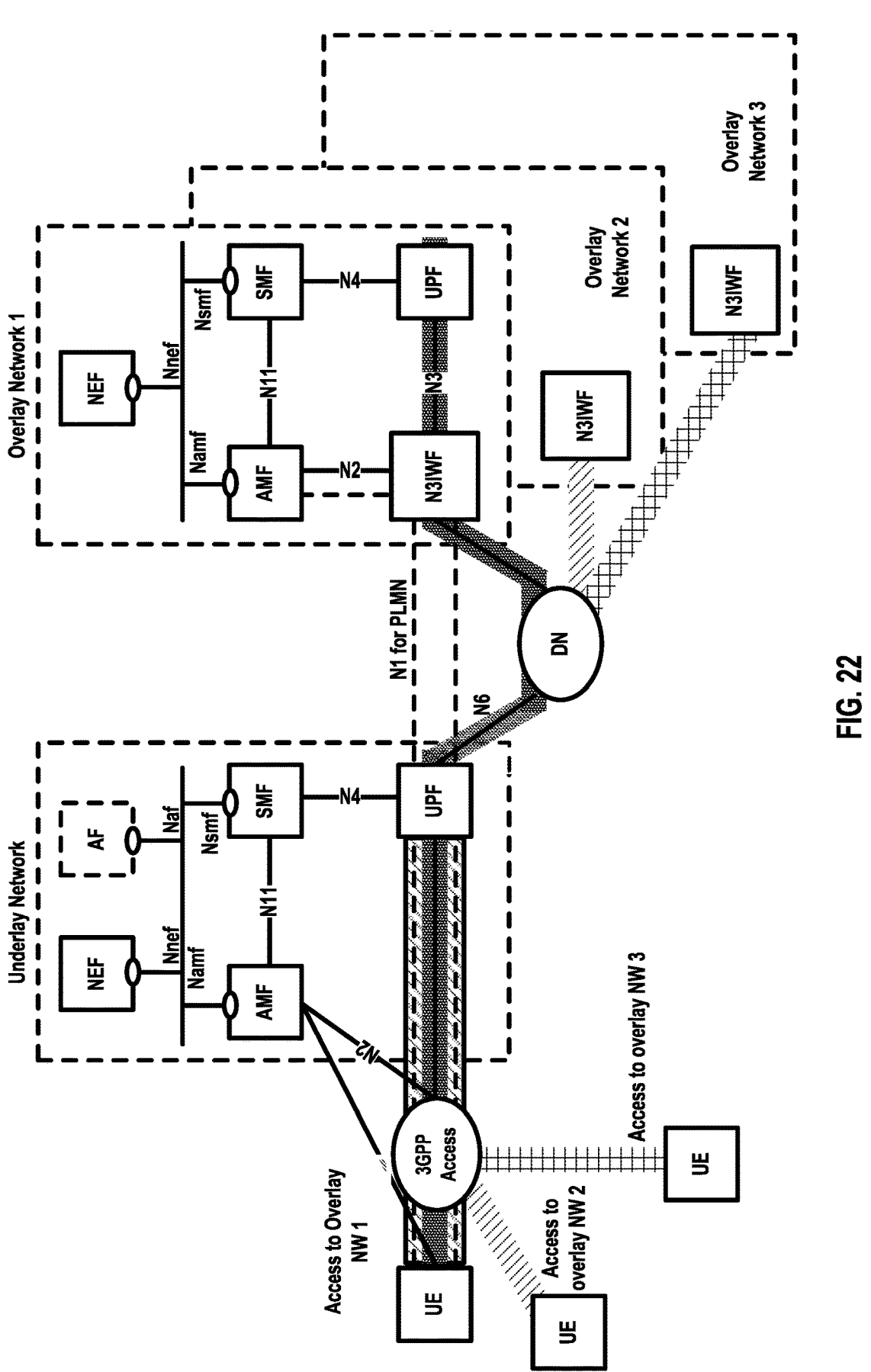
FIG. 22 illustrates an example embodiment of a present disclosure.

FIG. 22 may depict an example overload control procedure in the underlay network in accordance with embodiments of the present disclosure. In an example, the AMF of the underlay network may determine to send the overload start message to the RAN node of the underlay network. The determining may be based on at least one of an overload (or congestion state) of the AMF, the SMF, and/or user plane such as the UPF of the underlay network. In an example, the AMF of the underlay network in response to the determining, may send a message to the AMF of the overlay network. In an example, the message may be a notification of overload message, congestion notification message, and/or the like. In an example, the message may comprise an update on the status of the underlay network. In an example, the message may comprise a congestion notify payload indicating a load level of the underlay network. In an example, the message may comprise a status notification for the second PDU session of the wireless device (in the underlay network) or one more PDU sessions of the wireless device in the underlay network that are employed to access the overlay network. In an example, the message may comprise the access type (e.g., extended access type, underlay access, N3GPP access over 3GPP access, and/or the like). In an example, the message may comprise a barring time determined by the AMF of the underlay network, or determined by the RAN node of the underlay network. In an example, the AMF of the overlay network may determine to adjust parameters for de-registration, deactivation, or release of user plane resources associated with the wireless device or associated with the first PDU session of the wireless device. The adjusting may comprise lengthening of a timer for de-registration (implicit de-registration), and/or the like. In an example, when the AMF receives notification of overload or congestion in the underlay network (e.g., from the AMF or a network node of the underlay network) and the notification comprises a time value for duration of the condition (such as barring time, back-off timer, mobility management back-off timer, session management back-off timer, and/or the like), if the time value is larger than the sum of the UE's periodic registration update timer and an implicit deregistration timer, the AMF may adjust the mobile reachable timer and/or the implicit deregistration timer such that the AMF does not implicitly deregister the UE while the underlay network is in overload state or the timer such as the mobility management back-off timer is running. In an example, when the AMF rejects registration request messages or service request with a mobility management back-off time which is larger than the sum of the UE's periodic registration update timer and an implicit deregistration timer, the AMF may adjust the mobile reachable timer and/or the implicit deregistration timer such that the AMF does not implicitly deregister the UE while the mobility management back-off timer is running.

In an example embodiment, when the AMF of the underlay network determines to send the overload stop message to the RAN node, and determines that the overload or congestion state is alleviated or reduced, the AMF of the underlay network may send a notification to the AMF of the overlay network to indicate stop of the overload condition. In an example the AMF of the overlay network may restart the timer (e.g., the mobile reachable timer and/or the implicit deregistration timer).

Figure 23:
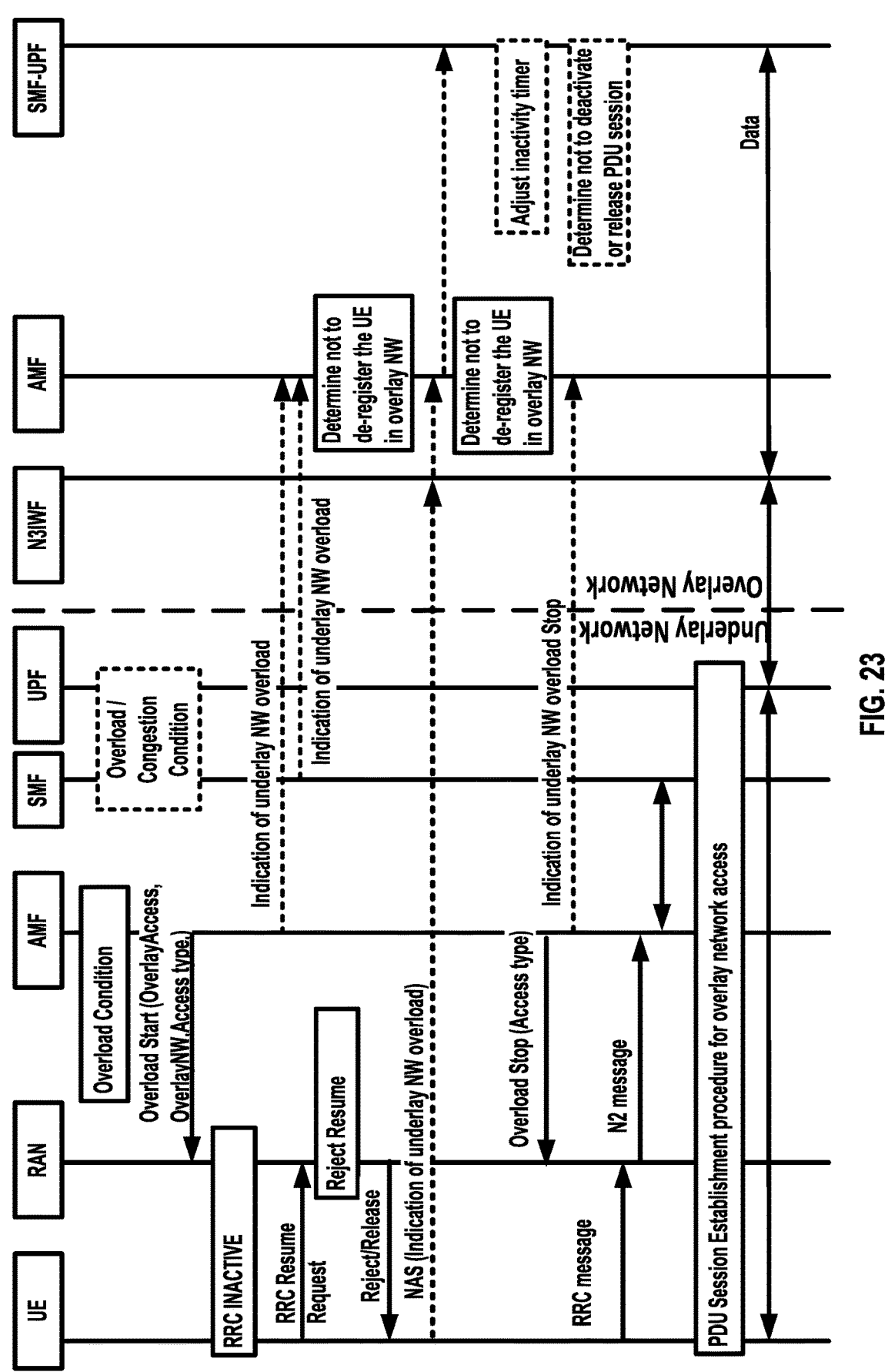
FIG. 23 illustrates an example embodiment of a present disclosure.

In an example as depicted in FIG. 22 and FIG. 23, the RAN node of the underlay network (e.g., NG-RAN node) may receive an overload start message from the AMF based on the AMF from which it receives the message as being in an overloaded state. In an example, the overload start message may comprise an overload action information element (IE). If the Overload Action IE is included the AMF Overload Response IE within the OVERLOAD START message, the NG-RAN node may use it to identify the related signalling traffic. In an example, when the Overload Action IE is set to:

"reject RRC connection establishments for non-emergency mobile originated data transfer" (e.g., reject traffic corresponding to RRC cause "mo-data", "mo-SMS", "mo-VideoCall" and "mo-VoiceCall" or "mo-data" and "mo-VoiceCall"), or "reject RRC connection establishments for signalling" (e.g., reject traffic corresponding to RRC cause "mo-data", "mo-SMS", "mo-signalling", "mo-VideoCall" and "mo-VoiceCall" or "mo-data", "mo-signalling" and "mo-VoiceCall"), or "only permit RRC connection establishments for emergency sessions and mobile terminated services" (e.g., only permit traffic corresponding to RRC cause "emergency" and "mt-Access"), or "only permit RRC connection establishments for high priority sessions and mobile terminated services" (e.g., only permit traffic corresponding to RRC cause "high-PriorityAccess", "mps-PriorityAccess", "mcs-Priority-Access" and "mt-Access"), the NG-RAN node may:

if the AMF Traffic Load Reduction Indication IE is included in the OVERLOAD START message, reduce the signalling traffic by the indicated percentage, otherwise ensure that only the signalling traffic not indicated as to be rejected is sent to the AMF.

In an example, if the Overload Start NSSAI List IE is included in the OVERLOAD START message, the NG-RAN node may:

if the Slice Traffic Load Reduction Indication IE is present, reduce the signalling traffic by the indicated percentage for the UE(s) whose requested NSSAI only include S-NSSAI(s) contained in the Overload Start NSSAI List IE, and the signalling traffic indicated as to be reduced by the Overload Action IE in the Slice Overload Response IE if the IE is present, otherwise ensure that only the signalling traffic from UE(s) whose requested NSSAI includes S-NSSAI(s) other than the ones contained in the Overload Start NSSAI List IE, or the signalling traffic not indicated as to be reduced by the Overload Action IE in the Slice Overload Response IE for the UE(s) if the requested NSSAI matched, is sent to the AMF.

In an example, the overload start message may comprise an access type action list IE. The access type action IE may be employed by the RAN node to determine a set of actions based on the access type being e.g., the extended access type, underlay access to an overlay network (overlay network ID), and/or the like. The access type action IE may comprise an identifier of an overlay network. In an example, the overload start message may comprise a DNN associated with an overlay network or a DNN that identifies an overlay network. In an example, the overload start message may comprise an access category or an access identity associated with underlay access (to an overlay network). In an example, if access type action list IE is included in the overload start message, the NG-RAN node may:

if an access type traffic load reduction indication IE is present, reduce the signalling traffic by the indicated percentage for the UE(s) whose access is for a PDU session to access the overlay network (PDU session with extended access type), and the signalling traffic indicated as to be reduced by the Overload Action IE in an access type Overload Response IE if the IE is present, otherwise ensure that only the signalling traffic from UE(s) whose request is associated with access type and overlay network id other than the ones contained in the Overload Start access type List IE, or the signalling traffic not indicated as to be reduced by the Overload Action IE in the access type Overload Response IE for the UE(s) if the access type matched, is sent to the AMF.

In an example embodiment, access type may be an access identity. In an example embodiment, access type may be an access category. For example, the extended access type may comprise or may be associated to an access category indicating underlay access to the overlay network.

In an example, if an overload control is ongoing and the NG-RAN node receives a further overload start message, the NG-RAN node may replace the contents of the previously received information with the new one.

In an example embodiment as depicted in FIG. 22, the AMF may send the overload start message to the RAN node. The RAN node may receive from the UE an RRC message indicating access request to the network (e.g., the underlay network) in order to access the overlay network. In an example, the RRC message may be an RRC setup request message comprising at least one an establishment cause associated with underlay access (e.g., EAEC), the access type (e.g., extended access type), underlay access indication, an access category associated with underlay access, an access identity associated with underlay access, and/or the like. In an example embodiment, the RAN node may determine to accept or reject the RRC request based on an element of the overload start message such at least one of the access type action list IE, the access type traffic load reduction indication IE, access type Overload Response IE, and/or the like.

In an example embodiment, the RAN node may reject or accept the RRC request based on a ratio or probability that may be determined based on an element of the overload start message.

In an example embodiment, when an overload condition of the network is reduced or alleviated, the AMF may send an overload stop message comprising the access type. In an example, the UE may send an RRC message to the RAN node. The RAN node may accept the RRC message (e.g., send an RRC setup message to the UE and receive an RRC setup complete message from the UE) and send an N2 message to the network e.g., the AMF.

In an example embodiment, upon successful access of the UE to the underlay network, the UE may perform the PDU session establishment procedure with the underlay network to establish the second PDU session. The second PDU session may be employed to establish the IPsec connectivity with the N3IWF of the overlay network and establishment of the first PDU session with the overlay network via the user plane of the underlay network.

FIG. 22 may depict an example overload control procedure in the underlay network in accordance with embodiments of the present disclosure. In an example, a per an example embodiment, the AMF may send the overload start message to the RAN node. The RAN node may receive from the UE an RRC message indicating access request to the network (e.g., the underlay network) in order to access the overlay network. In an example, the RRC message may be an RRC setup complete message comprising at least one an establishment cause associated with underlay access e.g., EAEC, the access type (e.g., extended access type), underlay access indication, an access category associated with underlay access, an access identity associated with underlay access, and/or the like. In an example embodiment, the RAN node may determine to release the RRC connection based on an element of the overload start message such at least one of the access type action list IE, the access type traffic load reduction indication IE, access type Overload Response IE, and/or the like.

In an example embodiment, the RAN node may release the RRC connection based on a ratio or probability that may be determined based on an element of the overload start message.

In an example embodiment, when an overload condition of the network is reduced or alleviated, the AMF may send an overload stop message comprising the access type. In an example, the UE may send an RRC setup complete message to the RAN node. The RAN node may send an N2 message to the network e.g., to the AMF.

In an example embodiment, upon successful access of the UE to the underlay network, the UE may perform the PDU session establishment procedure with the underlay network to establish the second PDU session. The second PDU session may be employed to establish the IPsec connectivity with the N3IWF of the overlay network and establishment of the first PDU session with the overlay network via the user plane of the underlay network.

FIG. 23 may depict an example overload control procedure in the underlay network in accordance with embodiments of the present disclosure. In an example, during the overload condition, the AMF of the underlay network may send a NAS message to the UE indicating a notification of the overload. The NAS message may indicate that the network may reach overload condition and traffic from the UE may be rejected, RRC connection may be released or suspended, and/or the like. In an example, the UE may send a NAS message to the overlay network. The AMF of the overlay network may adjust the implicit de-registration timer based on the NAS message. In an example, the SMF of the underlay network may send a notification message to the AMF of the overlay network indicating the overload or congestion state of the underlay network.

In an example, a per an example embodiment, the AMF may send the overload start message to the RAN node. The RAN node may receive from the UE an RRC message indicating access request to the network (e.g., the underlay network) in order to access the overlay network. In an example, the RRC message may be an RRC resume request message comprising at least one an establishment cause associated with underlay access e.g., the EAEC, the access type (e.g., extended access type), underlay access indication, an access category associated with underlay access, an access identity associated with underlay access, and/or the like. In an example embodiment, the RAN node may determine to release the RRC connection at least based on an element of the RRC resume message and/or overload start message such at least one of the access type action list IE, the access type traffic load reduction indication IE, access type Overload Response IE, and/or the like.

In an example embodiment, the RAN node may release the RRC connection based on a ratio or probability that may be determined based on an element of the overload start message.

In an example embodiment, when an overload condition of the network is reduced or alleviated, the AMF may send an overload stop message comprising the access type. In an example, the UE may send an RRC resume request message to the RAN node. The RAN node may send an RRC resume message to the UE. The RAN node may receive an RRC resume complete message from the UE. The RAN node may send an N2 message to the network e.g., to the AMF.

In an example embodiment, when the AMF of the underlay network determines to send the overload stop message to the RAN node, and determines that the overload or congestion state is alleviated or reduced, the AMF of the underlay network may send a notification to the AMF of the overlay network to indicate stop of the overload condition. In an example the AMF of the overlay network may restart the timer (e.g., the implicit de-registration timer).

In an example embodiment, upon successful access of the UE to the underlay network, the UE may perform the PDU session establishment procedure with the underlay network to establish the second PDU session. The second PDU session may be employed to establish the IPsec connectivity with the N3IWF of the overlay network and establishment of the first PDU session with the overlay network via the user plane of the underlay network.

Figure 24:
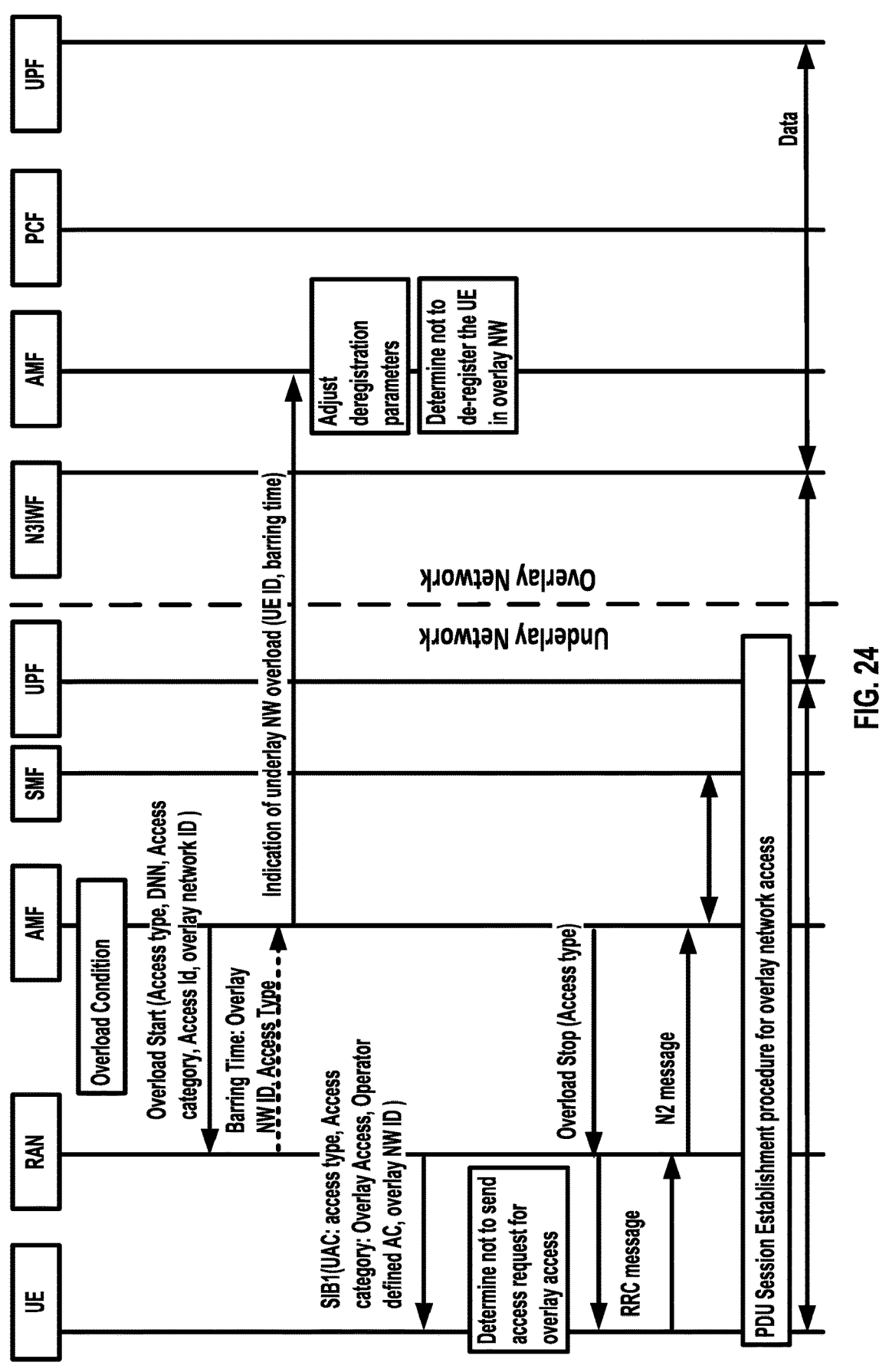
FIG. 24 illustrates an example embodiment of a present disclosure.

FIG. 24 may depict an example overload control procedure in the underlay network in accordance with embodiments of the present disclosure. In an example embodiment, when the AMF send the overload start message to a RAN node as per an example embodiment of the present disclosure, the RAN node may send or broadcast a system information block (SIB) to the UE(s). In an example, the SIB may be a SIB1 message. The SIB1 message may comprise a unified access control (UAC) field or IE. In an example embodiment, UAC may be employed by the UE to perform access barring check for an access attempt associated with at least one of a given access type, overlay network access (ID), access category and one or more access identities upon request from upper layers or the RRC layer. In an example, the UAC may comprise a barring time (e.g., for the access type, for access attempt to the underlay network for access to the overlay network with overlay network ID, and/or the like). In an example, the AMF or the RAN node of the underlay network may determine the barring time. If the RAN node determines the barring time, the RAN node may send a message over N2 interface (e.g., an N2 message, NGAP message, and/or the like) to the AMF of the underlay network that may comprise the barring time, the identifier of the overlay network, and/or the like. In an example, the AMF of the underlay network may send an indication to the AMF of the overlay network (e.g., via an NEF of the underlay network and/or the NEF of the overlay network or via AF-NEF of either or both networks). In an example, the indication (message) may comprise the barring time and an indication that the underlay network may be in overload or congestion state. In an example, the indication may comprise at least one of an identifier of the UE, a PDU session ID (e.g., the identifier of the second PDU session, or the first PDU session), and/or the like.

In an example, the AMF of the overlay network (based on the barring time, and an element of the indication) may determine to adjust parameters for de-registration, deactivation, or release of user plane resources associated with the wireless device or associated with the first PDU session of the wireless device. The adjusting may comprise lengthening of a timer for de-registration (implicit de-registration), and/or the like. In an example, when the AMF receives the indication (or notification of overload or congestion) in the underlay network (e.g., from the AMF or a network node of the underlay network) and the notification comprises a time value for duration of the condition (such as the barring time, back-off timer, mobility management back-off timer, session management back-off timer, and/or the like), if the time value is larger than the sum of the UE's periodic registration update timer and an implicit deregistration timer, the AMF may adjust the mobile reachable timer and/or the implicit deregistration timer such that the AMF does not implicitly deregister the UE while the underlay network is in overload state or the timer such as the barring time or the mobility management back-off timer is running. In an example, when the AMF rejects registration request messages or service request with a mobility management back-off time which is larger than the sum of the UE's periodic registration update timer and an implicit deregistration timer, the AMF may adjust the mobile reachable timer and/or the implicit deregistration timer such that the AMF does not implicitly deregister the UE while the mobility management back-off timer is running. In an example embodiment, when the AMF of the underlay network determines to send the overload stop message to the RAN node, and determines that the overload or congestion state is alleviated or reduced, the AMF of the underlay network may send a notification to the AMF of the overlay network to indicate stop of the overload condition. In an example the AMF of the overlay network may restart the timer (e.g., the mobile reachable timer and/or the implicit deregistration timer).

In an example, a base station, the RAN node or the NG-RAN may support overload and access control functionality such as RACH back off, RRC Connection Reject, RRC Connection Release and UE based access barring mechanisms. Unified access control (UAC) framework may apply to all UE states (RRC_IDLE, RRC_INACTIVE and RRC_CONNECTED) for NR. The NG-RAN may broadcast barring control information associated with access type (e.g., extended access type, 3GPP access, N3GPP access), Access Categories and Access Identities (in case of network sharing, the barring control information can be set individually for each PLMN or network that shares the RAN node). The UE may determine whether an access attempt is authorized based on the barring information broadcast for the selected PLMN or network, and the selected access type, Access Category and Access Identity(ies) for the access attempt:

> For NAS triggered requests, NAS determines the access type, access category and access identity(ies);
> For AS triggered requests, RRC determines the access type, access category while NAS may determines the access identity(ies) and/or the access type.

In an example, an establishment cause for the access type may be employed e.g., based on an information element or field identifying the establishment cause being e.g., N3GPP establishment cause such as N3AEC, 3GPPAEC, the EAEC (or UNDERLAY_AEC), and/or the like (encoding examples in FIG. 32). For example, UNDERLAY_AEC or the EAEC may indicate that the establishment cause is related to the extended access type e.g., for access of the UE to the overlay network via the underlay network. In an example, the gNB may handle access attempts with the establishment causes (pertaining to an access type) and being "emergency", "mps-PriorityAccess" and "mcs-PriorityAccess" (i.e. Emergency calls, MPS, MCS subscribers) with high priority and responds with RRC Reject to these access attempts only in extreme network load conditions that may threaten the gNB stability.

In an example embodiment, access barring check by the UE may comprise the following: In an example, the UE may:

> if one or more access types (e.g., extended access type, underlay access type), access identities associated with underlay access to the overlay network, the overlay network identity, and/or the like are indicated, and > if for at least one of these access types (e.g., extended access type, underlay access type), access identities associated with underlay access to the overlay network, the overlay network identity, and/or the like, the corresponding bit in the uac-BarringForAccessIdentity or uac-BarringForAccessType contained in "UAC barring parameter" is set to zero:
> consider the access attempt as allowed.
> else:
> draw a random number 'rand' uniformly distributed in the range: 0≤rand<1;
> if 'rand' is lower than the value indicated by uac-BarringFactor included in "UAC barring parameter":
> consider the access attempt as allowed;
> else:
> consider the access attempt as barred;
> if the access attempt is considered as barred: draw a random number 'rand' that is uniformly distributed in the range 0 rand <1; start timer T390 for the Access Category with the timer value (for example T390) calculated as follows, using the barring time e.g., uac-BarringTime included in "AC barring parameter": T390=(0.7+0.6*rand)*uac-BarringTime.

In an example embodiment, the extended access type in the underlay network may be associated with a network slice (identifier) such as S-NSSAI for underlay access to the overlay network. In an example embodiment, UAC configuration may comprise configuring UAC parameters for the network slice of underlay access to the overlay network (e.g., UAC-BarringForUnderlayAccessSlice, or the like). In an example, the network slice ID (e.g., S-NSSAI) may identify the overlay network.

In an example embodiment as depicted in FIG. 24, the UE may receive the UAC parameters from a RAN node or a cell of a RAN node or base station. In an example, the receiving of the UAC may be in response to sending the overload start message by the AMF to the RAN node. The overload start message may comprise at least one of the access type, a DNN associated with overlay network access, access category associated with the underlay access, access identity associated with the underlay access, the identifier of the overlay network, and/or the like. In an example, the SIB message or the SIB1 message may comprise one or more UAC parameters comprising at least one of the access type, the DNN, access category associated with the underlay access, access identity associated with the underlay access, the identifier of the overlay network, and/or the like. In an example embodiment, the UE may employ the UAC parameters to determine whether or not to perform an access attempt wherein the access attempt may be for access to the overlay network via the underlay network. In an example, the identifier of the overlay network (e.g., the overlay network ID) may be employed when for example the UE determine access to one or more overlay networks. The identifier of the overlay network may be employed to selectively barr access based on the overlay network ID. In an example, the UAC may be employed for access barring of the UE to the second network when the UE determines to access the first network via the second network. The first network may be the overlay network, a PLMN, an SNPN, and/or the like. The second network may be the underlay network, e.g., a PLMN, an SNPN, and/or the like.

In an example embodiment, the network may send the UAC parameters to the UE(s). The UAC parameters may comprise barring parameters or access control parameters. The UAC parameters may comprise barring information for the access type (e.g., extended access type, the overlay network (ID), the barring time wherein the barring time indicates a time for which the UE may be required to wait before making an access attempt such as RRC request, NAS request, RACH, and/or the like.

In an example embodiment, the UE in response to receiving the UAC that indicates access barring for the extended access type or underlay network access for the overlay network, may determine to wait for a time period determined by the barring time associated with the access type. In an example, the UE may determine to select a different network (e.g., another underlay network) to access the overlay network. In an example, the UE may determine to access the underlay network via a different access type. In an example, the UE may determine to access the overlay network directly via a N3GPP access or a 3GPP access if in a coverage area of the AN of the overlay network. In an example, the UE may determine to access the second underlay network in response to multiple access attempt failures e.g., based on a counter, or expiry of a second timer.

In an example, the RAN node of the underlay network may send or broadcast a SIB1 message that may comprise UAC or UAC parameters. In an example, the SIB1 message may comprise a UAC-BarringInfoSetList. The IE UAC-BarringInfoSetList may provides a list of access control parameter sets. At least one of an access type and an access category may be configured with access parameters according to one of the sets. In an example, uac-BarringInfoSetList may comprise list of access control parameter sets. One or more access types, or access category may be configured with access parameters corresponding to a particular set by uac-barringInfoSetIndex. Association of an access type or an access category with an index that has no corresponding entry in the uac-BarringInfoSetList may be valid configuration and may indicate no barring. In an example, uac-BarringForAccessType, uac-BarringForAccessIdentity, and/or the like may indicates whether access attempt is allowed for one or more access type, or access identity. In an example, when uac-BarringForAccessType is employed, one or more bits may correspond to one or more access types. For example, the leftmost bit may correspond to a 3GPP access type, bit 1 may correspond to N3GPP access type, bit 2 may correspond to extended access type (e.g., underlay access type, N3GPP access over 3GPP access, and/or the like). In an example, for the access identity, the leftmost bit, bit 0 in the bit string corresponds to Access Identity 1, bit 1 in the bit string corresponds to Access Identity 2, bit 2 in the bit string corresponds to Access Identity 11, bit 3 in the bit string corresponds to Access Identity 12, bit 4 in the bit string corresponds to Access Identity 13, bit 5 in the bit string corresponds to Access Identity 14, and bit 6 in the bit string corresponds to Access Identity 15. Value 0 means that access attempt is allowed for the corresponding access identity.

In an example, a uac-BarringFactor may represents the probability that access attempt would be allowed during access barring check. In an example, a barring time e.g., the uac-BarringTime may be employed and may indicate the minimum time in seconds before a new access attempt is to be performed after an access attempt was barred at access barring check for the same access type or the same access category.

Figure 25:
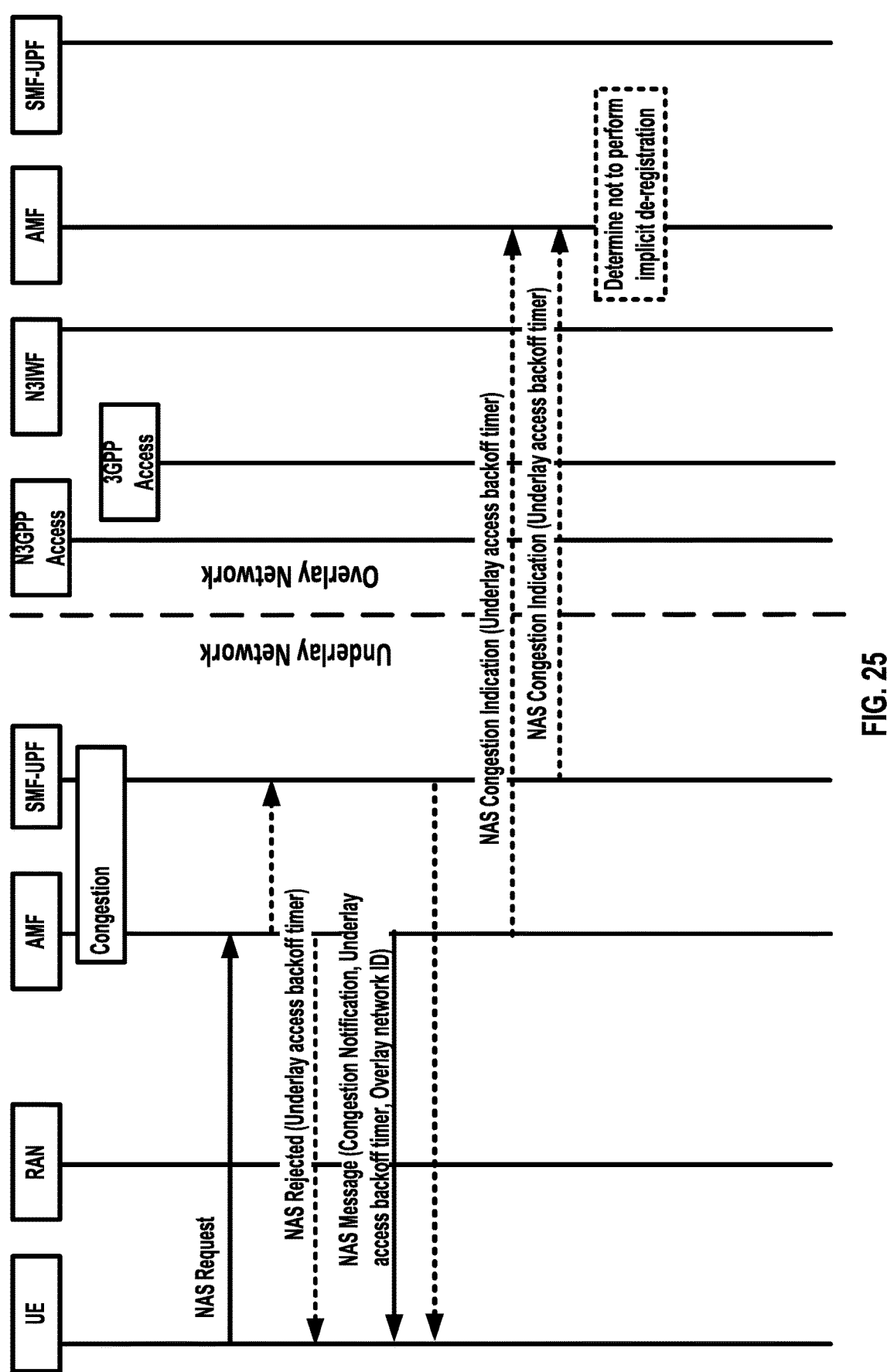
FIG. 25 illustrates an example embodiment of a present disclosure.

FIG. 25 may depict an example NAS congestion control procedure of the underlay network in accordance with embodiments of the present disclosure. In an example, based on a congestion state or NAS level congestion in SMF or AMF, the SMF or the AMF of the underlay network may send a nAS message (e.g., a NAS notification message) to the UE indicating that the underlay network is congested and traffic of UE that are associated with the access type for underlay access may be subject to NAS level congestion control. In an example, the NAS message may comprise at least one of a congestion state indication, a back-off timer value (e.g., an underlay access back-off timer), the identifier of the overlay network, and/or the like. In an example, in response to a determination by the AMF of the underlay network or the SMF of the underlay network to perform NAS level congestion, the AMF or the SMF may send a NAS congestion indication (message) to the AMF of the overlay network (e.g., directly, or via an NEF of the overlay network or the underlay network, or the AF-NEF of either or both networks). In an example, the NAS congestion indication may comprise the underlay access back-off timer.

In an example, the AMF of the overlay network may determine to adjust parameters for de-registration, deactivation, or release of user plane resources associated with the wireless device or associated with the first PDU session of the wireless device. In an example, the adjusting may comprise lengthening of a timer for de-registration (implicit de-registration), pausing the timer for a period of time equal or greater than the underlay access back-off timer, and/or the like. In an example, when the AMF receives the NAS congestion indication (e.g., from the AMF or a network node of the underlay network) and the the NAS congestion indication comprises the underlay access back-off timer (for mobility management, session management, and/or the like), if the the underlay access back-off timer value is larger than a threshold (for example the sum of the UE's periodic registration update timer and an implicit deregistration timer, or the greater of the UE's periodic registration update timer and an implicit deregistration timer, and/or the like), the AMF may adjust the mobile reachable timer and/or the implicit deregistration timer such that the AMF does not implicitly deregister the UE while the underlay network is in congestion state or the timer such as the underlay access back-off timer or mobility management back-off timer is running.

In an example embodiment, when the AMF of the underlay network determines to send the overload stop message to the RAN node, and determines that the overload or congestion state is alleviated or reduced, the AMF of the underlay network may send a notification to the AMF of the overlay network to indicate stop of the overload condition. In an example the AMF of the overlay network may restart/reset the timer (e.g., the mobile reachable timer and/or the implicit deregistration timer).

In an example embodiment, the UE may send a request to the underlay network. In an example, the request may be a NAS message. In an example, the request may be a registration request message. In an example, the request may be a PDU session establishment request message. In an example, the request may be a service request message. In an example, the request may be sent by the UE to a RAN node of the underlay network. The RAN node may transfer one or more elements of the request message to an AMF of the underlay network. In an example, the request message may comprise access network (AN) parameters. The AN parameters may comprise at least one of the access type, the extended access type indication, an indication that the request is for a PDU session intended for access of the overlay network, and/or the like. The request message may comprise an identifier of the overlay network, the AN parameter, and/or the like. In an example embodiment, UE may send to the RAN, an AN message. The AN message may comprise at least one of the AN parameters, Registration Request (Registration type, SUCI or 5G-GUTI or PEI, [last visited TAI (if available)], Security parameters, [Requested NSSAI], [Mapping Of Requested NSSAI], [Default Configured NSSAI Indication], [UE Radio Capability Update], [UE MM Core Network Capability], [PDU Session status], [List Of PDU Sessions To Be Activated], [Follow-on request], [MICO mode preference], [Requested Active Time], [Requested DRX parameters for E-UTRA and NR], [Requested DRX parameters for NB-IoT], [extended idle mode DRX parameters], [LADN DNN(s) or Indicator Of Requesting LADN Information], [NAS message container], [Support for restriction of use of Enhanced Coverage], [Preferred Network Behaviour], [UE paging probability information], [UE Policy Container (the list of PSIs, indication of UE support for ANDSP and the operating system identifier)] and [UE Radio Capability ID], PEI)).

In an example, when the request is a service request as part of the service request procedure, the UE may send to that (R)AN: AN message (AN parameters, Service Request (List Of PDU Sessions To Be Activated, List Of Allowed PDU Sessions, security parameters, PDU Session status, 5G-S-TMSI, [NAS message container], Exempt Indication)). The NAS message container may be included if the UE is sending a service request message as an Initial NAS message and the UE needs to send non-cleartext IEs. The List Of PDU Sessions To Be Activated may be provided by the UE when the UE wants to re-activate the PDU Session(s). The list of allowed PDU sessions may be provided by the UE when the service request is a response of a paging or a NAS notification for a PDU Session associated with non-3GPP access, and identifies the PDU Sessions that can be transferred to 3GPP access or to extended access (underlay access).

In an example, the AN parameters may comprise at least one of a 5G-S-TMSI or GUAMI, the Selected PLMN ID (or PLMN ID and NID,) and NSSAI information, and/or the like. In an example, the AN parameters may comprise an establishment cause indicating that the request is for accessing an overlay network via the underlay network. The Establishment cause may provide the reason for requesting the establishment of an RRC connection. Whether and how the UE includes the NSSAI information as part of the AN parameters may dependent on the value of the Access Stratum Connection Establishment NSSAI Inclusion Mode parameter.

In an example, RAN node may send to the AMF an N2 message. The N2 message may comprise at least one of N2 parameters, the Registration Request, [LTE-M Indication], the extended access type indication, and/or the like. In an example, the N2 parameters may comprise the Selected PLMN ID (or PLMN ID and NID), Location Information and Cell Identity related to the cell in which the UE is camping, UE Context Request which indicates that a UE context including security information needs to be setup at the RAN node (NG-RAN). In an example, the N2 parameters may also include the Establishment cause and IAB-Indication if the indication is received in AN parameters.

In an example embodiment, the AMF may send to the SMF an N11 message e.g., either Nsmf_PDUSession_CreateSMContext Request (SUPI, selected DNN, UE requested DNN, S-NSSAI(s), PDU Session ID, AMF ID, Request Type, [PCF ID, Same PCF Selection Indication], Priority Access, [Small Data Rate Control Status], N1 SM container (PDU Session Establishment Request), User location information, Access Type, RAT Type, PEI, GPSI, UE presence in LADN service area, Subscription For PDU Session Status Notification, DNN Selection Mode, Trace Requirements, Control Plane CIoT 5GS Optimisation indication, or Control Plane Only indicator) or Nsmf_PDUSession_UpdateSM-Context Request (SUPI, DNN, S-NSSAI(s), SM Context ID, AMF ID, Request Type, N1 SM container (PDU Session Establishment Request), User location information, Access Type, RAT type, PEI, Serving Network (PLMN ID, or PLMN ID and NID)).

In an example, the SMF may determine to perform a congestion control e.g., NAS level congestion control based on the PDU session ID (that is associated with the overlay network access) or based on the access type indicating extended access type, non-3GPP access over 3GPP access, underlay access, and/or the like. The SMF may send a NAS message to the UE indicating a rejection of the request. The NAS message sent by the SMF to the UE may comprise at least one of the access type and a back-off timer associated with the access type. In an example, the NAS message may comprise a cause value e.g., with an error code wherein the error code indicates that the rejection is based on the access type e.g., being underlay access or extended access type.

In an example embodiment when AMF performs the NAS level congestion control, the AMF may determine to perform a congestion control e.g., NAS level congestion control based on at least one of the PDU session ID (that is associated with the overlay network access) or based on the access type indicating extended access type, non-3GPP access over 3GPP access, underlay access, and/or the like. The AMF may send a NAS message to the UE indicating a rejection of the request. The NAS message sent by the SMF to the UE may comprise at least one of the access type and a back-off timer associated with the access type.

In an example embodiment the NAS reject message (or the NAS notification message) may comprise a cause value such as session management SM cause or mobility management MM cause. The SM cause or the MM cause may be 5G-MM cause or 5G-SM cause. The cause value may indicate insufficient resources for the access type (e.g., the extended access type), insufficient resources for access to the overlay network, overload or congestion of underlay network resources associated with the PDU session(s) of overlay network, and/or the like. In an example, the cause value may indicate an operator determined barring of the access type. In an example, the NAS rejection message or the NAS notification message may comprise the identifier of the overlay network.

Figure 30:
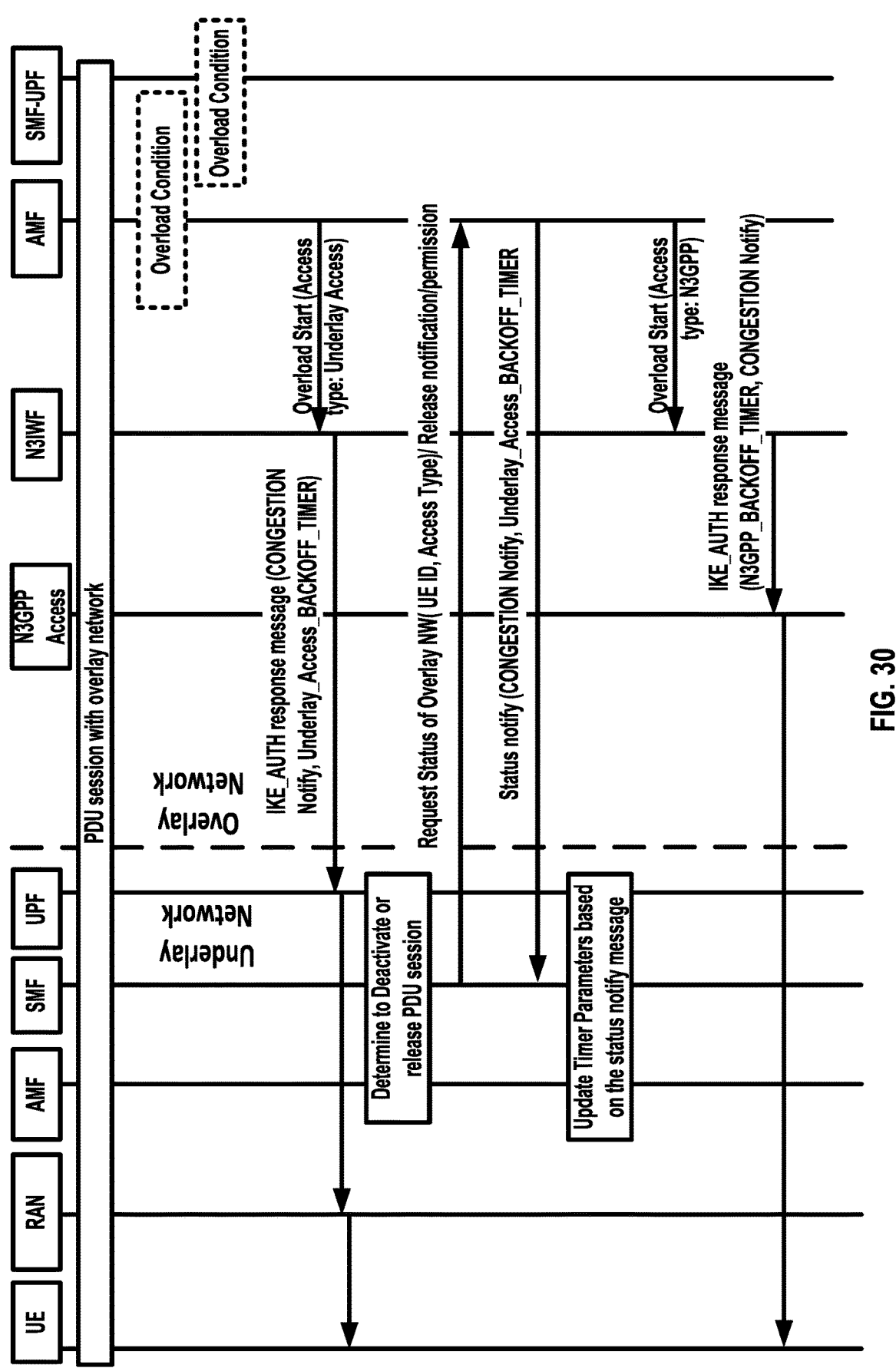
FIG. 30 illustrates an example embodiment of a present disclosure.

In an example as depicted in FIG. 30, NAS level congestion control by the AMF or the SMF may comprise sending a NAS message by the AMF or the SMF to the UE. In an example, the NAS message may comprise a back-off timer IE for underlay access, or extended access type. For example, the back-off timer may be UNDERLAY_ACCESS_BACKOFF_TIMER, and/or the like.

In an example embodiment, the NAS message sent by the AMF or the SMF to the UE may comprise at least one of the back-off timer, a congestion indication, the identifier of the overlay network (that the congestion state and the back-off timer are applicable to).

In an example, IKE SA establishment procedure for underlay access, extended access type, or (untrusted) non-3GPP access may be performed between the UE and the N3IWF. The purpose of this procedure is to establish a secure connection between the UE and the N3IWF over NWu, which is used to securely exchange the NAS signalling messages between the UE and the AMF of the overlay network via the N3IWF. The UE may establish the secure connection by establishing an IKE SA and first child SA to the N3IWF. The IKE SA and first child SA, called signalling IPsec SA, may be created between the UE and the N3IWF after the IKE_SA_INIT exchange and after the IKE_AUTH exchange. The signalling IPsec established may be used to transfer NAS signalling traffic. Additional child SAs (user plane IPsec SAs) can be established between the UE and the N3IWF to transfer user-plane traffic. In an example, upon completion of the N3IWF selection procedure the UE may initiate an IKE_SA_INIT exchange. Upon reception of the IKE_SA_INIT response the UE may inform the upper layers that the access stratum connection is established. Upon establishment of the access stratum connection, the UE may initiate IKE_AUTH exchange with EAP-5G encapsulation. The UE may encapsulate the initial NAS message and the AN parameters using the EAP-5G procedure. The signalling IPsec SA may be established after completion of the EAP-5G procedure and IKE_AUTH exchange.

In an example, IKE SA and signalling IPsec SA establishment procedure may comprise the following. The UE may proceed with the establishment of IKE SA and signalling IPsec SA with the selected N3IWF by initiating an IKE_SA_INIT exchange according. IKE messages following the IKE_SA_INIT exchange may be encrypted and integrity protected using the cryptographic algorithms and keys negotiated in the IKE_SA_INIT exchange. In an example, upon completion of the IKE_SA_INIT exchange, the UE may initiate an IKE_AUTH exchange to establish an IKE SA and first child SA (signalling IPsec SA). In an example in the initial IKE_AUTH request message, the UE may: indicate the intention to use EAP by not including AUTH payload; include the IDi payload with the ID type set to ID_KEY_ID and value set to any random number; and include CERTREQ payload to request N3IWF's certificate if the UE is provisioned with the N3IWF root certificate. In an example, upon reception of the IKE_AUTH request message, the N3IWF may respond with an IKE_AUTH response message that may comprise: an EAP-Request/5G-Start packet to inform the UE an EAP-5G session that will be used to convey the initial NAS messages, the Dr payload with the value set to N3IWF identity, and the CERT payload containing the N3IWF's certificate if the CERTREQ payload is included in the IKE_AUTH request message.

In an example, the IKE SA and signalling IPsec SA establishment may be accepted by the network. If IKE SA and signalling IPsec SA establishment is accepted by the network, the UE may receive from the N3IWF an IKE_AUTH response message comprising an EAP-Success message, which completes the EAP-5G session. In an example, the UE may complete the IKE SA and signalling IPsec SA (first child SA) establishment procedure by initiating an IKE_AUTH exchange including an AUTH payload computed based on the N3IWF key. In the IKE_AUTH request message the UE may include: the INTERNAL_IP4_ADDRESS attribute, the INTERNAL_IP6_ADDRESS attribute, or both, indicating the type of IP address to be used for the IP tunnels, in the CFG_REQUEST configuration payload. The INTERNAL_IP4_ADDRESS attribute may contain no value and the length field may be set to 0. The INTERNAL_IP6_ADDRESS attribute may contain no value and the length field may be set to 0; and the MOBIKE_SUPPORTED notify payload if the UE supports.

The N3IWF may include in the IKE_AUTH response message containing the AUTH payload: a single CFG_REPLY Configuration Payload including the INTERNAL_IP4_ADDRESS attribute with an IPv4 address assigned to the UE, the INTERNAL_IP6_ADDRESS attribute with an IPv6 address assigned to the UE, or both; the NAS_IP4_ADDRESS notify payload with an N3IWF IPv4 address assigned to transport of NAS messages, if the initial IKE_AUTH request message contained a CFG_REQUEST configuration payload with the INTERNAL_IP4_ADDRESS attribute and NAS messages are to be transmitted using IPv4 based inner IP tunnel; the NAS_IP6_ADDRESS notify payload with an N3IWF IPv6 address assigned to transport of NAS messages if the initial IKE_AUTH request message contained a CFG_REQUEST configuration payload with the INTERNAL_IP6_ADDRESS attribute and NAS messages are to be transmitted using IPv6 based inner IP tunnel; the NAS_TCP_PORT notify payload with an N3IWF TCP port number assigned to transport of NAS messages; and the MOBIKE_SUPPORTED notify payload, if the initial IKE_AUTH request message contained a MOBIKE_SUPPORTED configuration payload with the INTERNAL_IP4_ADDRESS attribute.

In an example, the UE may support the TIMEOUT_PERIOD_FOR_LIVENESS_CHECK attribute. If the UE supports the TIMEOUT_PERIOD_FOR_LIVENESS_CHECK attribute, the UE may include the TIMEOUT_PERIOD_FOR_LIVENESS_CHECK attribute indicating support of receiving timeout period for liveness check in the CFG_REQUEST configuration payload within the IKE_AUTH request message. The N3IWF may include the TIMEOUT_PERIOD_FOR_LIVENESS_CHECK attribute indicating the timeout period for liveness check in the CFG_REPLY configuration payload of the IKE_AUTH response message containing the AUTH payload. Presence of the TIMEOUT_PERIOD_FOR_LIVENESS_CHECK attribute in the IKE_AUTH request may be used as input for decision on whether to include the TIMEOUT_PERIOD_FOR_LIVENESS_CHECK attribute in the IKE_AUTH response message containing the AUTH payload. If the TIMEOUT_PERIOD_FOR_LIVENESS_CHECK attribute indicating the timeout period for the liveness check is included in the CFG_REPLY configuration payload within the IKE_AUTH response message containing the AUTH payload or the UE has a pre-configured or configured timeout period, the UE may perform the liveness check procedure. Upon completion of the IKE SA and signalling IPsec SA (first child SA) establishment between the UE and the N3IWF, the UE and the N3IWF may send further NAS messages over the TCP connection within the signalling IPsec SA (first child SA).

In an example embodiment, IKE SA and signalling IPsec SA establishment may not accepted by the network or may be rejected. If IKE SA and signalling IPsec SA establishment is not accepted by the network, the UE receives from the N3IWF an IKE_AUTH response message including a Notify payload with an error type.

In an example, upon receiving the IKE_AUTH response message with a notify payload with an error type other than a CONGESTION Notify payload, the UE may pass the error indication to the upper layer along with the encapsulated NAS messages, if any, within EAP/5G-NAS packet. For the case that the UE is accessing the overlay network via a N3GPP access, after the N3IWF receives from the UE an IKE_AUTH request message, the N3IWF may construct an IKE_AUTH response message that may comprise a CONGESTION Notify payload and a N3GPP_BACKOFF_TIMER Notify payload. In an example, when the UE is accessing the overlay network via the underlay network, after the N3IWF of the overlay network receives from the UE an IKE_AUTH request message, the N3IWF may construct an IKE_AUTH response message that may comprise a CONGESTION Notify payload and a back-off timer for access type of underlay access or extended access e.g., UNDERLAY_ACCESS_BACKOFF_TIMER Notify payload if the N3IWF of the overlay network determines/decides to not accept the IKE SA and signalling IPsec SA establishment based on the overload start message received from the AMF(s) of the overlay network.

In an example embodiment, the N3IWF may due to internal congestion construct an IKE_AUTH response message including the CONGESTION Notify payload, UNDERLAY_ACCESS_BACKOFF_TIMER, the N3GPP_BACKOFF_TIMER Notify payload and send it to the UE.

In an example, the N3IWF may send the IKE_AUTH response message to the UE. Upon reception of the IKE_AUTH response message including: the CONGESTION Notify payload, the UNDERLAY_ACCESS_BACKOFF_TIMER, the N3GPP_BACKOFF_TIMER Notify payload, and/or the like, after the UE authenticates the network or the N3IWF, the UE may discard all states associated with the IKE SA and any child SAs that were negotiated using that IKE SA.

The UE may inform the upper layers that the access stratum connection has been released, and if the back-off timer value in UNDERLAY_ACCESS_BACKOFF_TIMER or N3GPP_BACKOFF_TIMER Notify payload indicates neither zero nor deactivated, the UE may start a timer such as a Tw3 timer with the value provided and the UE may not retry the IKE SA and signalling IPsec SA establishment procedure to the same N3IWF until timer Tw3 expires; the UE is switched off; the UICC containing the USIM is removed; an access attempt occurs due to emergency services; or the UE needs to request one or more S-NSSAIs that were not included in the requested NSSAI provided to the N3IWF previously. In an example, if the back-off timer value in UNDERLAY_ACCESS_BACKOFF_TIMER or N3GPP_BACKOFF_TIMER Notify payload indicates that this timer is deactivated, the UE may not retry the IKE SA and signalling IPsec SA establishment procedure to the same N3IWF until: the UE is switched off; the UICC containing the USIM is removed; an access attempt occurs due to emergency services; the UE needs to request one or more S-NSSAIs that were not included in the requested NSSAI provided to the N3IWF previously. In an example, if the back-off timer value in UNDERLAY_ACCESS_BACKOFF_TIMER or N3GPP_BACKOFF_TIMER Notify payload indicates zero, the UE may retry the IKE SA and signalling IPsec SA establishment procedure to an N3IWF from the same network.

Figure 26:
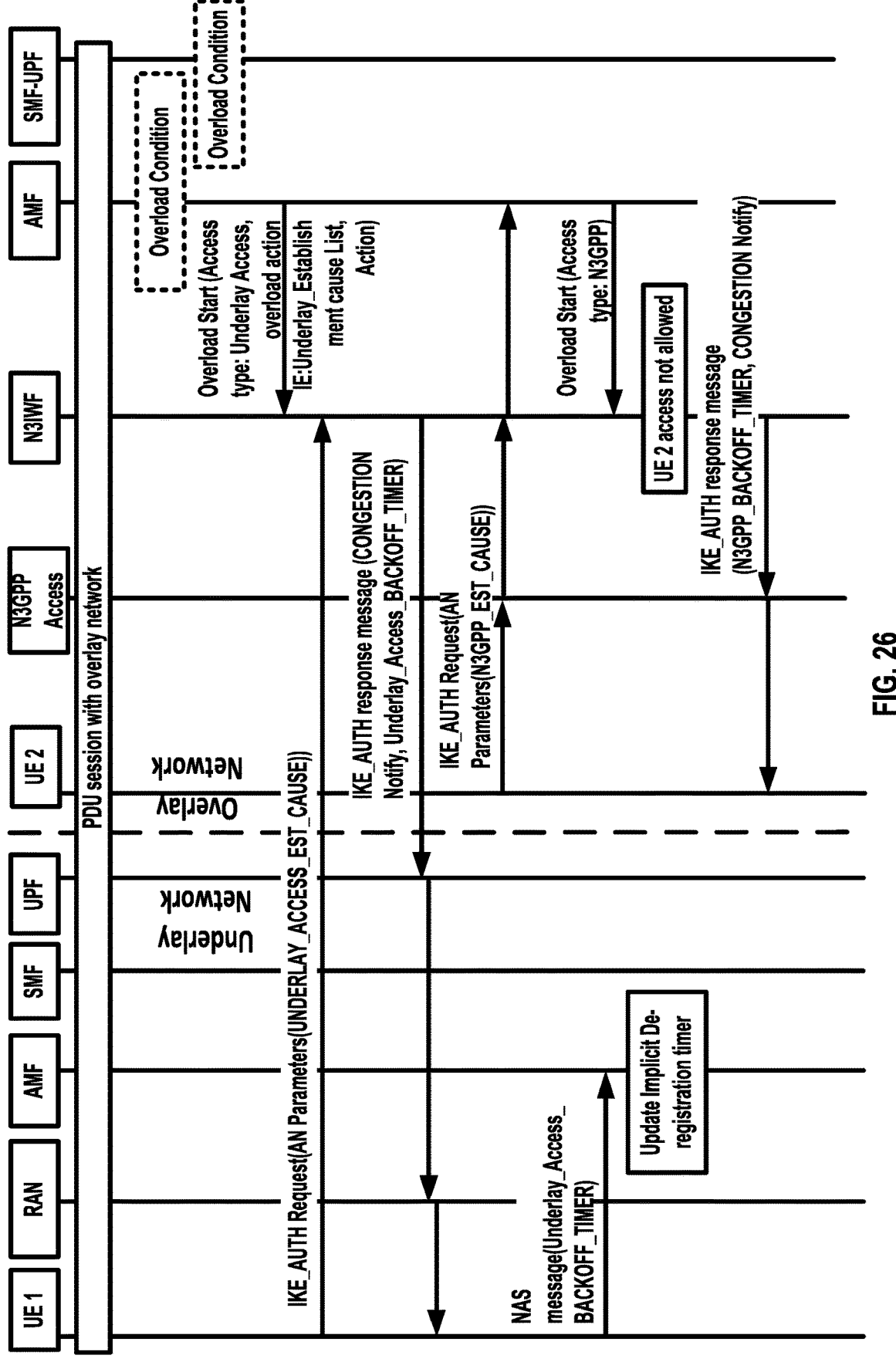
FIG. 26 illustrates an example embodiment of a present disclosure.

FIG. 26 may depict an example overload control procedure in the overlay network based on an overload condition in the overlay network in accordance with embodiments of the present disclosure. In an example, the AMF of the overlay network may send an overload start message to the N3IWF node of the overlay network as per example embodiments of the present disclosure. The AMF of the overlay network may perform the overload control procedure as described in the example embodiments based on determining that the network is in overload or congestion state or based on receiving a notification from a network node (e.g., SMF) of the overlay network indicating that the overlay network is in overload or congestion state. In an example embodiment, the overload start message may comprise a network slice identifier (such as S-NSSAI, network slice ID) associated with an access type of underlay access to the overlay network. In an example, the UE may be assigned a dedicated network slice in the overlay network when accessing via the underlay network access, underlay access, extended access type, and/or the like. In an example, the overload start message may comprise the access type=extended access type (or underlay access). In an example, the overload start message may comprise an overload action IE for an underlay network establishment cause such as Underlay_Establishment_Cause_List, EAEC_List, and a set of one or more actions.

In an example, the overload start message may comprise an overload action information element (IE). In an example, the overload action IE may be per establishment cause e.g., an establishment cause for underlay access. The establishment cause for underlay access may be encoded in a field or IE such as the EAEC or the UNDERLAY_AEC. If the Overload Action IE is included the AMF Overload Response IE within the OVERLOAD START message, the N3IWF node may use it to identify the related signalling traffic. In an example, when the Overload Action IE is set to:

"reject IKE SA and signalling IPsec SA establishment for non-emergency mobile originated data transfer" (e.g., reject traffic corresponding to underlay access establishment cause of EAEC (or UNDERLAY_AEC) being "mo-data", "mo-SMS", "mo-VideoCall" and "mo-VoiceCall" or "mo-data" and "mo-VoiceCall"), or "reject IKE SA and signalling IPsec SA establishment for signalling" (e.g., reject traffic corresponding to underlay access establishment cause of EAEC (or UNDERLAY_AEC) being "mo-data", "mo-SMS", "mo-signalling", "mo-VideoCall" and "mo-VoiceCall" or "mo-data", "mo-signalling" and "mo-VoiceCall"), or "only permit IKE SA and signalling IPsec SA establishment for emergency sessions and mobile terminated services" (e.g., only permit traffic corresponding to establishment cause "emergency" and "mt-Access"), or "only permit IKE SA and signalling IPsec SA establishment for high priority sessions and mobile terminated services" (e.g., only permit traffic corresponding to establishment cause "highPriorityAccess", "mps-PriorityAccess", "mcs-PriorityAccess" and "mt-Access"), the N3IWF node may:

if the AMF Traffic Load Reduction Indication IE is included in the OVERLOAD START message, reduce the signalling traffic by the indicated percentage, otherwise ensure that only the signalling traffic not indicated as to be rejected is sent to the AMF.

In an example, if the Overload Start NSSAI List IE is included in the OVERLOAD START message, the N3IWF node may:

if the Slice Traffic Load Reduction Indication IE is present, reduce the signalling traffic by the indicated percentage for the UE(s) whose requested NSSAI only include S-NSSAI(s) contained in the Overload Start NSSAI List IE, and the signalling traffic indicated as to be reduced by the Overload Action IE in the Slice Overload Response IE if the IE is present, otherwise ensure that only the signalling traffic from UE(s) whose requested NSSAI includes S-NSSAI(s) other than the ones contained in the Overload Start NSSAI List IE, or the signalling traffic not indicated as to be reduced by the Overload Action IE in the Slice Overload Response IE for the UE(s) if the requested NSSAI matched, is sent to the AMF.

In an example, the overload start message may comprise an access type action list IE. The access type action IE may be employed by the N3IWF node to determine a set of actions based on the access type being e.g., the extended access type, underlay access to an overlay network (overlay network ID), and/or the like. The access type action IE may comprise an identifier of an underlay network. In an example, the overload start message may comprise an access category or an access identity associated with underlay access (to an overlay network). In an example, if access type action list IE is included in the overload start message, the N3IWF node may:

if an access type traffic load reduction indication IE is present, reduce the signalling traffic by the indicated percentage for the UE(s) whose access is for a PDU session via the underlay network (PDU session with extended access type), and the signalling traffic indicated as to be reduced by the Overload Action IE in an access type Overload Response IE if the IE is present, otherwise ensure that only the signalling traffic from UE(s) not indicated as to be reduced by the Overload Action IE in the access type Overload Response IE for the UE(s) if the access type matched, is sent to the AMF.

In an example embodiment, access type may be an access identity. In an example embodiment, access type may be an access category. For example, the extended access type may comprise or may be associated to an access category indicating underlay access to the overlay network.

In an example, an establishment cause for the access type may be employed e.g., based on an information element or field identifying the establishment cause being e.g., N3GPP establishment cause such as N3AEC, 3GPPAEC, EAEC (or UNDERLAY_AEC), and/or the like. For example, EAEC (or UNDERLAY_AEC) may indicate that the establishment cause is related to the extended access type e.g., for access of the UE to the overlay network via the underlay network. In an example, the N3IWF may handle access attempts with the establishment causes (pertaining to an access type) and being "emergency", "mps-PriorityAccess" and "mcs-PriorityAccess" (i.e. Emergency calls, MPS, MCS subscribers) with high priority and responds with IKE messages indicating error as per example embodiments of the present disclosure. In an example, the N3IWF may not accept the IKE connection.

In an example embodiment as depicted in FIG. 26, the UE may receive a notification message from the overlay network via the underlay network indicating that the overlay network is in overload or congestion state. In an example, the IKE SA and signalling IPsec SA may be released, deactivated or no traffic can be received or transmitted. In an example, the notification message may be an IKE message such as (the IKE_AUTH response). In an example, the IKE message may comprise the congestion notify payload, underlay access back-off timer e.g., Underlay_Access_BackOff_Timer, and/or the like. In an example, in response to receiving the IKE message, the UE may send a NAS message to the underlay network. The UE may send the NAS message to the AMF of the underlay network. The NAS message may comprise the underlay access back-off timer e.g., the Underlay_Access_BackOff_Timer, Overlay_Backoff timer, and/or the like. In an example, the AMF may adjust a parameter for implicit deregistration of the UE in the underlay network. In an example, the AMF of the underlay network may determine to adjust parameters for de-registration, deactivation, or release of user plane resources associated with the wireless device or associated with the second PDU session of the wireless device (e.g., the PDU session in the underlay network). The adjusting may comprise lengthening of a timer for de-registration (implicit de-registration), pausing the timer for a time period equal or greater than the underlay access back-off timer, and/or the like. In an example, when the AMF receives notification of overload or congestion in the overlay network and the notification comprises a time value for duration of the condition (such as the underlay access back-off timer, back-off timer, mobility management back-off timer, session management back-off timer, and/or the like), based on a condition (e.g., if the time value is larger than the sum of the UE's periodic registration update timer and an implicit deregistration timer, or greater than or equal to the the UE's periodic registration update timer and the implicit deregistration timer) the AMF may adjust the mobile reachable timer and/or the implicit deregistration timer such that the AMF of the underlay network does not implicitly deregister the UE while the overlay network is in overload state or the timer such as the mobility management back-off timer is running. In an example, when the AMF of a network rejects registration request messages or service request with a mobility management back-off time which is larger than the sum of the UE's periodic registration update timer and an implicit deregistration timer, the AMF may adjust the mobile reachable timer and/or the implicit deregistration timer such that the AMF does not implicitly deregister the UE while the mobility management back-off timer is running.

Figure 27:
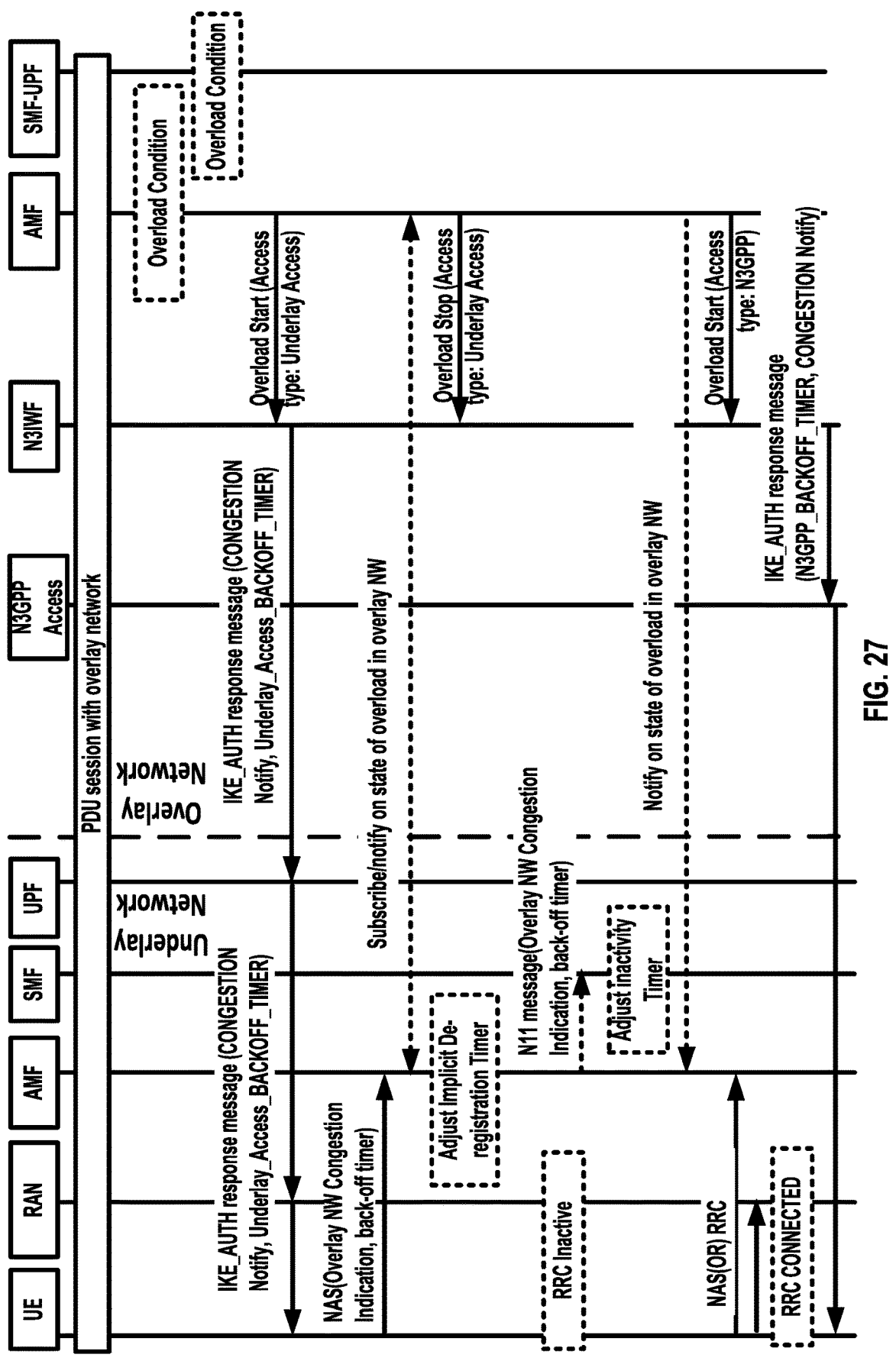
FIG. 27 illustrates an example embodiment of a present disclosure.

In an example embodiment (as depicted in FIG. 26) an element of the overload start message may be employed to distinguish an access type and perform an overload control based on the access type. In an example, a network may determine to allow (or not allow) local, or direct access of the network via 3GPP access, N3GPP access, the underlay access (extended access type) selectively. As depicted in an example, while UE1 access via the extended access type is not allowed to the overlay network, UE2 access via the N3GPP access may be allowed. When the overload control procedure indicates in the overload start message that the overload is for access type N3GPP, access of the UE2 may be barred In an example embodiment as depicted in FIG. 27, the UE may receive the notification message from the overlay network via the underlay network indicating that the overlay network is in overload or congestion state. In an example, the notification message may be the IKE message such as (the IKE_AUTH response). In an example, the IKE message may comprise the congestion notify payload, underlay access back-off timer e.g., Underlay_Access_BackOff_Timer, and/or the like. In an example, in response to receiving the IKE message, the UE may send a NAS message to the underlay network. The UE may send the NAS message to the AMF of the underlay network. The NAS message may comprise the underlay access back-off timer e.g., the Underlay_Access_BackOff_Timer, Overlay_Backoff timer, and/or the like. In an example, the AMF may adjust the parameter for implicit deregistration of the UE in the underlay network as per an example embodiment in present disclosure. In an example, the AMF may adjust a parameter for inactivity of the wireless device wherein the parameter may be employed to deactivate or release user plane resources or PDU session(s) based on expiry of an inactivity timer (being the parameter for inactivity) of the UE in the underlay network. In an example, the AMF may determine to send to the RAN node of the underlay network an N2 message comprising a parameter to transition the UE to RRC-INACTIVE state. In an example, the parameter may be an RRC inactive assistance information. In an example, the RRC inactive assistance information may comprise UE specific DRX values, UE specific extended idle mode DRX values (cycle length and Paging Time Window length), the Registration Area provided to the UE, Periodic Registration Update timer, if the AMF has enabled MICO mode for the UE, an indication that the UE is in MICO mode, information from the UE identifier, for NR and for E-UTRA connected to 5GC, that allows the RAN to calculate the UE's RAN paging occasions. The RRC inactive assistance information may be provided by the AMF during the overload or congestion in the overlay network or N2 activation with the (new) serving NG-RAN node (e.g., during Registration, Service Request, Handover) to assist the NG RAN's decision whether the UE can be sent to RRC Inactive state.

In an example embodiment, when the AMF of the underlay network receives an indication of overlay network overload (e.g., from the UE or from the overlay network) that may comprise the back-off timer, underlay access back-off timer, and/or the like, the AMF may send a message over N11 interface to the SMF of the underlay network. The SMF may adjust an inactivity timer parameter based on the back-off timer or underlay access back-off timer.

In an example embodiment, when the AMF of the overlay network receives an indication of underlay network overload (e.g., from the UE or from the underlay network) that may comprise the back-off timer, underlay access back-off timer, and/or the like, the AMF may send a message over N11 interface to the SMF of the overlay network. The SMF may adjust an inactivity timer parameter based on the back-off timer or underlay access back-off timer.

In an example, when the AMF receives the NAS message from the UE with an indication of overload condition in the overlay network, the AMF of the underlay network may subscribe to the state of overload in the overlay network. In an example, the AMF of the underlay network may use NEF services such as network exposure services to request status of the overlay network. In an example, upon alleviation of the overload condition, the overlay network may notify the underlay network AMF that the overload condition is alleviated. In an example, the UE may initiate an RRC resume procedure to the underlay network in response to expiry of the underlay access back-off timer. The UE may send an RRC resume request message to the RAN node of the underlay network comprising the establishment cause for underlay access e.g., the EAEC. The RAN node may send an RRC resume message to the UE. The UE may send an RRC resume complete message.

Figure 28:
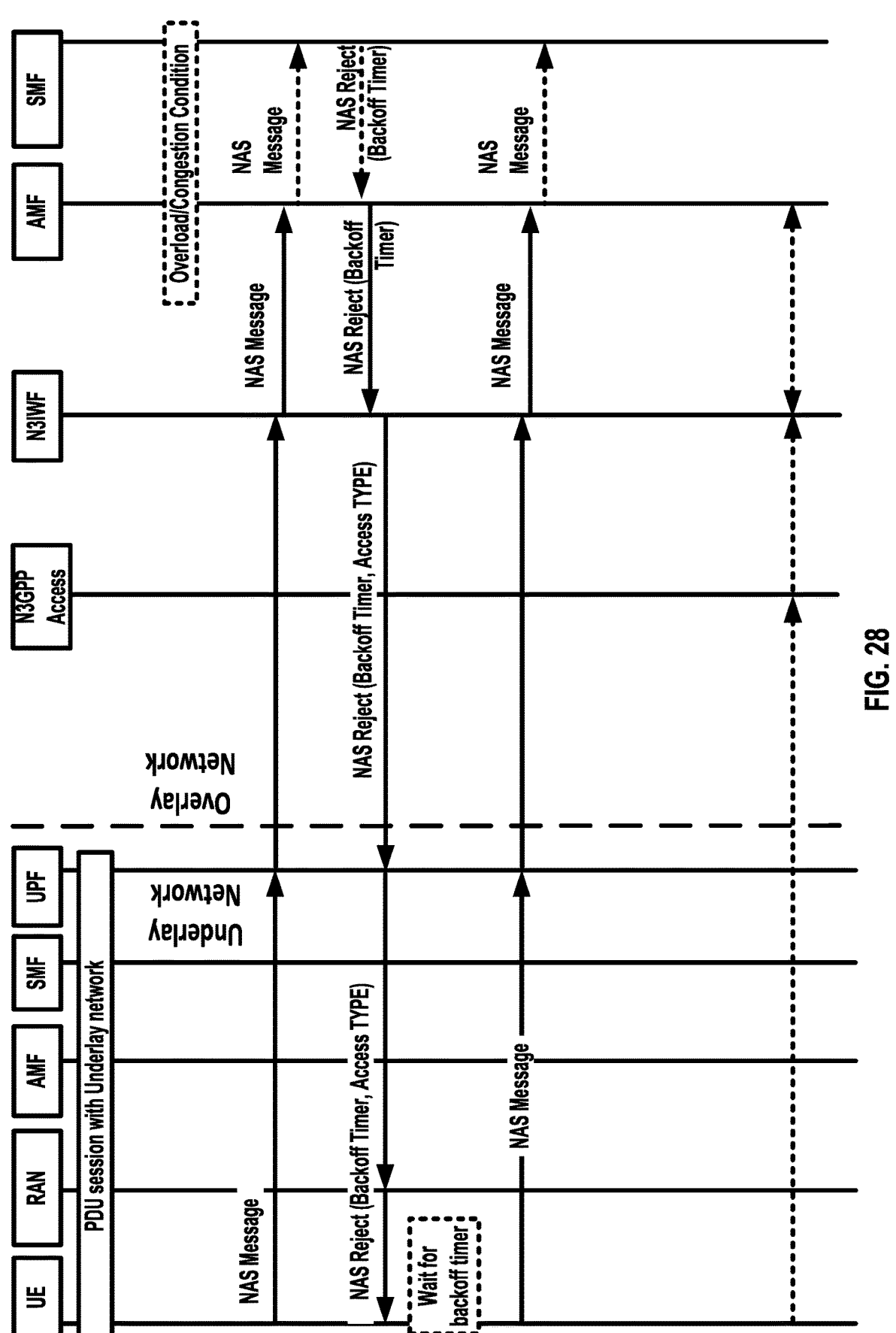
FIG. 28 illustrates an example embodiment of a present disclosure.
Figure 29:
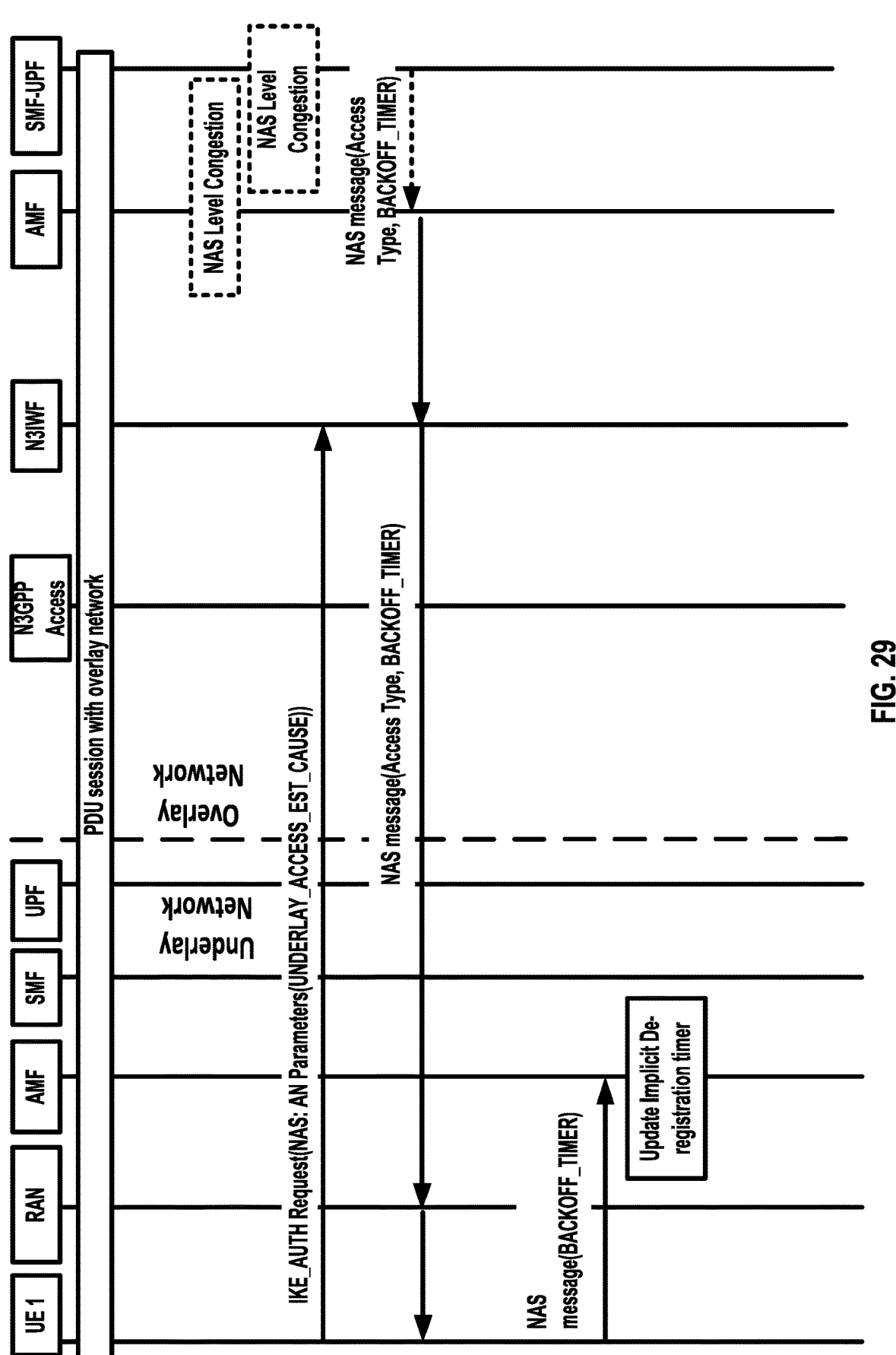
FIG. 29 illustrates an example embodiment of a present disclosure.

In an example embodiment as depicted in FIG. 28 and FIG. 29, the UE may receive a NAS message from the overlay network via the underlay network indicating that the overlay network is in congestion state. In an example, the AMF or the SMF of the overlay network may perform the NAS level congestion control as per an example description. The NAS message may be transmitted to the UE via the N3IWF of the overlay network and user plane of the underlay network. In an example, the IPsec signaling SA may be employed for exchange of NAS messages between the UE and the overlay network. In an example, the UE may receive a NAS notification from the AMF or the SMF of the overlay network comprising an access type being underlay access, a back-off timer associated with the access type or associated with the NAS messages. In an example, in response to receiving the NAS notification message, the UE may send a NAS message to the underlay network. The UE may send the NAS message to the AMF of the underlay network. The NAS message may comprise the access type, the identifier of the overlay network, the back-off timer e.g., the Underlay_Access_BackOff_Timer, Overlay_Backoff timer, and/or the like. In an example, the AMF may adjust the parameter for implicit deregistration of the UE in the underlay network as per an example embodiment in present disclosure. In an example, the AMF may determine to send to the RAN node of the underlay network an N2 message comprising a parameter to transition the UE to RRC-INAC-TIVE state. In an example, the parameter may be the RRC inactive assistance information.

In an example embodiment as depicted in FIG. 30, the overlay network may be overloaded or congested. In an example, based on receiving the overload start message from the AMF or internal N3IWF overload/congestion, the N3IWF may determine to send a message to the UE via IKE messages such as IKE_AUTH response message indicating state of overload or congestion. In an example, the message may comprise the congestion notify payload, and the underlay access back-off timer (or the back-off timer associated with the access type. In an example, the overload start message may comprise the access type, the overload action IE, the access type action list IE, the access type overload response IE, and/or the like. In an example, the overload control procedure may be as per example embodiment of the present disclosure. In an example, the IPsec signaling SA and other IPsec SA(s) may be released, deactivated or suspended. In an example, transmission and reception of traffic (signaling and/or data) between the UE and the N3IWF may be suspended. In an example, when traffic or data packets are not detected by the UPF of the underlay network, an inactivity timer may be expired. The inactivity timer expiry may trigger deactivation of the second PDU session (e.g., the PDU session of the UE in the underlay network). In an example, the SMF of the underlay network may receive a notification from the UPF indicating inactivity for a duration equal or greater than the value of the inactivity timer. In an example, the SMF may send a message to the AMF of the underlay network to deactivate or release user plane resources of the UE or the second PDU session. In an example, the SMF may request status of the overlay network associated with the second PDU session prior to deactivation of the user plane resources. In an example, the SMF of the underlay network may send a status request message to the AMF of the overlay network. In an example, the status request message may comprise an identifier of the UE, access type, an identifier of the PDU session e.g., the first PDU session or the second PDU session, and/or the like. In an example, the SMF may receive from the AMF of the overlay network a response message indicating notification of congestion or overload status. In an example, the response message may comprise the congestion notify payload, the underlay access back-off timer, and/or the like. In an example, the SMF may determine to extend/adjust the period of the inactivity timer based on the underlay access back-off timer. In an example, the SMF may determine not to deactivate or release the user plane resources.

Figure 31:
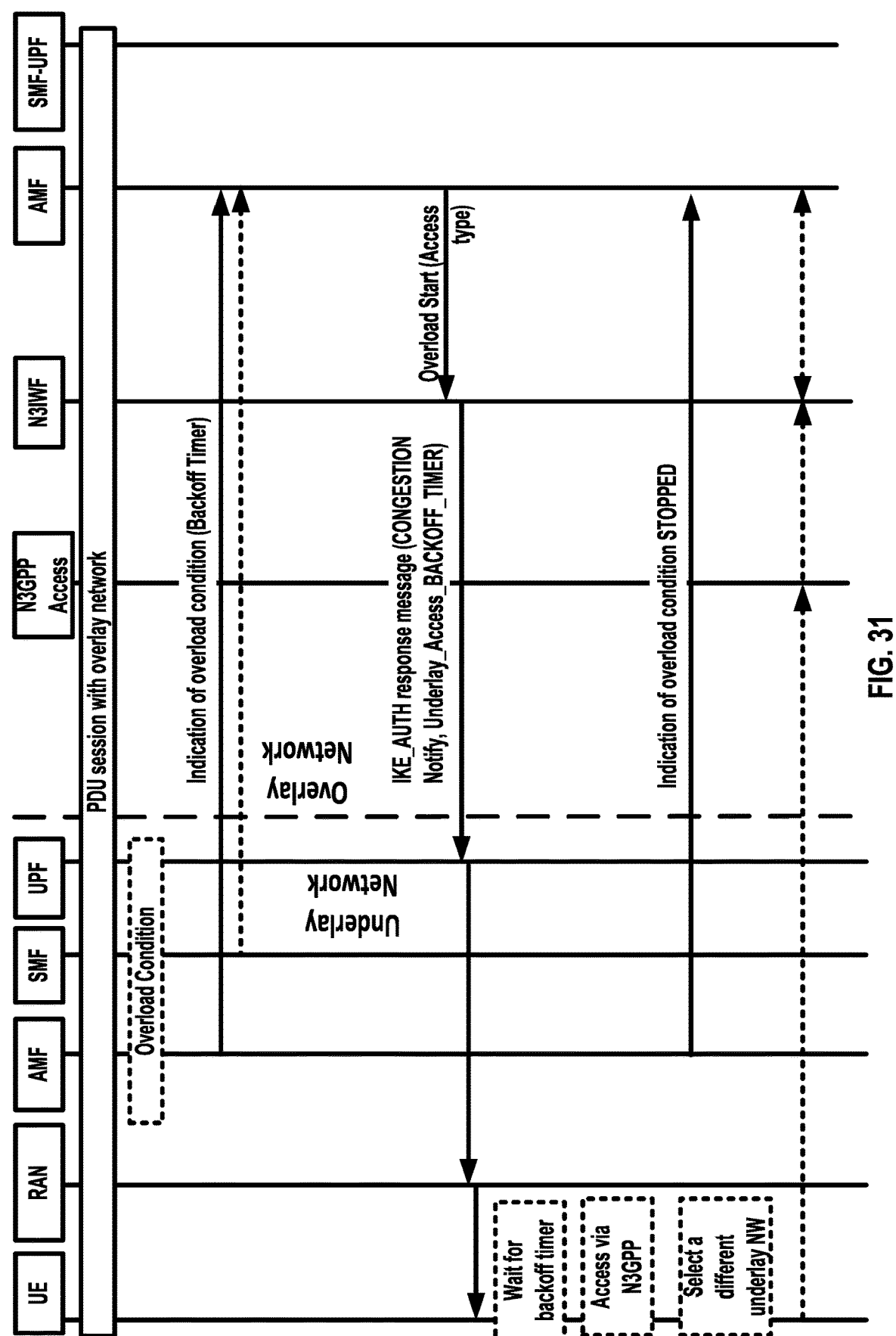
FIG. 31 illustrates an example embodiment of a present disclosure.

In an example embodiment as depicted in FIG. 31, an overload or congestion status may occur in the underlay network. In an example, the AMF of the overlay network may perform overload control based on the overload state of the underlay network. In an example, NAS level congestion control applied on all NAS messages may be performed/achieved by the AMF of the underlay network or the SMF of the underlay network that may comprise rejecting NAS messages, from the UE, with a back-off timer. To avoid that large amount of UEs initiate deferred requests (almost) simultaneously, the AMF or the SMF may select the back-off timer value so that the deferred requests are not synchronized. In an example, the back-off timer may be determined based on the overlay network (e.g., an identifier of the overlay network), or based on a load level of the underlay network. For example when the network (e.g., the underlay network) provides access of UE to one or more overlay networks, based on the operator policy, agreement, priority of overlay network and/or the like, the underlay network may determine a different back-off timer. In an example, the underlay network mat send an indication of overload state to the overlay network. In an example, the AMF of the underlay may send the indication to the AMF of the overlay network. In an example, the SMF of the underlay may send the indication to the AMF of the overlay network. In an example, the indication may comprise the back-off timer. In an example, base on the indication received from the underlay network, the AMF may perform the overload control procedure as described in an example embodiment. When the UE receives a notification from the overlay network (e.g., via the IKE messages) with a back-off timer, the UE may determine not to initiate any NAS signalling or access stratum messages, RRC messages, and/or the like with the undrlay network for the duration of the back-off timer or until the back-off timer expires or the UE receives a paging request from the network, or the UE initiates signalling with a higher priority than was used when the UE received the back-off timer. In an example embodiment, when the UE receives the back-off timer, the UE may select a different underlay network to access the overlay network. In an example embodiment, when the UE receives the back-off timer from the overlay network, the UE may access the overlay network via an AN (3GPP access, or N3GPP access) of the overlay network if within the coverage.

FIG. 32 may depict an example implementation of encoding for extended access establishment cause (e.g., the underlay access establishment cause) EAEC.

In an example embodiment as depicted in FIG. 33, a mobility management function such as MME or an access and mobility management function (AMF) of an underlay network may receive a message. The message may comprise a congestion notification of an overlay network, a backoff timer parameter for an access type associated with access to the overlay network via the underlay network, and/or the like. In an example, the AMF (or the MME) may adjust, based on the message, a duration associated with de-registration of a wireless device in the underlay network.

In an example embodiment, the message may be a NAS message received from the wireless device. In an example, the message may be received from an element of the overlay network. The element of the overlay network may be the AMF of the overlay network, or the SMF of the overlay network. In an example, the AMF may receive from a session management function (SMF), a request for release of resources for the wireless device. In an example, the AMF may send to the base station of the underlay network an RRC configuration parameter. In an example, the RRC configuration parameter may comprise an RRC-Inactive assistance information. The In an example, the wireless device may send to the underlay network an access request. In an example, the access request may be at least one of an RRC message, a NAS message, and/or the like. In an example, the access request may be in response to expiry of the back-off timer indicating alleviation of an overload or congestion state in the overlay network. In an example, the RRC message may be an RRC resume request message, RRC setup request message, RRC setup complete message, and/or the like. In an example, the NAS message may be a service request message, a registration request message, a PDU session establishment request message, a PDU session modification request message, and/or the like. In an example, the wireless device may send to the underlay network a registration request message. In an example, the underlay network or the AMF may start a de-registration timer (implicit de-registration timer) by the AMF of the underlay network for the wireless device. In an example, the underlay network or the AMF of the underlay network may de-register the wireless device based on the expiry of the de-registration timer. In an example, the de-registering may be based on inactivity of the wireless device for a time greater than or equal to the de-registration timer. In an example, the AMF may restart the de-registration timer based on detection of activity for the wireless device. In an example, the adjusting may comprise at least one of: pausing the timer for a duration equal or greater than the de-registration timer, re-configuring the implicit de-registration time, lengthening the implicit de-registration timer, and/or the like. In an example, the adjusting may be based on a condition. In an example, the condition may indicates that a value of the back-off timer for the access type is greater than or equal to the sum of an inactivity timer, a periodic registration update timer of a wireless device and an implicit deregistration timer of the wireless device. In an example, the condition may be a function of the inactivity timer, the periodic registration update timer of the wireless device and the implicit deregistration timer of the wireless device. In an example, the function may comprise at least one of: a MAX function, a linear combination of the inactivity timer, the periodic registration update timer of the wireless device and the implicit deregistration timer of the wireless device, and/or the like. In an example, the AMF may determine not to implicitly deregister the UE while the back-off timer is running. In an example, the message may comprise at least one of: an indication of a congestion/overload, a back-off timer associated with a NAS level congestion control of the overlay network, a timer value associated with an overload condition of the overlay network, an identifier of the overlay network, and/or the like.

In an example embodiment as depicted in FIG. 34, a wireless device may receive from a network node of an overlay network via a packet data unit (PDU) session of an underlay network, a message comprising a congestion notification of the overlay network, a backoff timer parameter for an access type associated with access to the overlay network via the underlay network, and/or the like. In an example, the wireless device may send to the underlay network, a second message comprising the congestion notification of the overlay network, the backoff timer, and/or the like. In an example, the wireless device may receive from the underlay network, a radio resource control (RRC) message comprising a configuration parameter.

In an example, the configuration parameter may comprise a suspend configuration parameter. In an example, the wireless device may transition to RRC state of RRC-INACTIVE state. In an example, the wireless device may transition to RRC-IDLE state. In an example, the wireless device upon expiry of the back-off timer, may send an RRC message to the underlay network. In an example, the RRC message may be an RRC resume request message, an RRC setup request message, an RRC setup complete message, and/or the like. In an example, the second message may indicate to the AMF of the underlay network to configure, reconfigure, or adjust a de-registration timer for the wireless device. In an example, the extended access type may comprise accessing to the overlay network via a user plane connection of the underlay network.

In an example embodiment as depicted in FIG. 35, the AMF of the underlay network may receive from a network node of the overlay network, a message comprising: a congestion notification of the overlay network, a backoff timer parameter for the access type associated with access to the overlay network via the underlay network. In an example, the AMF may adjust the timer value for de-registration or deactivation of user plane resources of the wireless device in the underlay network.

In an example, the AMF may receive from a session management function (SMF), a request for release of resources for the wireless device. The AMF may send to the base station of the underlay network the RRC configuration parameter, wherein the RRC configuration parameter may comprise the RRC-Inactive assistance information.

In an example embodiment as depicted in FIG. 36, an interworking function node (e.g., N3GPP Interworking function, N3IWF) of the overlay network may receive from the AMF of the overlay network, a first message indicating start of an overload control for access of a wireless device via an underlay network. The first message may comprise an access type associated with access to the overlay network via the underlay network, an overload action information element (IE) comprising access control parameters associated with an establishment cause for the access type, and/or the like. In an example, the interworking function node may receive from the wireless device, a connection request comprising the establishment cause for the access type. In an example, the interworking function node may determine based on the overload action IE, whether to accept the connection request.

In an example, the first message may be the overload start message. In an example, the establishment cause may be for extended access or the underlay access (e.g., the EAEC). In an example, the establishment cause may be for N3GPP access (e.g., the N3AEC).

The invention claimed is:

1. A method comprising:
   receiving, by a wireless device from a network node of a first network via a packet data unit (PDU) session of a second network, a congestion notification of the first network; and
   sending, by the wireless device to the second network, the congestion notification of the first network.

2. The method of claim 1, wherein the first network comprises an overlay network and the second network comprises an underlay network.

3. The method of claim 1, wherein the wireless device receives the congestion notification from the network node in a first message, the first message further comprising a backoff timer parameter for an access type associated with access to the first network via the second network.

4. The method of claim 3, wherein the wireless device sends the congestion notification to the second network in a second message, the second message further comprising the backoff timer parameter for the access type associated with access to the first network via the second network.

5. The method of claim 4, further comprising sending, by the wireless device upon expiry of a back-off timer associated with the backoff timer parameter, a second radio resource control (RRC) message to the second network, wherein the second RRC message comprises at least one of:
   an RRC resume request message; or
   an RRC setup request message.

6. The method of claim 2, further comprising receiving, by the wireless device from the underlay network, a first radio resource control (RRC) message comprising a configuration parameter based on the congestion notification.

7. The method of claim 6, wherein the configuration parameter comprises a suspend configuration.

8. A wireless device comprising one or more processors and memory storing instructions that, when executed by the one or more processors, cause the wireless device to:
   receive, from a network node of a first network via a packet data unit (PDU) session of a second network, a congestion notification of the first network; and
   send, to the second network, the congestion notification of the first network.

9. The wireless device of claim 8, wherein the first network comprises an overlay network and the second network comprises an underlay network.

10. The wireless device of claim 8, wherein the instructions further cause the wireless device to receive the congestion notification from the network node in a first message, the first message further comprising a backoff timer parameter for an access type associated with access to the first network via the second network.

11. The wireless device of claim 10, wherein the instructions further cause the wireless device to send the congestion notification to the second network in a second message, the second message further comprising the backoff timer parameter for the access type associated with access to the first network via the second network.

12. The wireless device of claim 11, wherein the instructions further cause the wireless device to send, upon expiry of a back-off timer associated with the backoff timer parameter, a second radio resource control (RRC) message to the second network, wherein the second RRC message comprises at least one of:
   an RRC resume request message; or
   an RRC setup request message.

13. The wireless device of claim 9, wherein the instructions further cause the wireless device to receive, from the underlay network, a first radio resource control (RRC) message comprising a configuration parameter based on the congestion notification.

14. The wireless device of claim 13, wherein the configuration parameter comprises a suspend configuration.

15. A non-transitory computer-readable medium comprising instructions that, when executed by one or more processors of a wireless device, cause the wireless device to:
   receive, from a network node of a first network via a packet data unit (PDU) session of a second network, a congestion notification of the first network; and
   send, to the second network, the congestion notification of the first network.

16. The non-transitory computer-readable medium of claim 15, wherein the first network comprises an overlay network and the second network comprises an underlay network.

17. The non-transitory computer-readable medium of claim 15, wherein the instructions further cause the wireless device to receive the congestion notification from the network node in a first message, the first message further comprising a backoff timer parameter for an access type associated with access to the first network via the second network.

18. The non-transitory computer-readable medium of claim 17, wherein the instructions further cause the wireless device to send the congestion notification to the second network in a second message, the second message further comprising the backoff timer parameter for the access type associated with access to the first network via the second network.

19. The non-transitory computer-readable medium of claim 18, wherein the instructions further cause the wireless device to send, upon expiry of a back-off timer associated with the backoff timer parameter, a second radio resource control (RRC) message to the second network, wherein the second RRC message comprises at least one of:

an RRC resume request message; or an RRC setup request message.

20. The non-transitory computer-readable medium of claim 16, wherein the instructions further cause the wireless device to receive, from the underlay network, a first radio resource control (RRC) message comprising a configuration parameter based on the congestion notification.

* * * * *